(12) United States Patent
Zowarka et al.

(10) Patent No.: US 8,699,302 B2
(45) Date of Patent: Apr. 15, 2014

(54) ELECTROMAGNETIC SEISMOLOGY VIBRATOR SYSTEMS AND METHODS

(75) Inventors: Ray Zowarka, Austin, TX (US); John Uglum, Austin, TX (US); Jim Upshaw, Austin, TX (US); Charles Penney, Round Rock, TX (US); Hsing-Pang Liu, Austin, TX (US); Stephen Manifold, Austin, TX (US); Kent Davey, Edgewater, FL (US); Bryan Bunkowski, Austin, TX (US); David Prater, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 441 days.

(21) Appl. No.: 12/724,807

(22) Filed: Mar. 16, 2010

(65) Prior Publication Data
US 2010/0232260 A1    Sep. 16, 2010

Related U.S. Application Data

(60) Provisional application No. 61/160,405, filed on Mar. 16, 2009.

(51) Int. Cl.
  *G01V 1/155*    (2006.01)
  *G01V 1/143*    (2006.01)
(52) U.S. Cl.
  CPC .............. *G01V 1/155* (2013.01); *G01V 1/143* (2013.01)
  USPC ........................... 367/189; 181/113; 181/121
(58) Field of Classification Search
  USPC ........................ 367/189; 181/113, 114, 121
  See application file for complete search history.

(56) References Cited

U.S. PATENT DOCUMENTS

| | | | | |
|---|---|---|---|---|
| 3,302,744 A * | 2/1967 | Lemm | .......................... | 181/121 |
| 3,313,370 A * | 4/1967 | Cole | ............................. | 367/189 |
| 4,222,455 A * | 9/1980 | Lerwill | ....................... | 181/121 |
| 4,529,898 A * | 7/1985 | Voloshin et al. | ................ | 310/15 |
| 4,715,470 A * | 12/1987 | Paulsson | ..................... | 181/106 |
| 4,783,771 A * | 11/1988 | Paulsson | ........................ | 367/57 |
| 4,805,725 A * | 2/1989 | Paulsson | ...................... | 181/106 |
| 4,821,246 A | 4/1989 | Van Kampen et al. | | |
| 7,639,567 B2 * | 12/2009 | Sitton et al. | ................... | 367/189 |

FOREIGN PATENT DOCUMENTS

| | | |
|---|---|---|
| NL | 9002065 A | 4/1992 |
| SU | 1022101 A1 | 6/1983 |

OTHER PUBLICATIONS

"T-Rex" Trial Shaker Specifications, NEES Equipment site at the University of Texas, Feb. 2002.*

(Continued)

*Primary Examiner* — Ian J Lobo
(74) *Attorney, Agent, or Firm* — Ballard Spahr LLP

(57) ABSTRACT

An electromagnetic system having a reaction mass with a field winding embedded therein, a base plate having an inner annular surface and an outer annular surface, and an armature winding coupled to at least a portion of the inner annular surface and at least a portion of the outer annular surface of an upper end portion of the base plate. In operation, directing an electric current in at least one of the field winding and the armature winding causes at least one of the base plate and the reaction mass to move relative to each other. The electromagnetic system can be used for seismic exploration and vibroseis applications, among other uses.

15 Claims, 71 Drawing Sheets

EMV baseline design

(56) References Cited

OTHER PUBLICATIONS

Stokoe et al, "Development of NEES Large Scale Shakers . . . ", 13th World COnference on Earthquake Engineering, Vancover, Canada, Aug. 2004.*

Notification of International Search Report and Written Opinion issued by International Searching Authority on Jul. 7, 2011 for Intl. App. No. PCT/US2011/027432, filed on Mar. 16, 2010 (First Named Inventor: R. Zowarka; Applicant: Board of Regents, The University of Texas System; pp. 1-13).

* cited by examiner

Control diagram

Sweep force control diagram

Vibrator electrical waveforms

Spectral power density

Reaction mass motion

Random phase ground force comparison

Random phase ground force comparison

Random phase spectral power comparison

Random phase spectral power comparison

Random amplitude ground force comparison

Random amplitude ground force comparison

Random amplitude spectral power comparison

Random amplitude spectral power comparison

Spectral power plots for fixed frequency sweeps

Spectral power plots for fixed frequency sweeps

Spectral power plots for fixed frequency sweeps

Electromagnetic shaker suitable for a large stroke (a) Two coils connected in anti-series (b) One of the two coils is shorted Connecting two coils in anti-parallel will yield a larger inductance at higher frequency than shorting one of the two coils.

Geometry for generating lift force from a fixed field winding on the steel structure Forces generated when the currents are creating lift for various positions along the highlighted segment in Figure 9C Forces generated when the currents are creating a down force for various positions along the
highlighted segment in Figure 9C Force variation with displacement for constant current Baseline design geometry Variables to perturb during the optimization Three-dimensional surface is constructed to link the optimization variables to the problem geometry Magnetic optimization requires smearing the current over a region Current density multiplier as a function of β where β represents the proportion of the total force load made up by the dc (steady state weight) component Optimized design dimensions Magnetic field line plot (B) at peak excitation Field plot for the optimized design at maximum excitation Two shaker circuits in parallel, lift circuit has 8 coils Armature coil layout using two parallel circuits dc lift coils are best positioned in the center of the armature stack Magnetic field through the middle of the armature gap

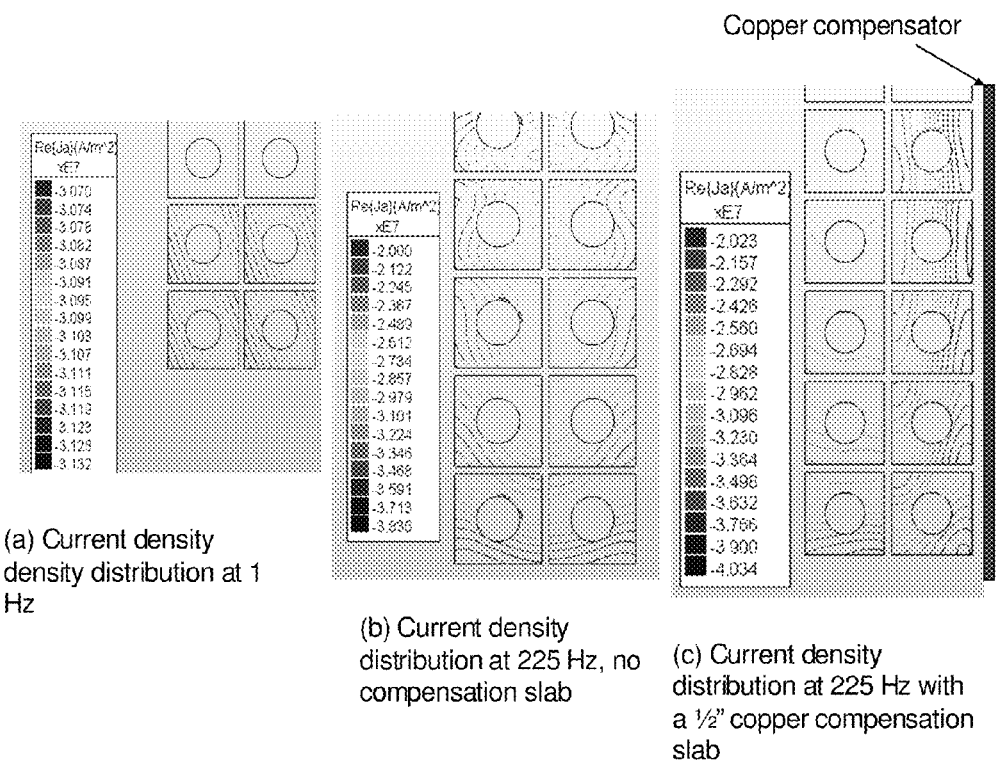
FIG. 9Q(a), (b) and (c)
plots of how current density changes with frequency and in the presence of a copper compensator Power and voltage requirements for thin and thick compensator with identical armature coil excitation (225 Hz, maximum excitation)

Equivalent ladder network used to represent the armature circuit

Performance of the ladder equivalent circuit to model the armature's power dissipation.

Transient Solution at 225 Hz
$I_{field} = 931\ A$, $I_{armature} = 1421\ \sin(2p \cdot 225\ t)$ Transient analysis to compute force with the dc field and ac armature excitation Using two columns of 12.7 mm (½") magnets (45 MGO) delivers a lift force that is within 7% of the present system for force producing capability 45 MGO magnets Placing two columns magnets on either side of the armature gap Leakage field away from the armature gap with magnet excitation

| Resin | Class | Tg (°C) | HDT (°C) |
|---|---|---|---|
| VRI 777C | H | 94 | 55 |
| PDG Y881K | H | 131 | 120 |
| Y881K + R26 | H | 140 | 124 |
| Dolph | H | 109 | 67 |
| Master Bond | H | 128 | 118 |
| Epoxylite 347 | H | 139 | 123 |
| Epoxylite #6107 | H | 154 | 139 |

Heat deflection and glass transition temperatures of insulation systems

Insulation system design

EMV baseline design

Steel reaction mass

EMV base plate

Field coils

EMV force coils

Other EMV Components

EMV base plate with force coils attached

Field coils prior to placement in top reaction mass steel

The outer steel casting prior to copper ring placement

The center steel casting prior to copper ring placement

EMV reaction mass with base plate inserted

EMV base plate guide bearings

Block diagram of an embodiment of a control system truck with the new components placed truck showing the top view truck showing the side view Finite element model of ground and baseplate used in dynamic analyses Detailed view of finite element model of ground and baseplate used in dynamic analyses, with load application areas shown Finite element mesh of baseplate used in static analysis Close up of finite element mesh of baseplate used in static analysis Baseplate lifting up off the ground during upward application of the sinusoidal load The maximum Von Mises stress encountered in the dynamic analyses - the stress is 14.3 ksi The maximum Von Mises stress encountered in the upper cylindrical portion of the baseplate - the stress is 7.5 ksi Maximum Von Mises stress from lateral load in static analysis Lateral deflection from lateral load Modified baseplate with stiffening ribs Boiling and freezing temperatures of ethylene glycol aqueous solutions (ASHRAE handbook)

Field coil cooling design

Armature lift coil and compensating plate cooling design

Finite-element thermal model mesh for field coils

Finite-element thermal model meshes for lift coils and compensating plates

Field coil steady-state temperature distribution (using average coolant temperature)

Field coil steady-state temperature distribution (using exit coolant temperature)

Lift coil steady-state temperature distribution (using average coolant temperature)

Lift coil steady-state temperature distribution (using exit coolant temperature)

Compensating plate steady-state temperature distribution (using average coolant temperature)

Compensating plate steady-state temperature distribution (using exit coolant temperature)

Magnetic field map in air gap

Current check out of a PWM at 10 Hz

Check out of a PWM converter at 50 Hz

Springs added between baseplate and reaction mass

Vibrator in full down position

Vibrator in full up position

Conductors redesigned with 0.125 in. tubing

Conductor in Roboel TM configuration

ELECTROMAGNETIC SEISMOLOGY VIBRATOR SYSTEMS AND METHODS

CROSS-REFERENCE TO RELATED APPLICATION

This application claims benefit of and priority to U.S. provisional patent application No. 61/160,405 filed Mar. 16, 2009, which is fully incorporated herein by reference and made a part hereof.

BACKGROUND

Vibroseis, as known in the art, is a method used in exploration seismology to propagate energy signals into the earth over an extended period of time as opposed to the near instantaneous energy provided by an impulsive source such as explosives or weight-drop trucks. Data recorded in this way can be correlated to convert the extended source signal into an impulse. Generally, the signal has been generated by a servo-controlled hydraulic vibrator or shaker unit mounted on a mobile base unit.

Techniques for using seismic waves to probe for oil reserves or other geological structures and/or anomalies in the earth are becoming quite sophisticated. The key requisite for the work is a high fidelity ground shaker whose force, frequency, and phase can be controlled precisely. Currently, hydraulic shakers dominate the industry. These devices can be truck-mounted for mobility. Generally, with hydraulic shakers, small mechanical actuators control high pressure hydraulic fluid flow to apply sinusoidal compressive forces to a base plate. Large forces are achievable with this design. However, there are drawbacks to hydraulic shakers. The use of hydraulic fluids can impose environmental concerns regarding leaks and spillage. Furthermore, hydraulic shakers are relatively slow-responding, which can result in decreased fidelity to the input signal.

Therefore, systems and methods that overcome challenges found in the art, some of which are described above, are desired.

SUMMARY

Described herein are embodiments of an electromagnetic system that can be used to replace the traditional hydraulic oil systems that actuate mass movement. The embodiments described herein provide wide frequency range operation, ground force application with high fidelity, and low environmental impact. Embodiments described herein can be used for seismic exploration and vibroseis applications, among other uses.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 9Q(a), (b) and (c) illustrate plots of how current density changes with frequency and in the presence of a copper compensator;

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
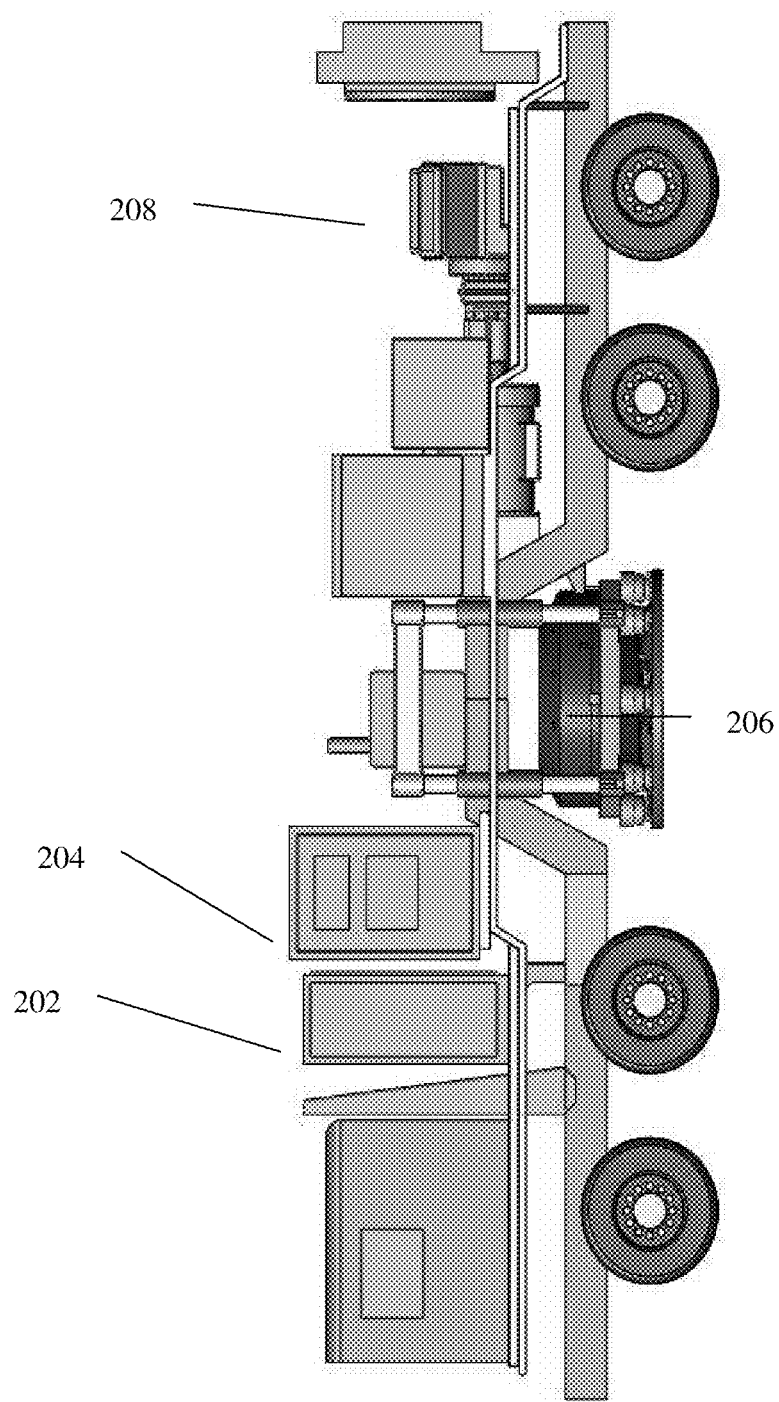
FIG. 1 illustrates an embodiment of a truck-mounted electromagnetic vibrator system comprised of a power supply, a control system, and a transducer.

Described herein are systems and methods of an electromagnetic vibrator. As shown in FIG. 1, in one embodiment an electromagnetic vibrator system can be comprised of a power supply 202, a control system 204 and a transducer 206. The embodiment of FIG. 1 is optionally shown in a truck-mounted configuration and is further comprised of a prime-mover 208 used for power generation.

Figure 2:
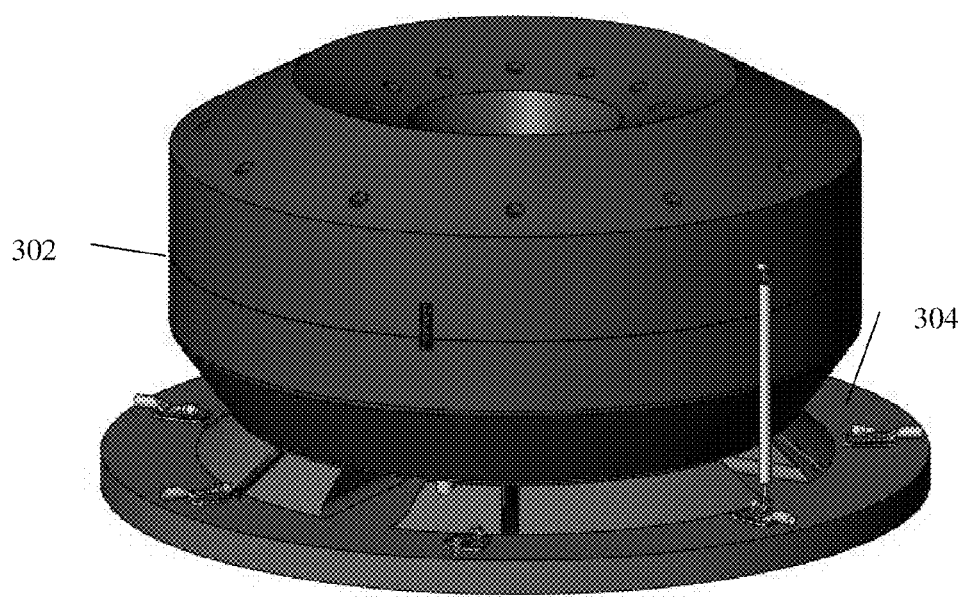
FIG. 2 illustrates one exemplary embodiment of a transducer.

FIG. 2 illustrates one exemplary embodiment of a transducer 306, which is generally comprised of a reaction mass 302 and a base plate 304.

Figure 3:
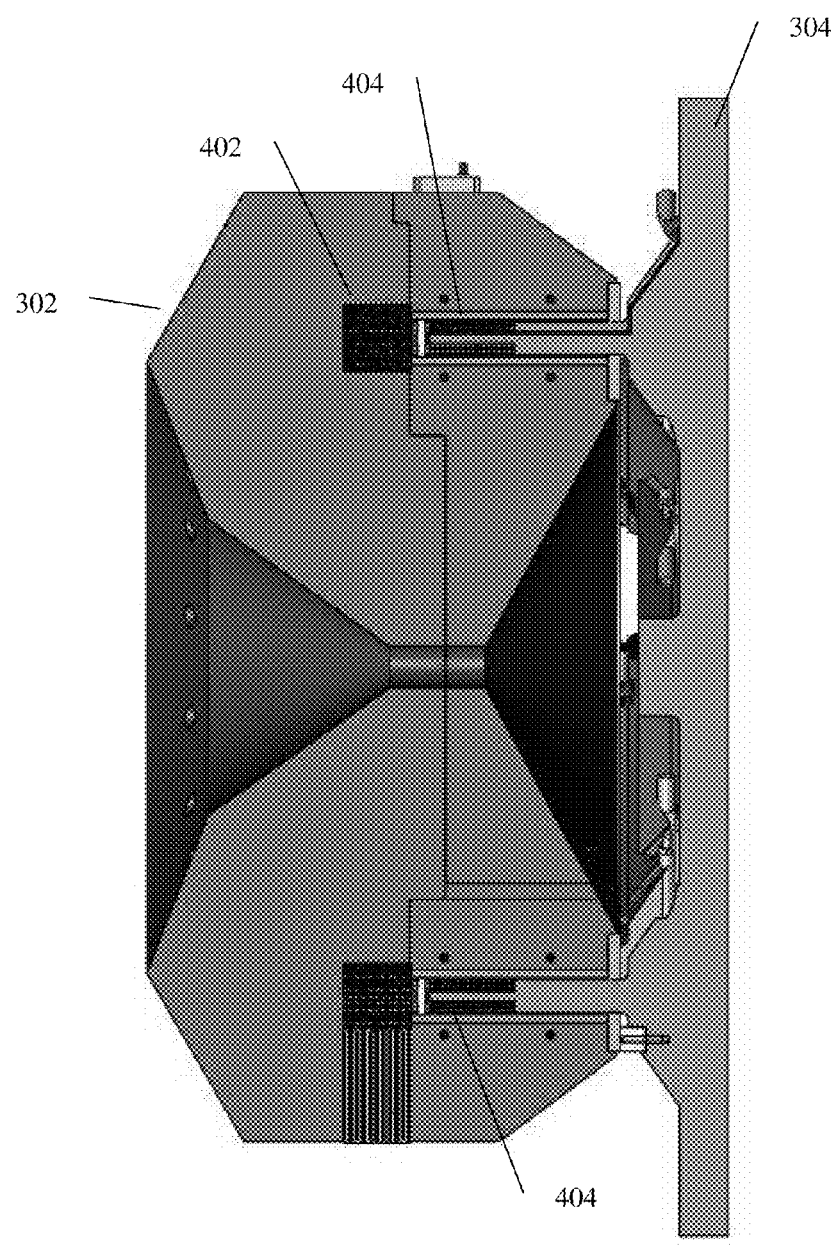
FIG. 3 is a cross section of one embodiment of a transducer.

FIG. 3 is a cross section of one embodiment of a transducer 306. As shown in this figure, field windings 402 are embedded within the reaction mass 302. A field winding current in the field windings 402 creates a magnetic field that reacts with a magnetic field created by an armature current in armature windings 404 that are associated with the base plate 304. By varying one or more of the direction, frequency or magnitude (amplitude) of the field winding current and/or the armature winding current, the base plate and/or the reaction mass can be moved in upward or downward directions.

Figure 4:
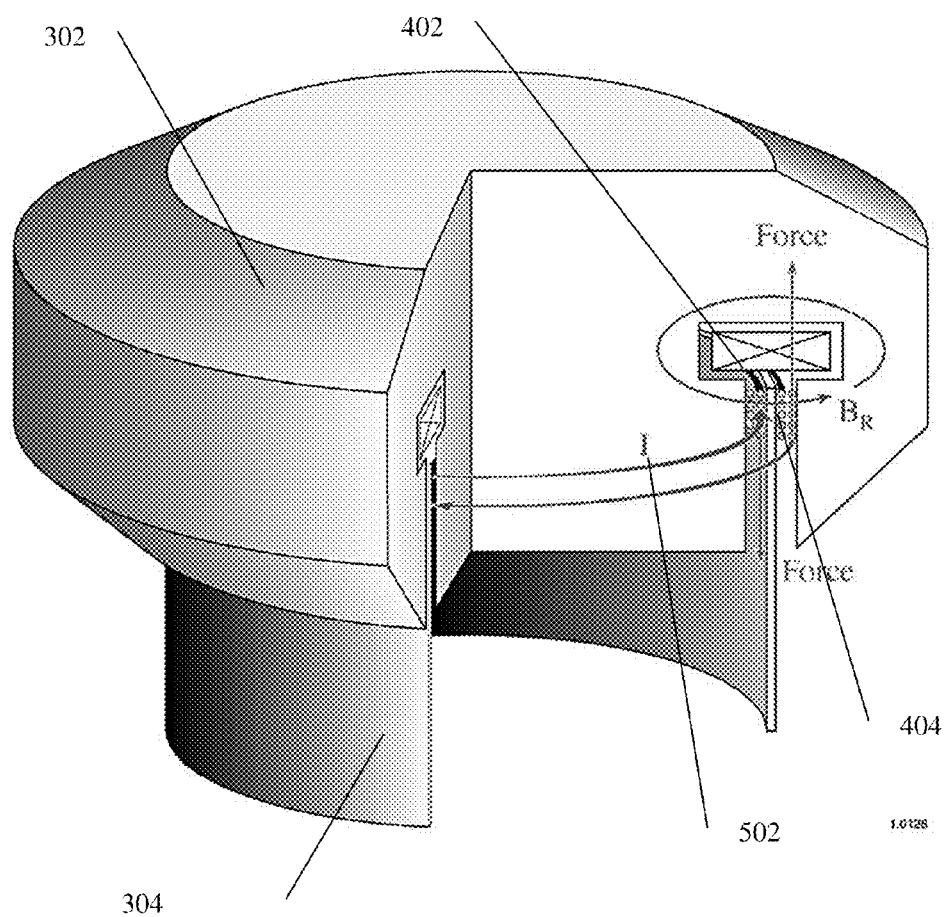
FIG. 4 further illustrates magnetic forces that cause movement of one embodiment of a transducer.

FIG. 4 further illustrates magnetic forces that cause movement of one embodiment of a transducer 306. As shown in FIG. 4, magnetic forces cause movement of the reaction mass 302 and/or the base plate 304 (only a portion of the base plate is shown in FIG. 4). The armature winding current (I) 502 creates a magnetic field that interacts with the magnetic field ($B_R$) created by the field winding current in the field winding 402. In one embodiment, the armature winding current can be a sinusoidally-varying current. The magnetic field created by the armature winding current can be controlled by changing one or more of the direction, amplitude, or frequency of the armature winding current. In one aspect, the armature winding comprises Roebel™ windings or other forms of transposed windings, as are known in the art. In one aspect, the field winding current can be direct current (DC).

In one exemplary embodiment, the shaker can create 60,000 lbf. In one aspect, it can have a dynamic range of 6-150 Hz. In one aspect, the shaken mass or reaction mass can comprise 16,000 lbm and the base plate mass can comprise 3,000 lbm.

Referring back to FIG. 1, in one embodiment a power supply can be provided. While electrical power supplies as are available from a utility grid are contemplated within the scope of embodiments described herein, in one aspect a prime-mover such as an internal-combustion engine or combustion turbine, for example, can be provided that drives an electrical generator. Generally, the generator produces alternating current (AC) power. In one aspect, the generator can be single-phase. In another aspect, the generator can be multiple-phase, such as three-phase, as is known in the art.

Figure 5:
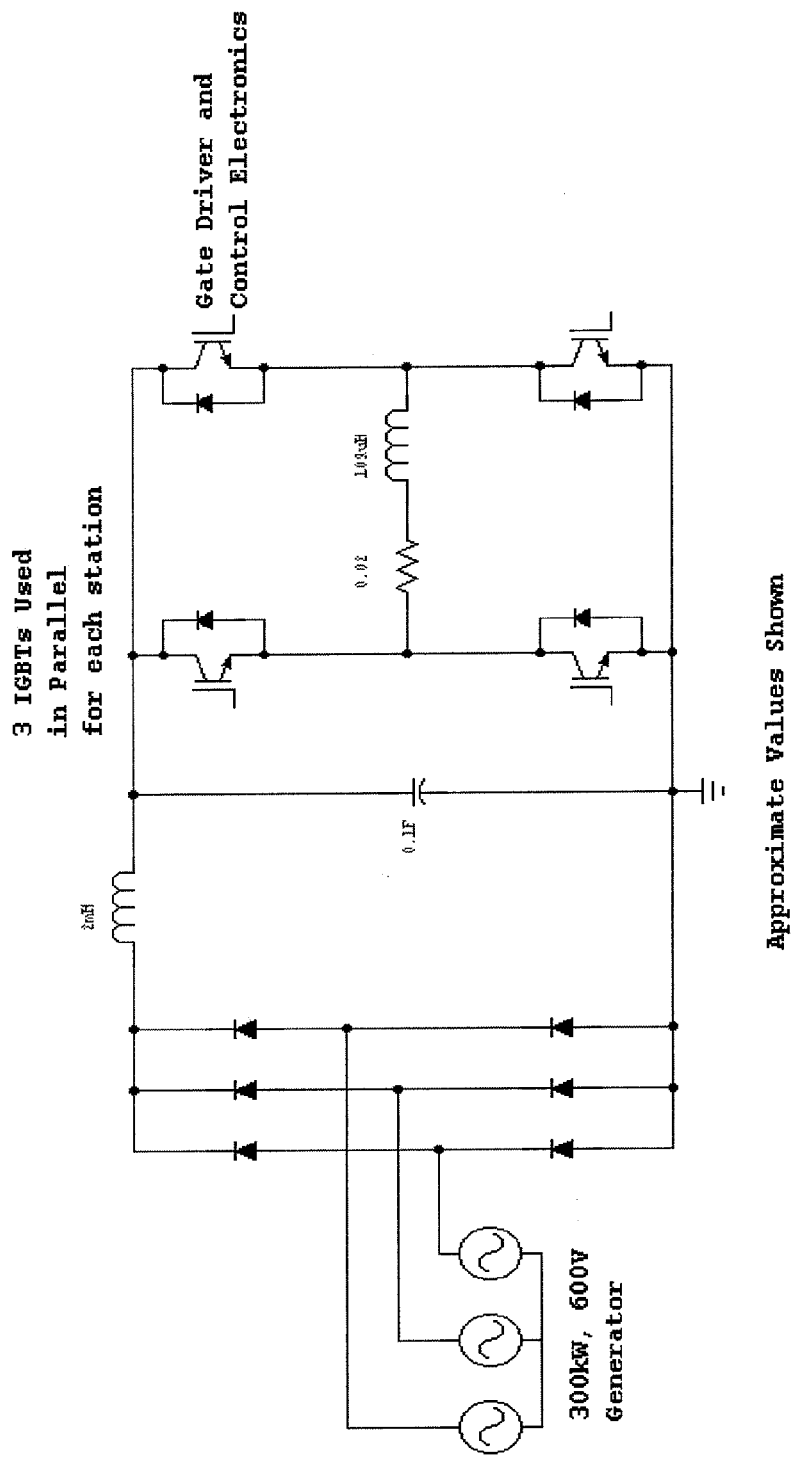
FIG. 5 illustrates one embodiment of an electrical schematic of an inverter scheme that can be used to create AC power and control an embodiment of the electromagnetic vibrator system.

FIG. 5 illustrates one embodiment of an electrical schematic of an inverter scheme that can be used to create AC power and control an embodiment of the electromagnetic vibrator system. As shown in FIG. 5, the inverter is generally comprised of a diode bridge and power transistors. In this embodiment, insulated-gate bipolar transistors (IGBT's) are used, though other power transistors as known in the art are contemplated with the scope of embodiments of the described invention. In one aspect, because of the large power requirements, the diodes and/or the power transistors may be operated in parallel. By operation of the power transistors, the control of the direction, and duration of current flow (and voltage polarity) through the load can be achieved.

Figure 6:
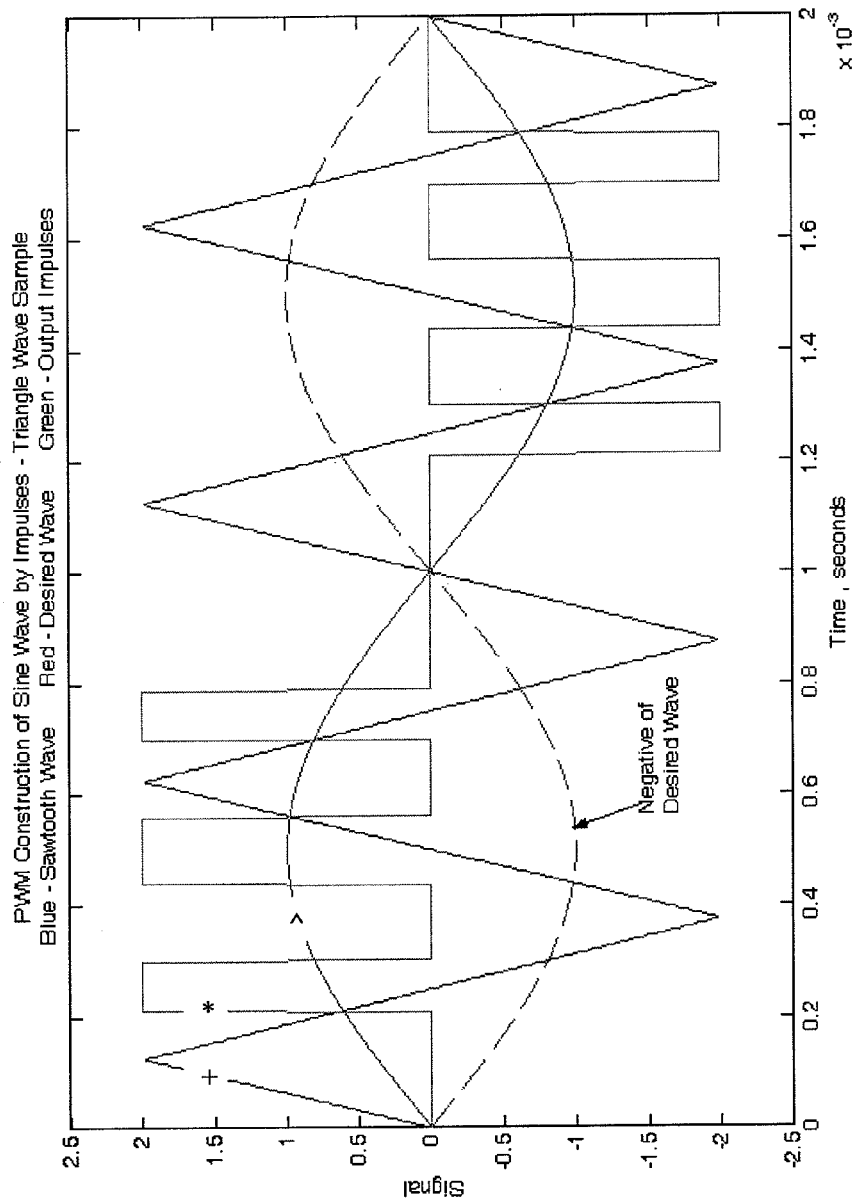
FIG. 6 illustrates a pulse-width modulated signal from the inverter can be combined with a sawtooth wave to produce a desired sinusoidal wave.
Figure 7A:
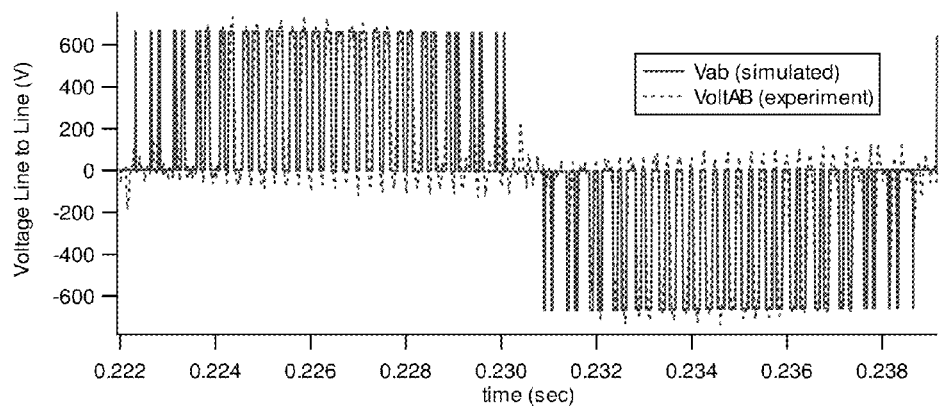
FIGS. 7A and 7B illustrate simulated and actual outputs from the embodiment of an inverter as shown in FIG. 5.
Figure 7B:
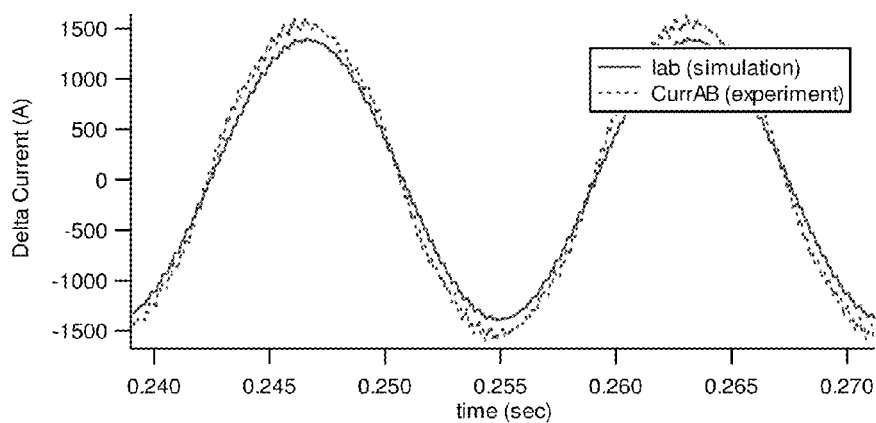

The output of the inverter of FIG. 5 can be used as an input to the armature winding of the transducer to control the operation of the transducer. For example, referring to FIG. 6 it can be seen that a pulse-width modulated signal (indicated by an *) from an inverter such as the one shown in FIG. 5 can be combined with a sawtooth wave (indicated by a + sign) to produce a desired sinusoidal wave (indicated by a ^). This sinusoidally-varying current can be used as an input to the transducer (armature winding), thus creating movement of the reaction mass of the transducer either up or down in a sinusoidal manner. Generally, the reaction of an embodiment of the electromagnetic transducer has higher fidelity to the input signal than can be achieved with a hydraulic shaker, thus fewer harmonics are imposed onto the vibroseis analysis. FIGS. 7A and 7B illustrates simulated and actual voltage and current outputs from the embodiment of an inverter as shown in FIG. 5.

In one embodiment as described herein, an electromagnetic vibrator system comprises an AC power source driven by an internal-combustion engine such as a diesel engine; a power unit capable of providing the required electrical drive to the electromechanical transducer; an electromechanical transducer system that converts the electrical drive into mechanical vibrations to be transferred into the ground; and control and sensing circuitry, that insures that the energy transmitted into the ground faithfully represents the desired output. In one aspect, a described embodiment of the system can output typical linear and nonlinear vibroseis sweeps as well as special random sweeps developed for multi-source acquisition recording, and output a sustained full ground force of 60,000 lbs.-force with a low end frequency defined at the −3 dB point of full ground force of approximately 4 Hz and a high end frequency defined at the −3 dB point of full ground force of at least 125 Hz. One embodiment of an electromagnetic vibrator system has the following parameters: low distortion; 4 Hz to 225 Hz capability; 60,000 lb-force output from 4 to 125 Hz; force taper from 125 Hz to 225 Hz; a reaction mass of approximately 16,500 lbs.; a base plate having a mass of approximately 4,707 lbs.; linear, non linear, and special random vibroseis sweeps; water (or other liquid) cooled for continuous operation; and a total stroke of approximately 6" to 6¾".

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric.

Simulation Modeling

To provide a tool for evaluating the electrical and mechanical performance of the system design, a simulation code was employed. The code was implemented using the Simulink™ software, as known to one of ordinary skill in the art, which includes electrical power block elements. Simulink™ employs a graphical programming environment, so that the simulation layout is apparent visually, and is used to illustrate the discussion below.

Figure 8A:
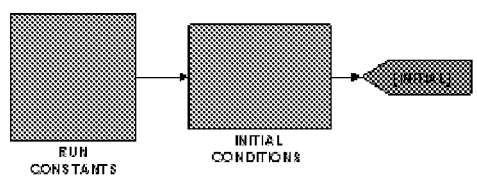
FIGS. 8A-8C illustrate a schematic of simulation model.
Figure 8B:
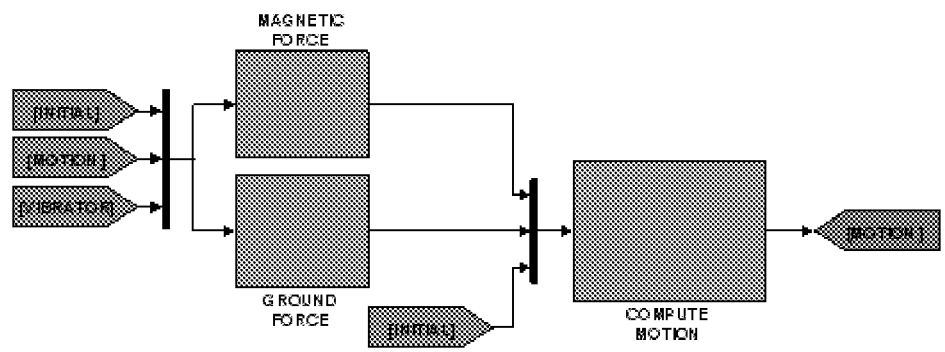
Figure 8C:
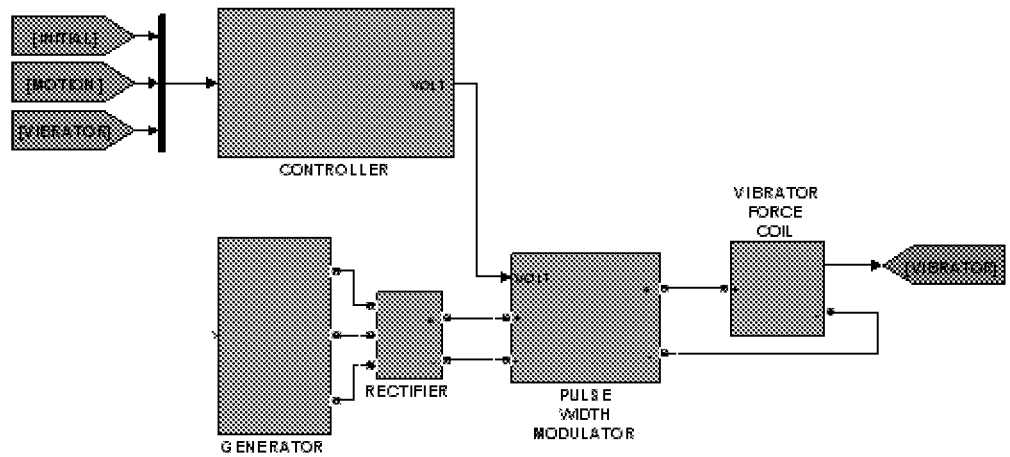

The structure of the simulation model is shown in FIGS. 8A-8C. The top modular blocks consist of one block wherein run parameters can be set: sweep time, start and end frequency, component masses, ground model spring constant and damping constant, etcetera. These constants are input to another block which establishes the initial mechanical conditions for the reaction mass and base plate.

Another section of the simulation (FIG. 8B) uses initial conditions along with information about the actual computed motion of the reaction mass and base plate, and electrical information about the vibrator, to compute electromagnetic force being applied, and also the force produced by the ground on the baseplate.

The ground model consists of a spring and damper, which are coupled to the base plate, and the total hold down mass. The spring constant used for simulations was set to either model a hard clay surface, or alternatively a softer response surface such as sand. The magnetic force module incorporates both the current in the force coil and the position of the force coil relative to the base plate. In this way the spatial dependence of force generation, which was provided by finite element analysis (FEA), was included in the model. In addition, a bi-directional spring model was employed to look for harmonic distortion effects. This model of the ground used a hard spring constant for the ground under compression, and a smaller constant when the ground was relieving from compression.

The third code section (FIG. 8C) includes the vibrator control module, the AC generator prime power, a rectifier which takes the generator power and charges a DC link capacitor. For the simulation, the link voltage is 650 V.

Referring to FIG. 8C, the controller sends a demand voltage signal to a PWM inverter which generates the demand voltage at the input of the vibrator force coil. The PWM module employs an algorithm which generates the true output voltage pulses without requiring use of actual switching thyristors. The PWM architecture is full H-bridge. Recent runs have used a 12 kHz switching frequency for the PWM.

The actual vibrator load was initially modeled as a simple inductor and resistor. More recent runs have employed a more complex ladder network of inductors and resistors, to capture the dynamics of the passive compensation scheme employed in the vibrator design. The electrical modeling is very detailed and incorporates non-linear elements for force production, as well as PWM switching frequency effects.

A. Vibrator Controller Description

Figure 8D:
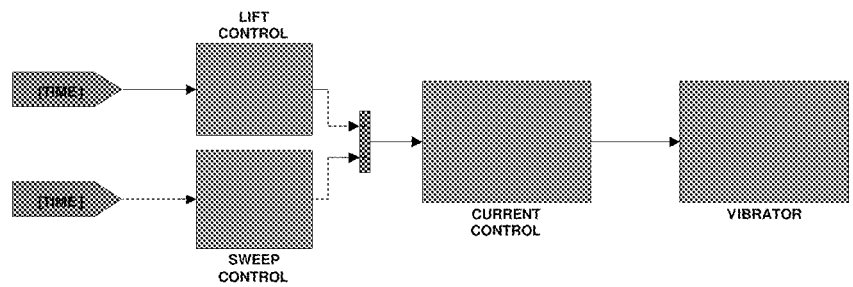
FIG. 8D illustrates a control diagram.

A block diagram of the control architecture is shown in FIG. 8D. It has a module which lifts the reaction mass from an initial rest position to a height at which the force coil is centered in the DC magnet air gap. This is the start point at which vibratory sweeps begin.

The lift module uses an open loop algorithm to generate the lift to the start position. That is, a lift position versus time profile is used to generate a force demand. The profile used has no initial or final velocity. It has the form:

$$\Delta X = \frac{\Delta X_0}{2}\{1 - \cos(\pi t/\Delta t)\} \text{ for } t < \Delta t \quad (1\text{-}1)$$

The lift module generates a current demand signal. Simulation results show that with this lift algorithm no start position over-shoot is produced. Once lift is completed, this module continues to generate a force demand which supplies enough force to compensate the gravitational force acting on the reaction mass. That is, it produces force to make the reaction mass neutrally buoyant.

Figure 8E:
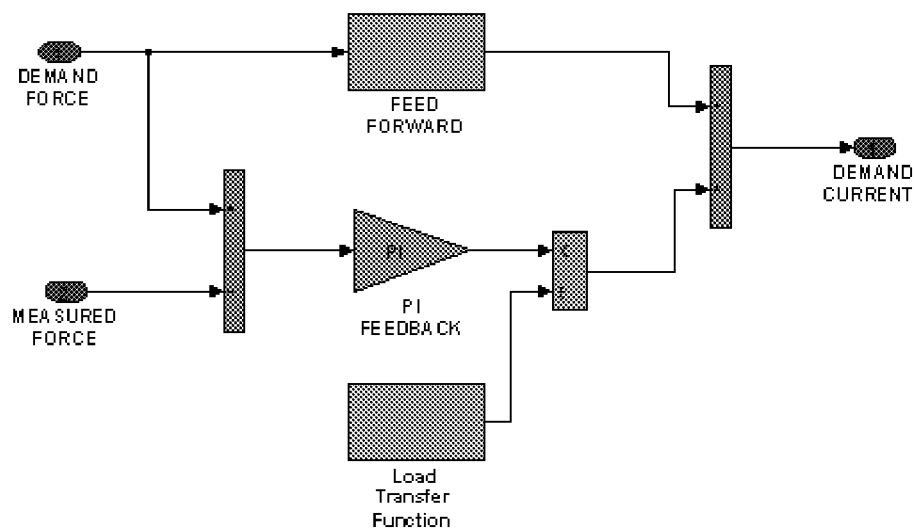
FIG. 8E illustrates a sweep force control diagram.

The sweep control module accepts as input a file containing demand force as a function of time. To date, these files have consisted of linear sweeps, random phase sweeps, and random amplitude sweeps. The module employs feed forward and feed back components to generate a current demand signal. A block diagram of the sweep control structure is shown in FIG. 8E.

The demand force directly feeds into the feed forward module. The difference between demand and actual force generates an additional current command by use of a position-integral controller. The two commands are summed to generate a total current command.

It has been found that position control of the reaction mass can be almost completely achieved by selecting the initial start position of the reaction mass and in addition imparting an initial velocity to the reaction mass during the 0.1 s before the demand force is initiated. The initial velocity in particular has been found to be very effective in limiting the range of motion. This is supported by analytic arguments. The initial position and velocity are easily determined by double integration of the demand force table. This is done just prior to the sweep to set the appropriate parameters in the controller. The total current commanded, that is the sum of the commands from the lift and sweep modules, is input to a current control module. Its architecture is similar to that in FIG. 8E. The command current generates a feed forward voltage command, and also a feed back voltage command. The total voltage command is output as the voltage demand signal sent to the PWM, which then generates the input voltage to the vibrator force coil.

B. Overall Performance

Figure 8F:
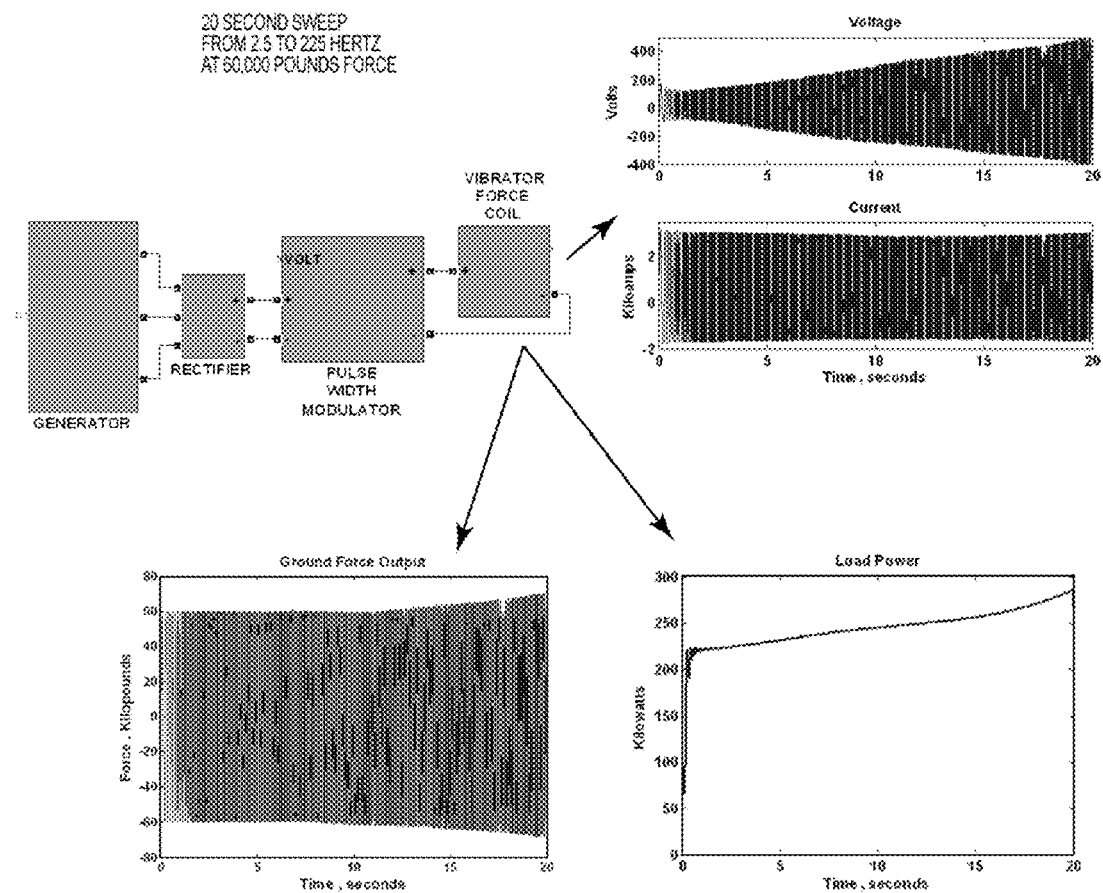
FIG. 8F illustrates vibrator electrical waveforms.

The simulation code was used to generate the electrical performance characteristics of the major system components: the generator, the PWM, and the vibrator. A linear sweep, of 20 s duration, was employed starting at 2.5 Hz and going to 225 Hz. The ground force amplitude was 60,000 lb. FIG. 8F shows electrical waveforms for the simulated vibrator.

Figure 8G:
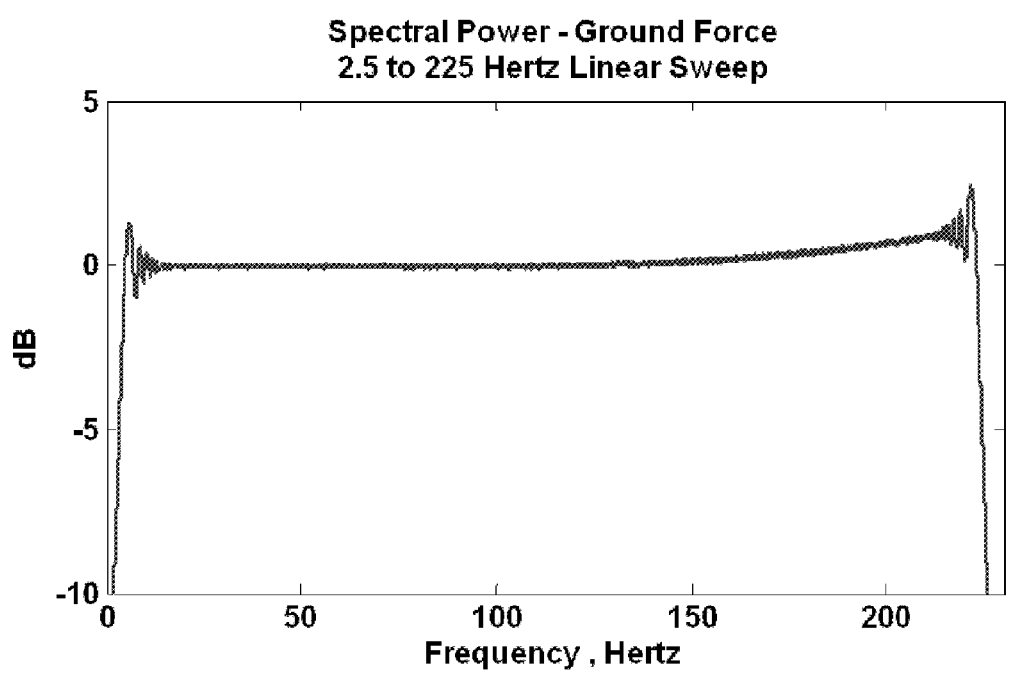
FIG. 8G is a graph of spectral power density.

The load power rises to nearly 300 kW at the end of the sweep. The peak current level is less than 3.2 kA at all times, and the peak voltage 500 V. The ground force spectral power density is shown in FIG. 8G.

The ground force increases with frequency, reflecting the gain characteristics of the force controller. This is correctable with modifications to the controller.

The force control gain settings lead to more output than demanded at higher frequency. This causes the output power to be about 1 dB higher at 200 Hz. The spectrum is fairly flat, and shows the power to be down less than 3 dB at 4 Hz.

Figure 8H:
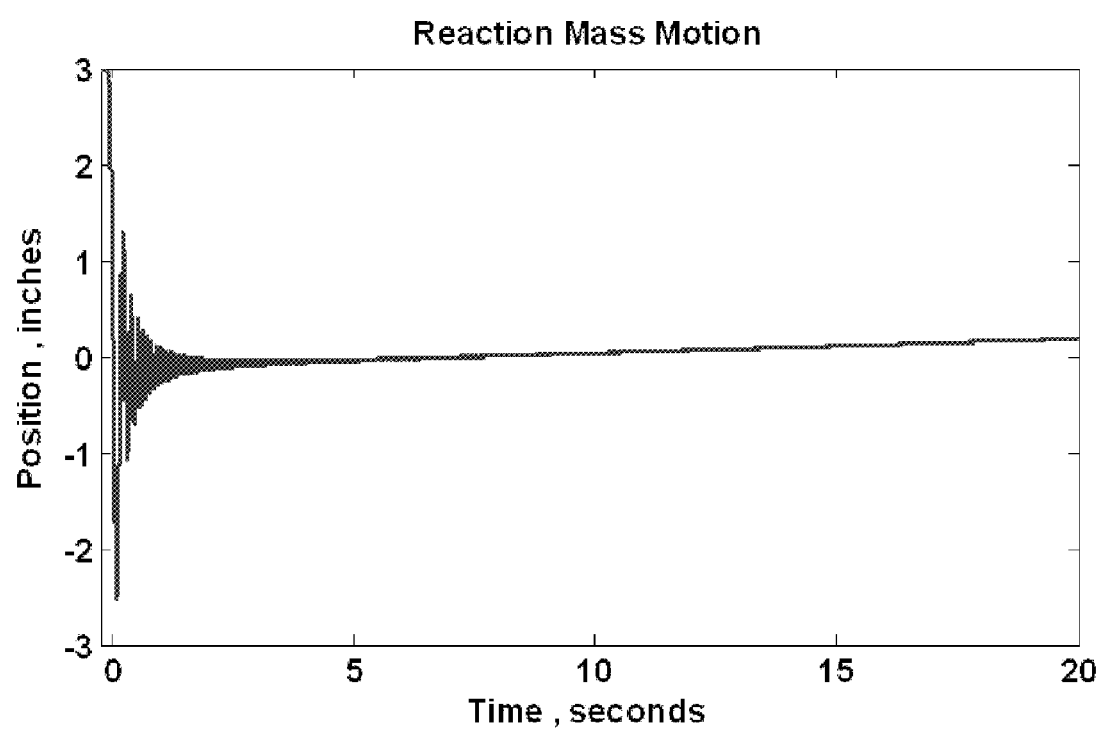
FIG. 8H is a graph of reaction mass motion.

The motion of the reaction mass for this sweep is shown in FIG. 8H. The total range of motion is slightly less than 6 inches. The passive motion control using an initial position and velocity impulse keeps any late time drift of the reaction mass small.

C. Sweep Variation

An advantage of embodiments of an electromagnetic vibrator is its ability to track complex demand profiles with good fidelity. The case of a linear sweep was discussed above. More complex waveforms can also be utilized.

In one aspect, two different types of demand waveforms were simulated. One was a profile in which the wave phase was changed randomly in time (a random phase sweep). The other was a profile in which the wave amplitude was changed in a random manner (a random amplitude sweep).

Figure 8I:
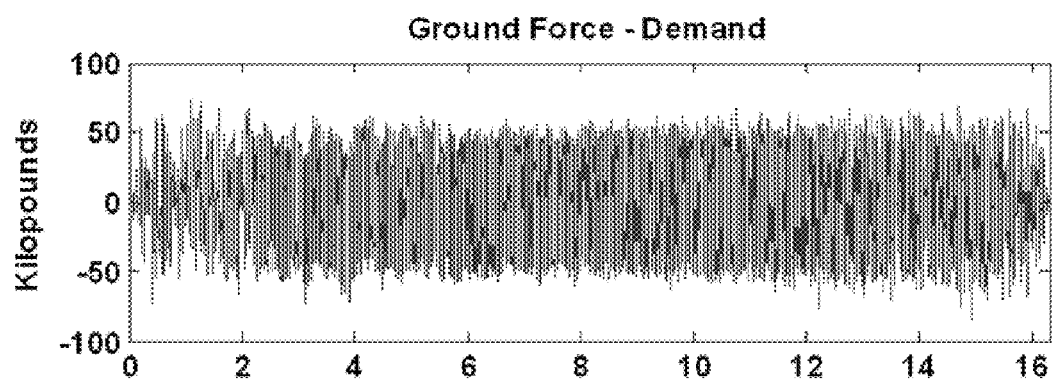
FIGS. 8I and 8J are graphs of random phase ground force comparison.
Figure 8J:
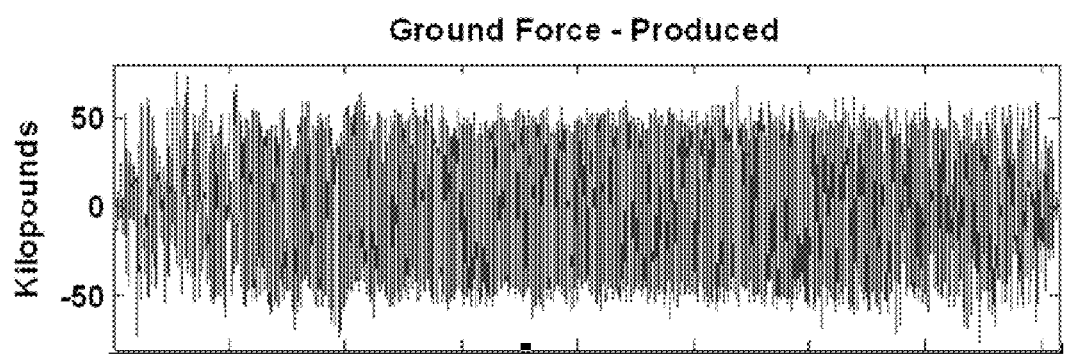
Figure 8K:
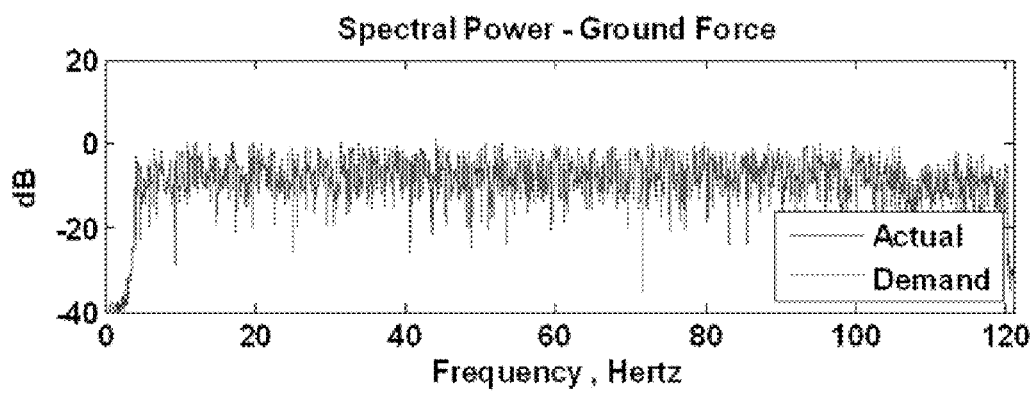
FIGS. 8K and 8L are illustrations of random phase spectral power comparison.
Figure 8L:
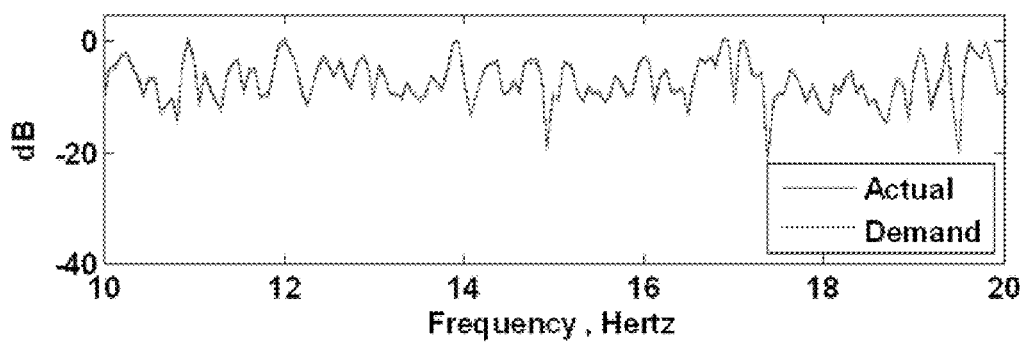
Figure 8M:
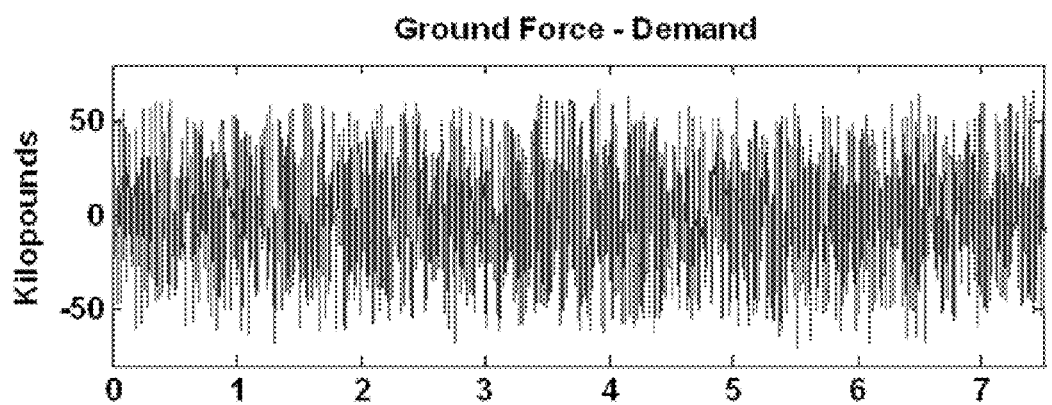
FIGS. 8M and 8N are illustrations of random amplitude ground force comparison.
Figure 8N:
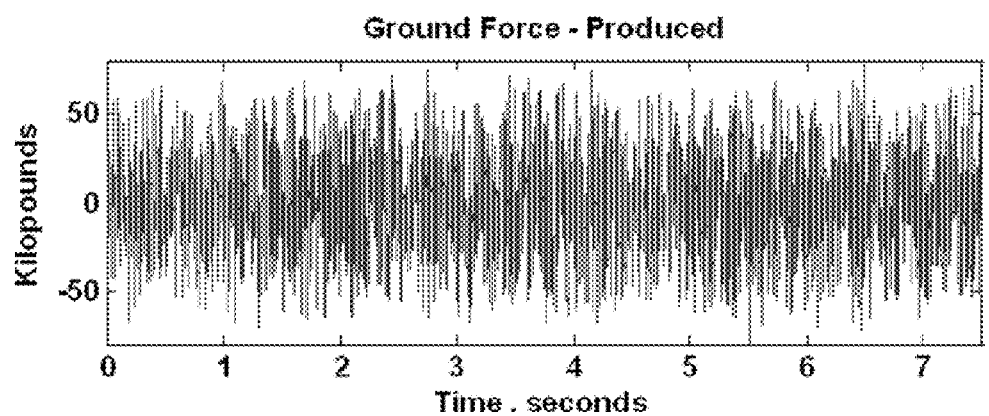
Figure 8O:
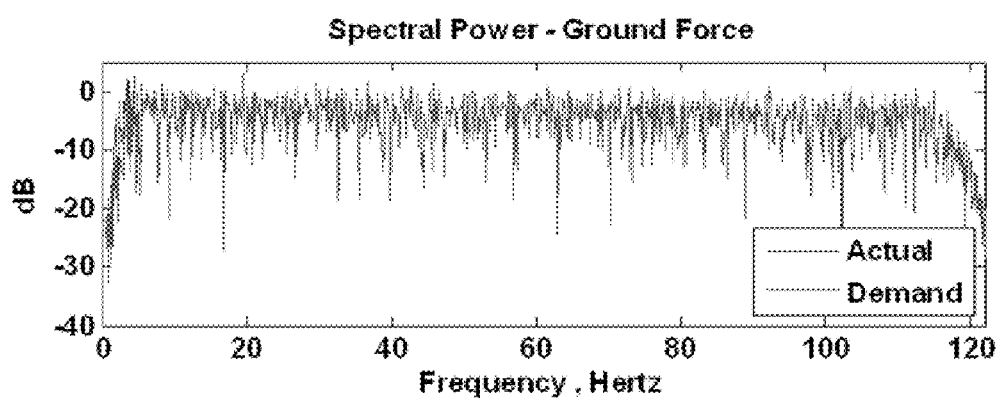
FIGS. 8O and 8P are illustrations of random amplitude spectral power comparison.
Figure 8P:
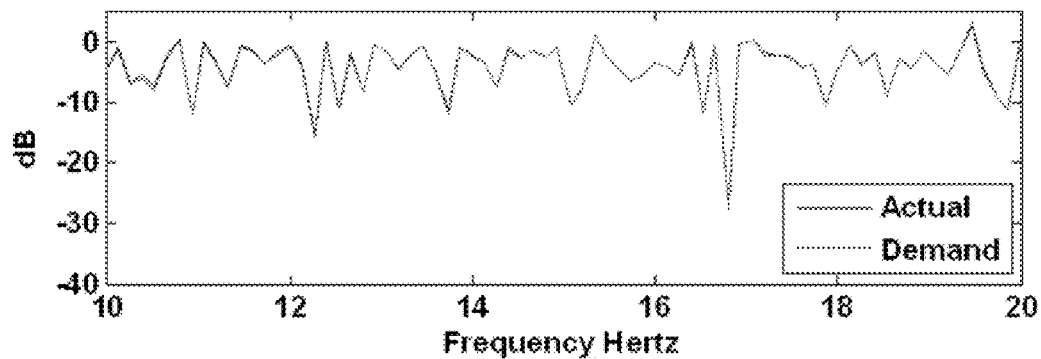

For the random phase sweep, the peak amplitude was held to about 60,000 lb. FIGS. 8I and 8J show plots of demand ground force and actually produced ground force, respectively. FIGS. 8K and 8L show a comparison between spectral power for the two waveforms—demand and actual. A smaller frequency range is shown in FIG. 8L to indicate the good tracking of the vibrator output to demand signal.

FIGS. 8M and 8N and FIGS. 8O and 8P show similar results for the random amplitude case. Again the spectral power comparison is good.

To obtain information on how ground model non-linearity might generate harmonic distortion in the vibrator ground force output, a bi-directional spring model was employed (described above). The variation in spring constant was set at 4:1. The spring constants were also set to emulate sand conditions, i.e. a softer spring constant. Then sweeps at 40,000 pounds force were simulated at fixed frequencies. That is, the output was set to be monochromatic. Frequency values of 6, 25, and 125 Hz were simulated.

Figure 8Q:
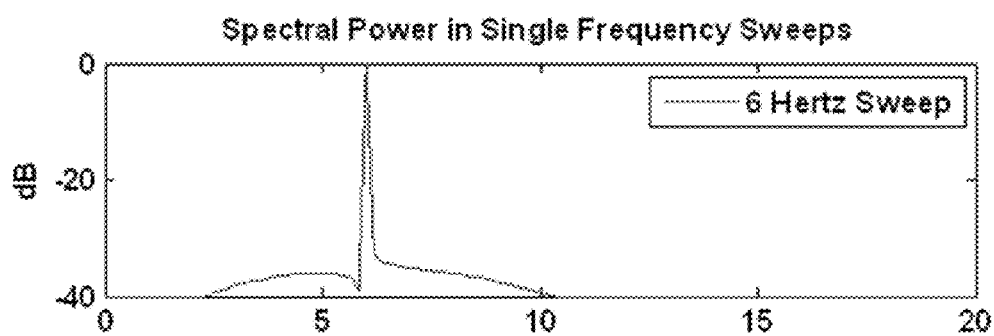
FIGS. 8Q, 8R and 8S are illustrations of spectral power plots for fixed frequency sweeps.
Figure 8R:
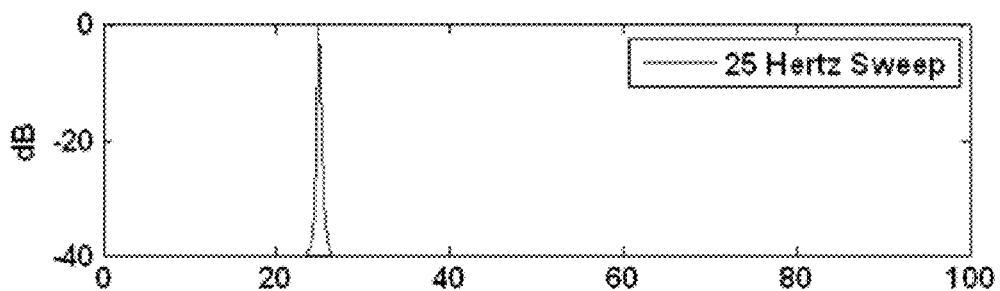
Figure 8S:
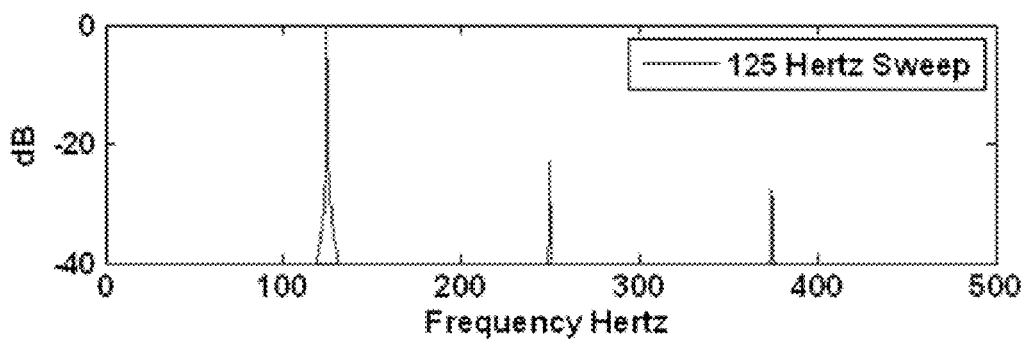

FIGS. 8Q, 8R and 8S show spectral power plots for all three cases. No harmonics are observed in the sweeps at 6 and 25 Hz. Very low amplitude $2^{nd}$ and $3^{rd}$ harmonics were seen in the 125 Hertz case. The THD is essentially zero for all runs.

Magnetic Analysis and Device Optimization

A. Geomagnetic Shaker

Figure 9A:
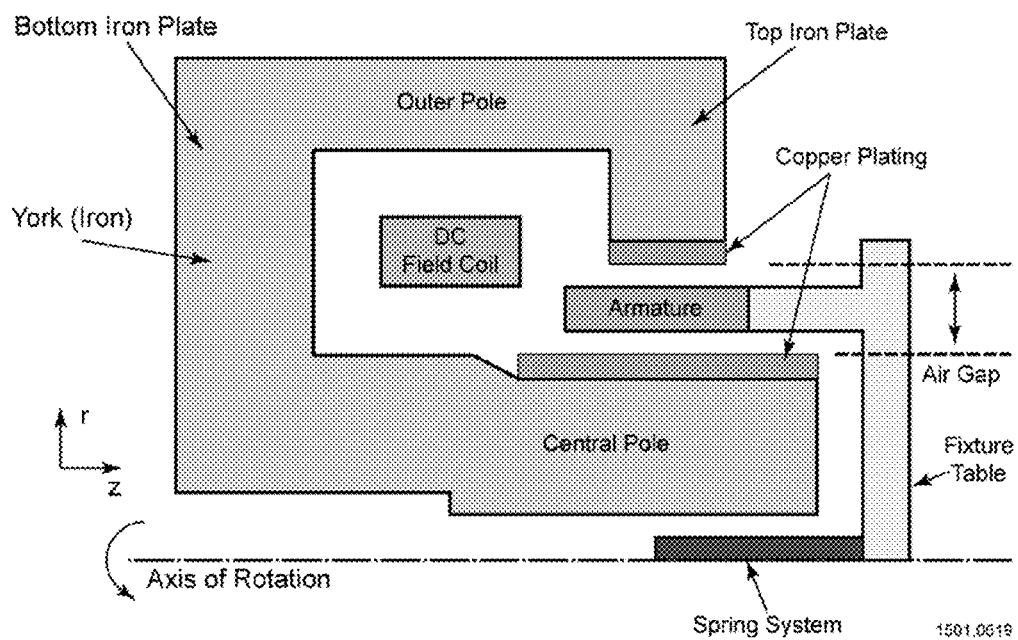
FIG. 9A is an illustration of an electromagnetic shaker suitable for a large stroke.

A geomagnetic shaker should have the ability to shake a large mass through a large stroke. FIG. 9A shows an embodiment of a design suitable for this task [2-4]. In one embodiment, there can be a DC power supply for the field coil and a separate PWM power supply for the armature coil that produces AC. In one aspect, a DC winding in the armature winding produces lift, though in other aspects a DC component from the PWM passes through all armature coils to produce lift. In another embodiment, the PWM produces a DC offset of the AC armature current to provide the lift. In one aspect, there is only one armature circuit and all coils are in series. The field coil carries dc current, and the armature carries both ac and dc current. The voltage demand on this coil can climb unacceptably unless one of two measures is adopted. The first is to place a passive copper (annotated copper plating) band on either side of the armature coil. The induced currents are essentially opposite in phase to those in the armature. The second option is to wind a second winding on the central and outer pole which is connected in series with the armature winding. This so-called active compensator is effective only when it shadows the armature coil. Thus it has the two negative features of not being able to compensate when longer strokes are involved and the added construction difficulty of running armature current to the same structure that the field coil is mounted to. There is actually a more fundamental aspect of this trade in considering whether to use a passive versus an active compensator, having to do with a theoretical limit.

B. Passive Compensation

Figure 9B:
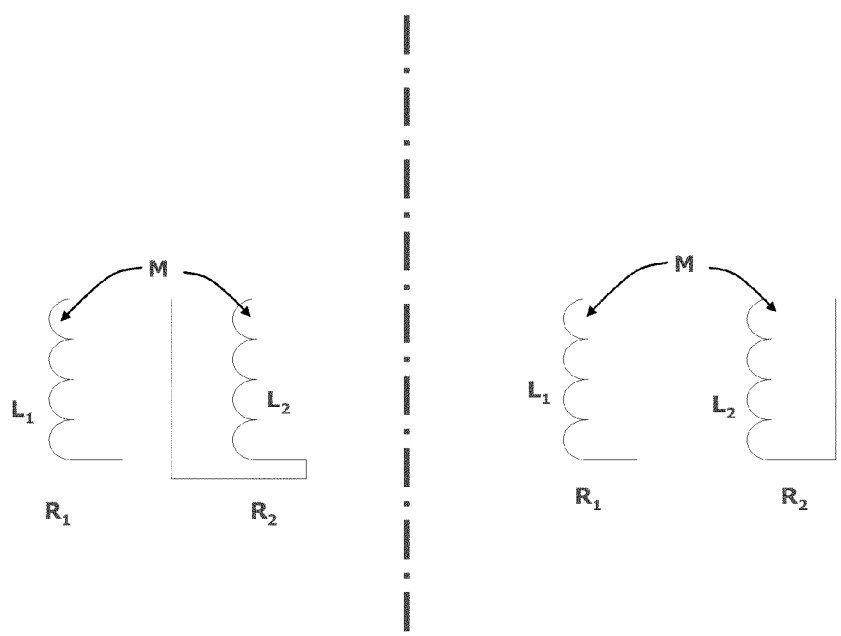
FIG. 9B is an illustration of connecting two coils in anti-parallel will yield a larger inductance at higher frequency than shorting one of the two coils.

Passive compensators can have a lower inductance at higher frequency than active compensation. FIG. 9B shows a thought experiment that can be performed on two coils to defend this statement.

To simplify this analysis, consider the case where $L_1=L_2$ and $R_1=R_2$. At radian frequency $\omega$, the voltage across the two coils in FIG. 9B(a) is $$V=2\cdot(j\omega L_1+R_1)i_1+2j\omega M i_1. \quad (2\text{-}1)$$

Let $M=k\sqrt{L_1 L_2}$. The inductance for case (a) is $$L_{eq} = \Im\left(\frac{V}{\omega i_1}\right) = 2L_1(1+k). \quad (2\text{-}2)$$

The shorted coil of case 9B(b) requires a prediction of current. Since it is shorted, $$(j\omega L_2+R_2)i_2+j\omega M i_1=0. \quad (2\text{-}3)$$

Solving for $i_2$, $$i_2 = -\frac{j\omega M i_1}{j\omega L_2 + R_2}. \quad (2\text{-}4)$$

Inserting (2-4) into the voltage equation for $V_1$ gives $$V_1 = j\omega L_1 i_1 + \frac{\omega^2 M^2 i_1}{j\omega L_2 + R_2}. \quad (2\text{-}5)$$

Writing (2-5) in terms of real and imaginary parts gives $$V = j\omega i_1\left(L_1 - \frac{\omega^2 M^2 L_2}{R_2^2 + \omega^2 L_2^2}\right) + \frac{R_2 \omega^2 M^2 i_1}{R_2^2 + \omega^2 L_2^2} + R_1 i_1. \quad (2\text{-}6)$$

The first term in parenthesis on the right-hand side of (2-6) is the equivalent inductance of this circuit. At high frequency $$\omega \gg \left(\frac{R_2}{L_2}\right),$$

$$L_{eq} \approx L_1(1-k^2) \quad (2\text{-}7)$$

Consider a coupling coefficient with $k=-0.95$. The anti-series solution yields $L_{eq}=0.1\ L_1$. The passive shorted coil yields $L_{eq}=0.0975\ L_1$. In the high frequency limit, the passive compensator always requires less voltage since it has the lower inductance. The two are equal when $k=1$. Note that $(1-k^2)=2(1+k)$ when $k=-1$. For coupling coefficients $-1<k<0$, the passive compensator always has the lower inductance.

C. The Role of the Compensator

Figure 9C:
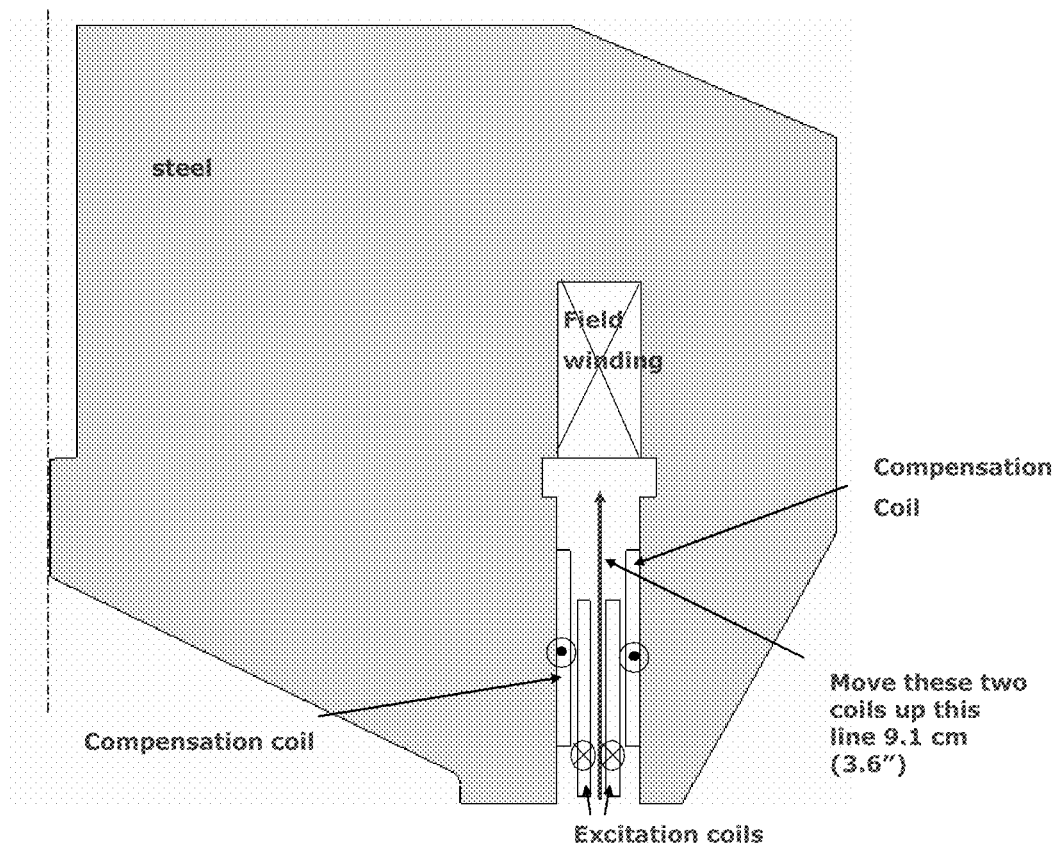
FIG. 9C is an illustration of geometry for generating lift force from a fixed field winding on the steel structure.
Figure 9D:
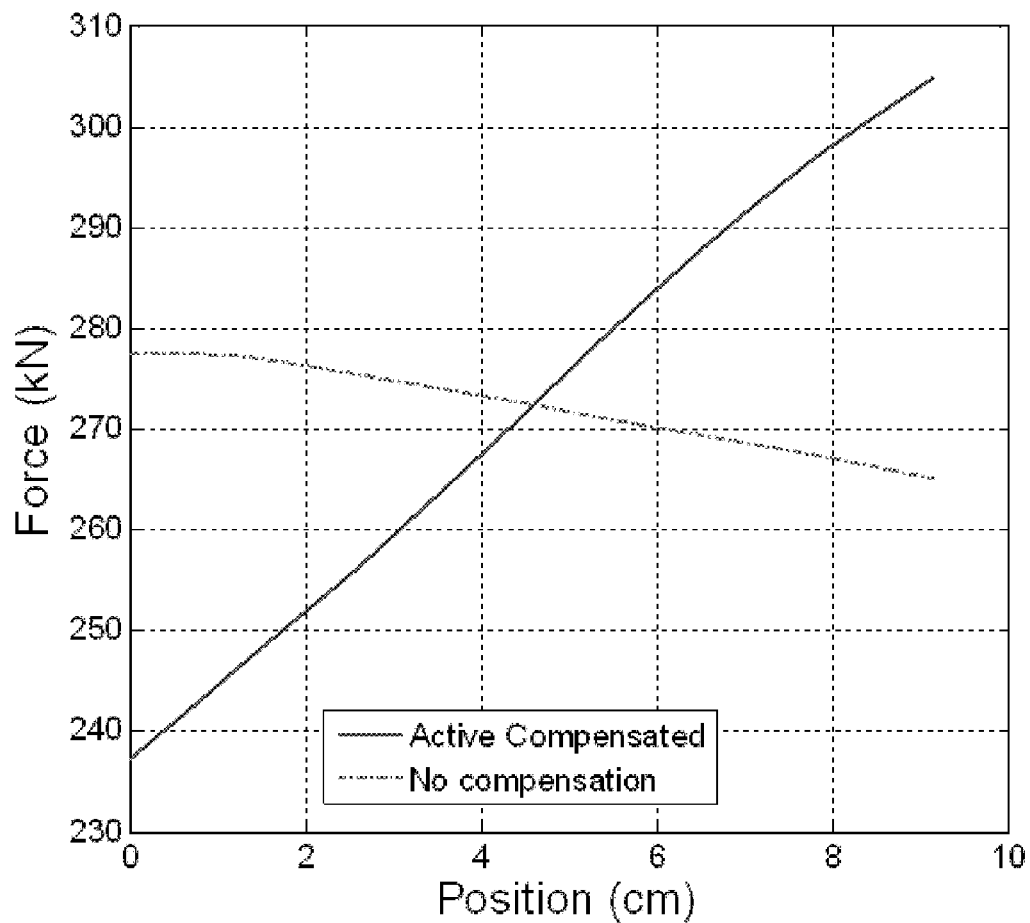
FIG. 9D is an illustration of forces generated when the currents are creating lift for various positions along the highlighted segment in FIG. 9C.
Figure 9E:
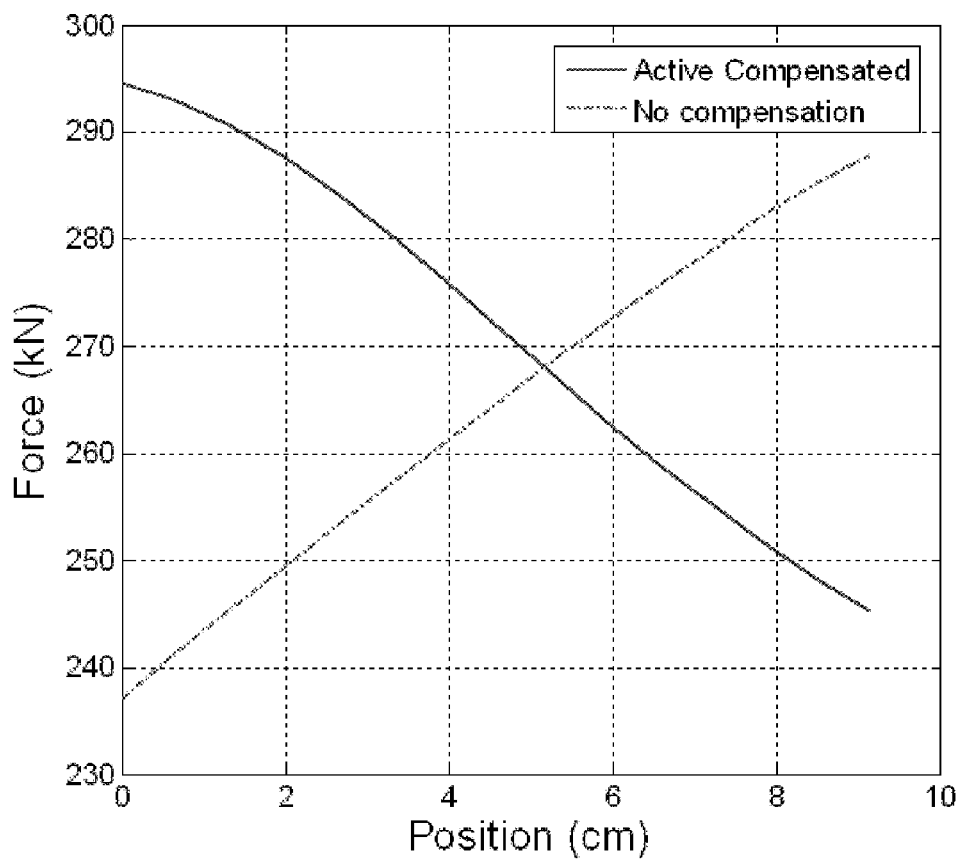
FIG. 9E is an illustration of forces generated when the currents are creating a down force for various positions along the highlighted segment in FIG. 9C.
Figure 9F:
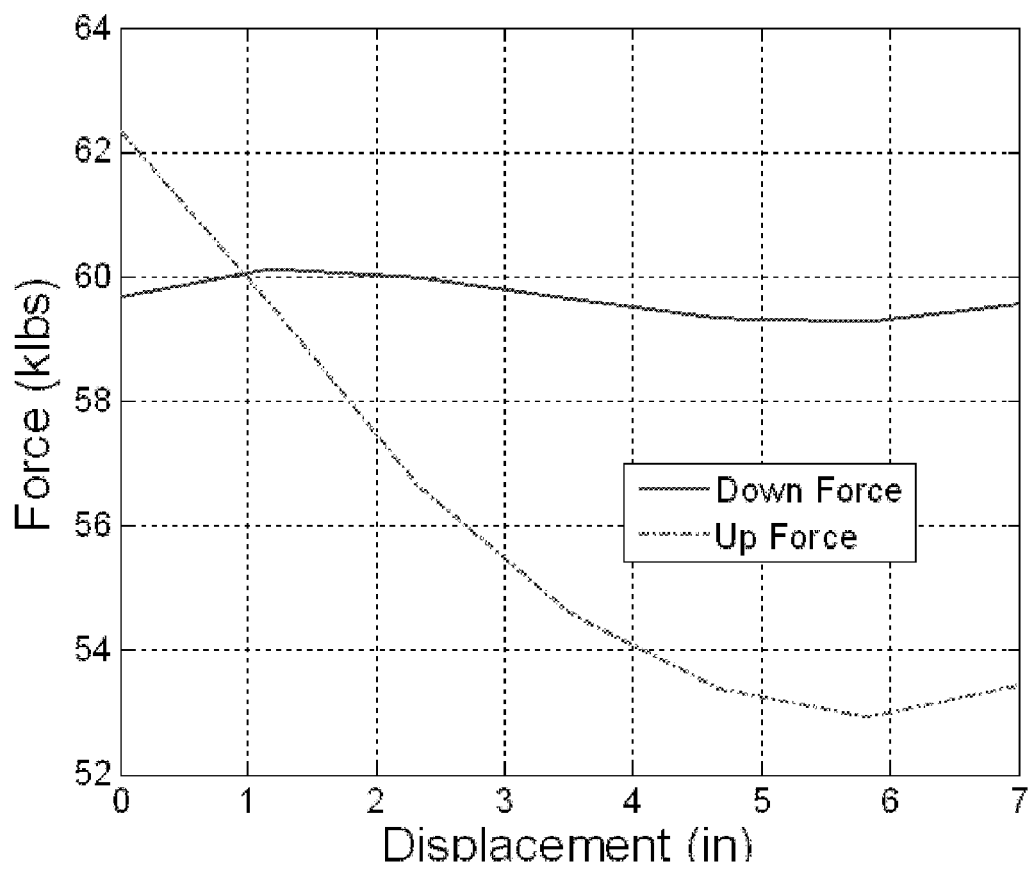
FIG. 9F is an illustration of force variation with displacement for constant current.

Consider the geometry shown in FIG. 9C. What is the effect of the compensation coil on force if the center two excitation coils are allowed to move vertically up the open channel, along the highlighted segment? Do this with the compensated coils activated so that they carry exactly the same current in the opposite direction. Repeat the experiment when the compensation coils are unexcited (removed). FIG. 9D shows that the uncompensated case has the flatter force curve versus position. Next, reverse the current in the excitation and compensation coils so that the force is downward. FIG. 9E and FIG. 9F show that the compensation winding reverses the slope of the force versus position curve. An important point is that the mean of the compensated and uncompensated forces are identical to within three decimal places.

D. Design Geometry

Figure 9G:
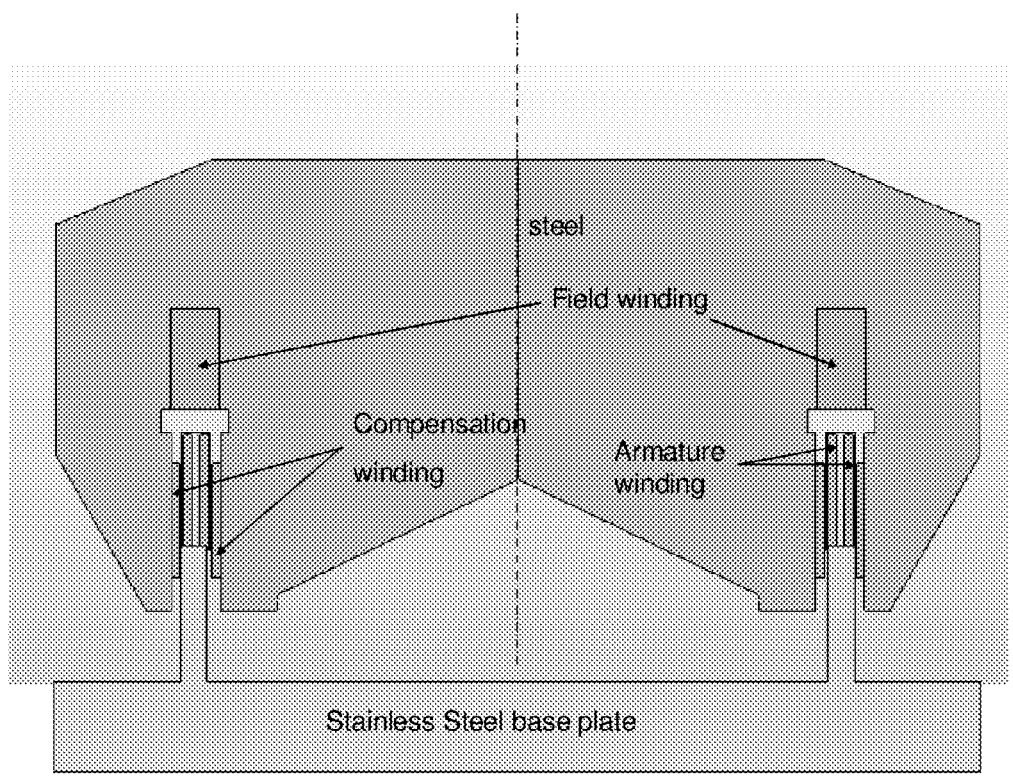
FIG. 9G is an illustration of baseline design geometry.

The primary difference between a geomagnetic seismic shaker (FIG. 9G) and an electromagnetic shaker affixed to a shaker table is that the field coil moves in the seismic shaker. An example of design criterions are as follows: ac force generated=267 kN (60 klb); dc force generated=75.6 kN (17 klb); total force generated on the down stroke for the armature=342.5 kN (77 klb); Weight <7.73 kg (17 klb); Stroke allowance 17.14 cm (6.75 in.); and Power <448 kW (600 kW).

Figure 9H:
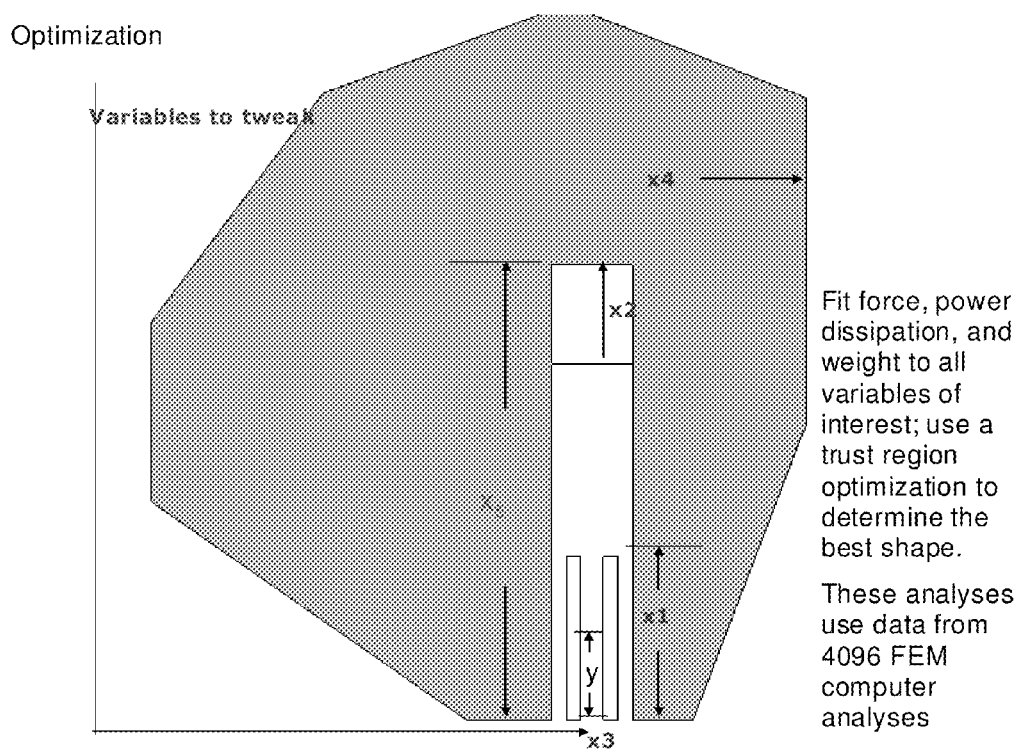
FIG. 9H is an illustration of variables to perturb during the optimization.

The design variables as shown in FIG. 9H should be chosen carefully to achieve these objectives. In addition to the variables shown, the force under maximum excitation must be computed in various positions y to ensure that the force objectives are met as an average over the entire displacement range. The down stroke force condition dominates in this design. The down stroke condition is accompanied by a sizeable reluctance force to pull the armature up further in the slot. This force is nearly constant and close to 177 kN (40 klb) to pull the armature into the field coil regardless of the sign of the armature current.

The optimization is approached using a trust region optimization algorithm. Sequential quadratic programming (SQP) algorithms are among the more powerful deterministic methods that use gradient information [2-5, 2-6]. The response surface method attempts to build an n dimensional surface of the problem and then examines how that surface varies with the system unknowns [2-7]. Something akin to the response surface method in [2-8] is used to determine the right shape, minimizing the power dissipation subject to the constraints listed previously.

Figure 9I:
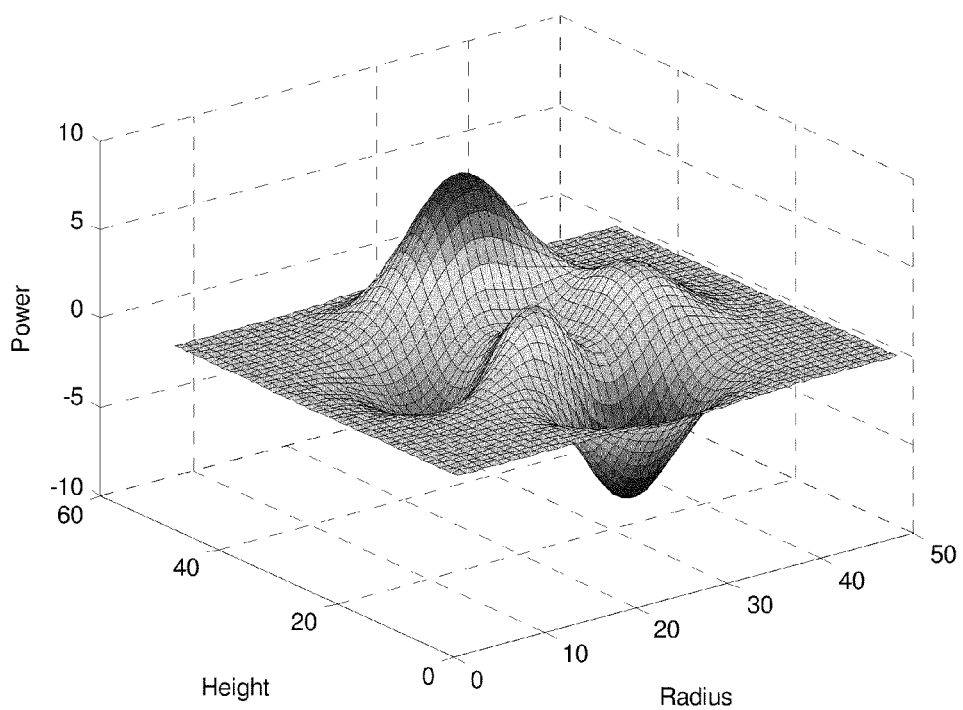
FIG. 9I is an illustration of a three-dimensional surface is constructed to link the optimization variables to the problem geometry.

FIG. 9I shows a three-dimensional surface linking power to two of the variables. In reality a five-dimensional surface is constructed in this optimization for each of the key variables, source power, weight, and force. This five-dimensional spline fit represents the data; it can also be used to compute the derivatives for all the variables [2-9]. Knowing the gradient information allows for a fast and accurate determination of minimum power satisfying the constraints [2-10, 2-11, 2-12].

Each of the five variables annotated in FIG. 9H is varied in a nested loop. Force has to be computed at a minimum of four positions. As far as the finite element analysis is concerned, these four positions serve as a sixth variable. Suppose that the variables are perturbed about four positions. The number of finite element analyses required would be:

$$\#\text{analyses}=4^6=4096. \quad (2\text{-}8)$$

Only negative forces (forces to increase the separation of the armature and field winding) are examined at the top of the stroke and only positive forces at the bottom of the stroke. This is close to what is observed in simulation.

Figure 9J:
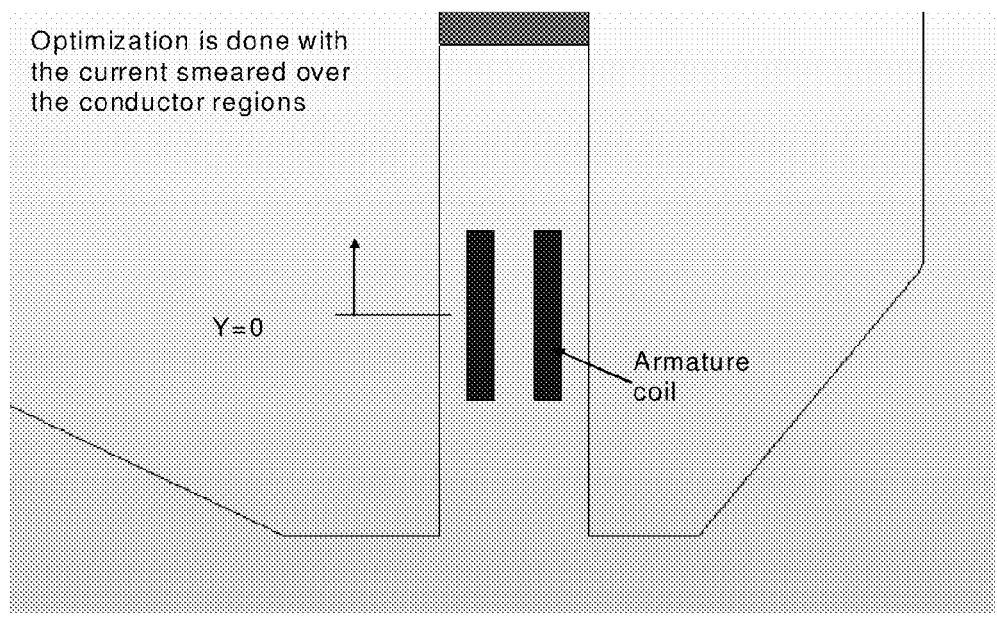
FIG. 9J illustrates magnetic optimization requires smearing the current over a region.

Current density is central to the solution of the nested set of problems. This density is smeared over the current carrying regions shown in FIG. 9J.

E. Current Density

Onsite testing has shown that a 3.175 mm (0.125 in.) diameter copper tube with a 1.58 mm (0.063 in.) diameter water cooling hole can sustain 200 A steady state. This corresponds to a current density of $$J_{cu} = \frac{200 \cdot 4}{\pi(1/64 - 1/16^2)} \cdot 39.37^2 = 3.368 \cdot 10^7 \text{ A/m}^2. \quad (2\text{-}9)$$

The conductors for the field and the armature are targeted at 12.7 mm (0.5 in.) square with a 6.35 mm (0.5 in.) cooling hole. The area open to copper is $$A_{cu} = 0.5^2 - \pi\left(\frac{1}{4}\right)^2 / 4 = 0.201 \text{ in}^2. \quad (2\text{-}10)$$

For the field windings they can be insulated with a 10 mil wrap of glass followed by a 2 mil wrap of Kapton™. So the equivalent current density in the field winding is $$J_{field} = J_{cu}\frac{A_{cu}}{0.524^2} = 2.464 \cdot 10^7 \text{ A/m}^2. \quad (2\text{-}11)$$

The armature current density must account for the tie dependence of the waveform. A steady state base force $f_b$ equal to the weight of the unit (75.6 kN (17 klb)) must be superimposed on an oscillating component capable of achieving a target force $f_t$ (267 kN (60 klb)). The current density in Eq. (2-9) is a steady state value. What current density in the armature $J_{arm}$ will deliver the same heating in the copper? That value is determined by solving the equation $$J_{cu}^2 \Delta t = \int_0^{\Delta t} \left[ J\left\{\left(\frac{f_b}{f_b+f_t}\right) + \left(\frac{f_t}{f_b+f_t}\right)\sin(\omega t)\right\}\right]^2 dt. \quad (2\text{-}12)$$

Average loss is of interest. The integration needs to be performed over an integral number of periods. When this is done, the allowed current density that exactly equals the loss of a dc coil carrying $J_{cu}$ is determined $$J_{arm} = \frac{J_{cu}}{\sqrt{\left(\frac{f_b}{f_b+f_t}\right)^2 + \frac{1}{2}\left(\frac{f_t}{f_b+f_t}\right)^2}} = \frac{J_{cu}}{\sqrt{\beta^2 + \frac{1}{2}(1-\beta)^2}}, \quad (2\text{-}13)$$

where $$\beta \equiv \frac{f_b}{f_t+f_b}.$$

Figure 9K:
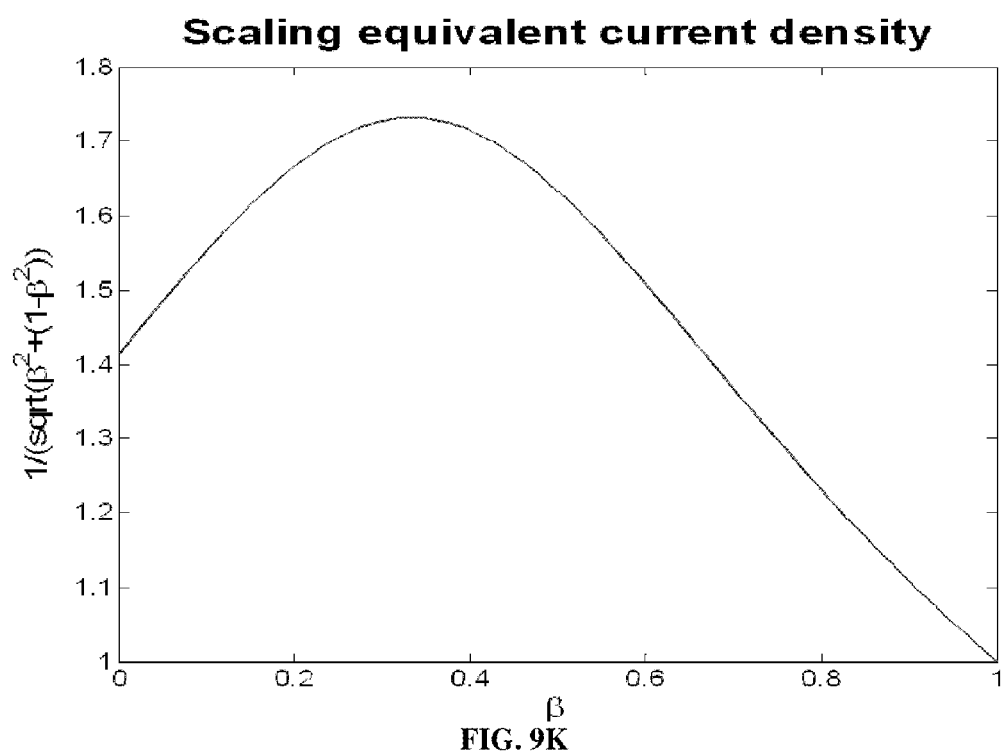
FIG. 9K illustrates current density multiplier as a function of β where β represents the proportion of the total force load made up by the dc (steady state weight) component.

The multiplier on $J_{cu}$ is an interesting number. When the base weight (force) is a large proportion of the total force, this multiplier goes to unity. When it is a small proportion of the total weight, i.e., the desired force is nearly sinusoidal, this multiplier goes to $\sqrt{2}$. FIG. 9K shows how this multiplier changes beginning with a 100% sinusoidal load to a purely dc load at $\beta=1$. The interesting point is the maximum value ($\sqrt{3}=1.73$). The large multiplier results due to the combined sinusoidal effect with an offset. This density must be reduced by the packing density as in Eq. (2-11) to get an equivalent modeling density. Since 20 mil insulation wrap followed by a 2.5 mil Kapton™ is envisioned, the equivalent peak current density should be $$J_{arm} = \frac{J_{cu}}{\sqrt{\beta^2 + \frac{1}{2}(1-\beta)^2}} \frac{A_{cu}}{0.59^2} = 3.275 \cdot 10^7 \text{ A/m}^2. \quad (2\text{-}14)$$

F. Power Calculations

The current densities listed in Eq. (2-11) and Eq. (2-14) are apparent current densities that account for fields and forces. The common expression for computing power is $$P = (JA)^2 \frac{\ell}{\sigma A} = J^2 \frac{vol}{\sigma}. \quad (2\text{-}15)$$

The apparent volume $V_{ap}$ used in a field calculation is larger than the actual copper volume $V_{cu}$. This enters as a correction which requires increasing the apparent power demand. For the field, the power dissipated in the field is $$P_{field} = J_{field}^2 \frac{V_{ap}^2}{\sigma V_{cu}} = J_{cu}^2 \frac{V_{ap}}{\sigma} \cdot \frac{V_{cu}}{V_{ap}}. \quad (2\text{-}14)$$

where $J_{field}$ is defined in Eg. (2-11). A similar correction must be applied on the armature power. It is easier to use $J_{cu}$ in this calculation since the equivalent $J_{arm}$ was defined to match it.

$$P_{arm} = J_{cu}^2 \frac{V_{ap}}{\sigma} \cdot \frac{V_{cu}}{V_{ap}}. \quad (2\text{-}17)$$

Here $V_{ap}$ is the apparent armature copper volume. This is of course the loss ignoring skin proximity effect. These effects are considered after the optimization since it is simply not practical to add this complexity to the optimization procedure.

G. Optimization Results

Figure 9L:
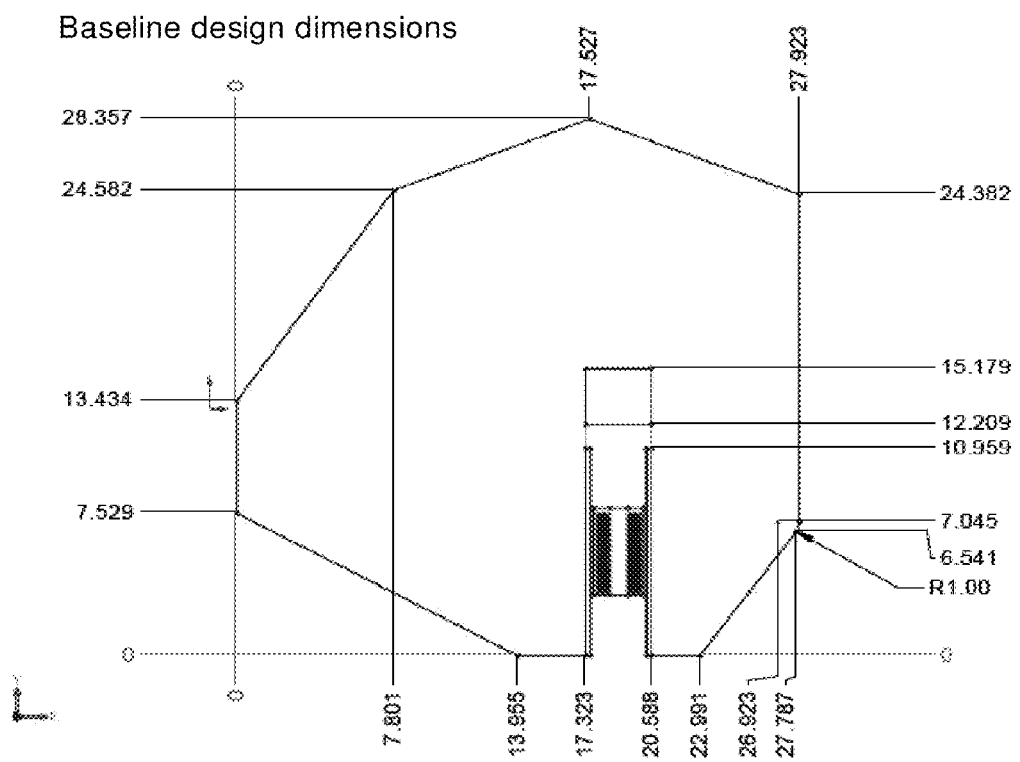
FIG. 9L illustrates optimized design dimensions.
Figure 9M:
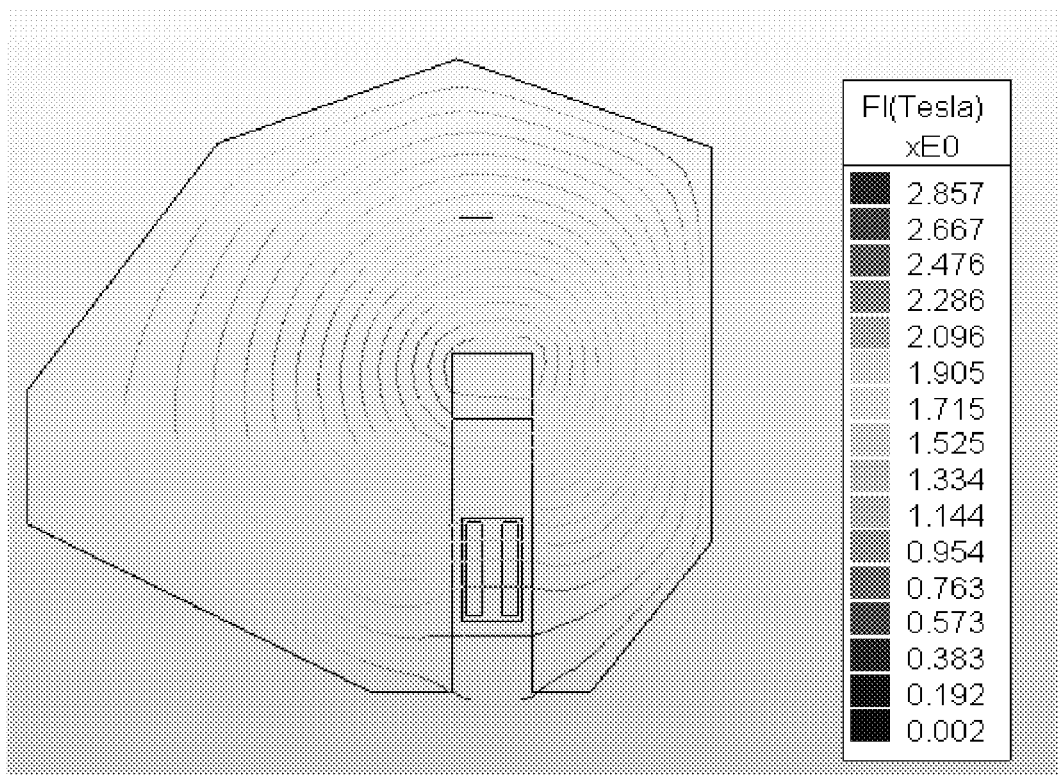
FIG. 9M illustrates a field plot for the optimized design at maximum excitation.

FIG. 9L shows an embodiment of an optimal design minimizing power dissipation within the constraints. Homogeneity in the field plot shows that the steel is used nearly to the maximum throughout FIG. 9M.

Figure 9N:
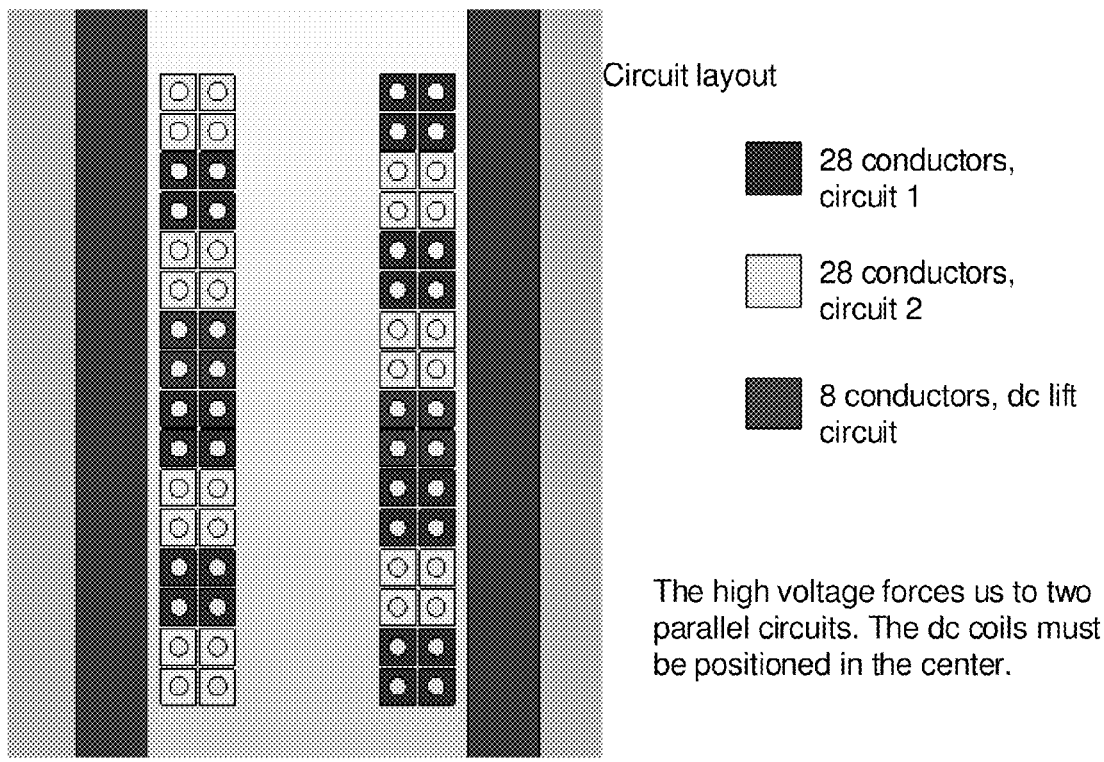
FIG. 9N illustrates an armature coil layout using two parallel circuits.

The optimized armature cutout closely fits a series of 6.35 mm (0.25 in.) conductors as shown in FIG. 9N. The voltage limitations of the inverter electronics suit two parallel circuits more than one series circuit. The staggering registered in this layout is an attempt to balance the induced voltages.

There are two ways to introduce the dc component of current required in the armature to achieve static lift. The first is to ask the inverter to supply that added dc component. The second is to actually excite a subset of the inverter coils to carry only dc. Since dc power supplies are cheaper than ac inverters, this second option saves money.

Figure 9O:
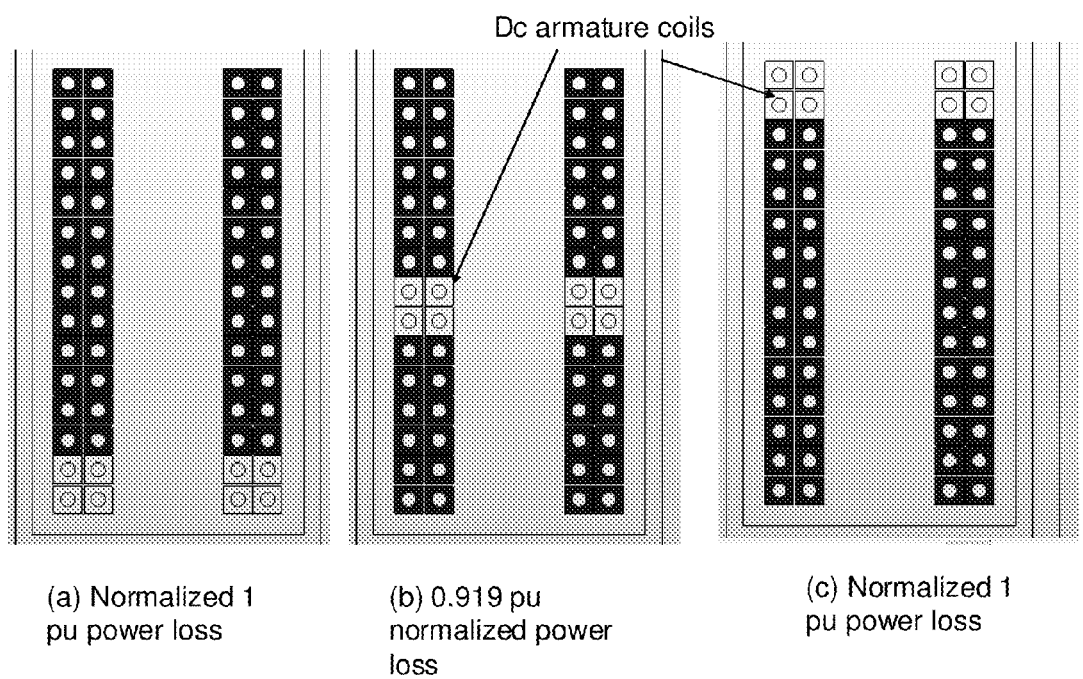
FIG. 9O illustrates dc lift coils are best positioned in the center of the armature stack.

Assuming this option is adopted, the question as to where to place the dc armature coils surfaces. The ac excited armature coils induce parasitic losses in the dc sub-conductors. The simulation summarized in FIG. 9O shows that a power saving of 10% is realized if the dc coils are positioned close to the center of the armature stack.

Figure 9P:
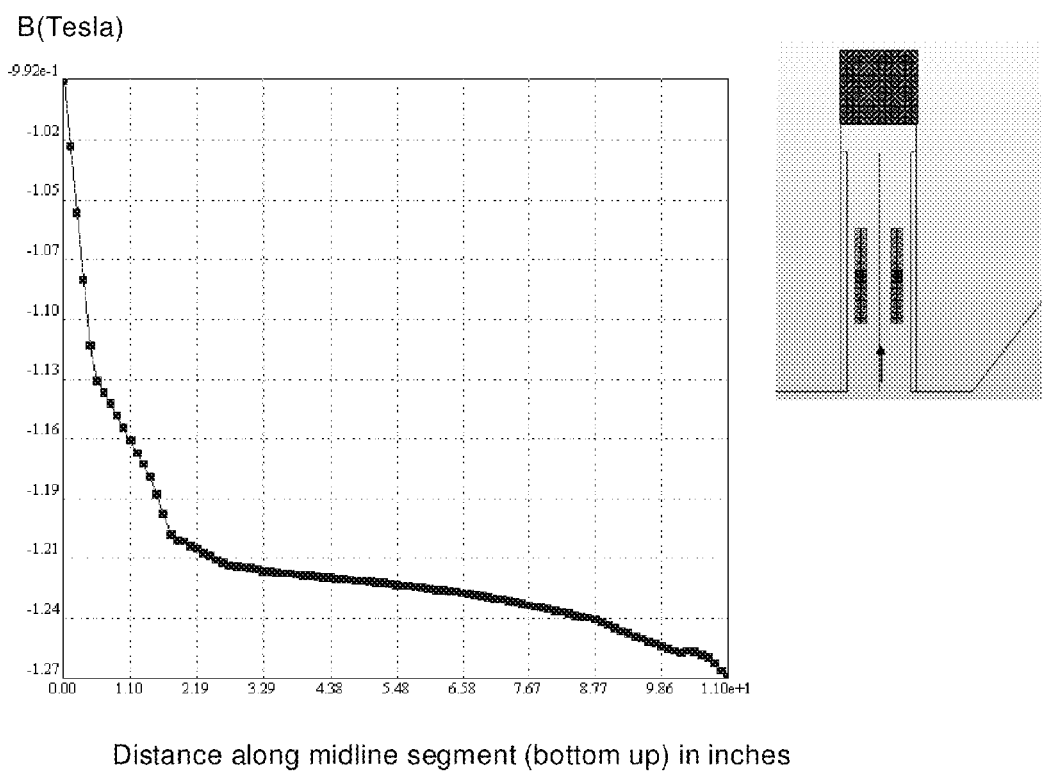
FIG. 9P illustrates magnetic field through the middle of the armature gap.

The optimization procedure computed a desired field excitation of 134 kAT. Total field power loss in all field coils plus eight armature coils containing dc is 275 kW. The real ac armature power loss at 225 Hz is approximately 306 kW. The magnetic field generated by the field coil alone is shown in FIG. 9P.

H. Power Dissipation with Skin and Proximity Effect

The only effective way to achieve the forces demanded with the weight constraints is to use the large current densities as described herein. These internal water cooled coils suffer from parasitic skin effect and proximity effect losses as the armature frequency increases. Skin effect, moving the current to the outside of the conductor is well understood.

In each of the plots shown in FIG. 9Q, a fixed current was specified, but not the distribution. For this axi-symmetric problem, the field can be characterized by a single component of magnetic vector potential $A_\phi$. A finite element code was used to solve $$\nabla^2 A_\phi - j\omega\mu\sigma A_\phi = \mu J_s. \quad (2\text{-}18)$$

Here $J_s$ is the source current, except in this current imposed conductor where it is assigned to be zero. In the conductor the vector potential is assigned to have two parts, a constant component $A_c$ and a variable component to be determined. If the current in the sub-conductor is I, $A_c$ has the value $I/(j\omega S\sigma)$, where $\sigma$ is the conductivity of the region and S is the regions surface area.

As expected, the low frequency current density distribution shown in FIG. 9Q(a) is essentially uniform. FIG. 9Q(b) shows the distribution of current in several sub-conductors that are clustered at 225 Hz. FIG. 9Q(c) shows the distribution of current in the same sub-conductors adjacent to a copper compensation slab. The current induced in the slab is 180 degrees out of phase with the armature conductor current. The maxim about unlike currents attracting applies, and explains why the red currents crowd towards the center.

I. Power Calculations and Equivalent Circuits

Minimizing power is of preeminent importance since the generator must be carried and supplied by the vehicle carrying the equipment. One way to compute the inverter power is to shut down the dc field coils, excite the armature only with ac, and integrate $\vec{E} \times \vec{H}$ over the interface of all regions carrying current. It should be clear that the presence of a compensator can lower the voltage required on the armature coil. As already shown in FIG. 9H, the presence of compensation does not alter the average force, only its mean. Since inverters are rated by their volt-amp product, this is of no small importance. The reader should note that the current induced in a passive compensator will never exceed that in the armature circuit. Thus a thicker compensator should also result in a smaller real power requirement.

Figure 9R:
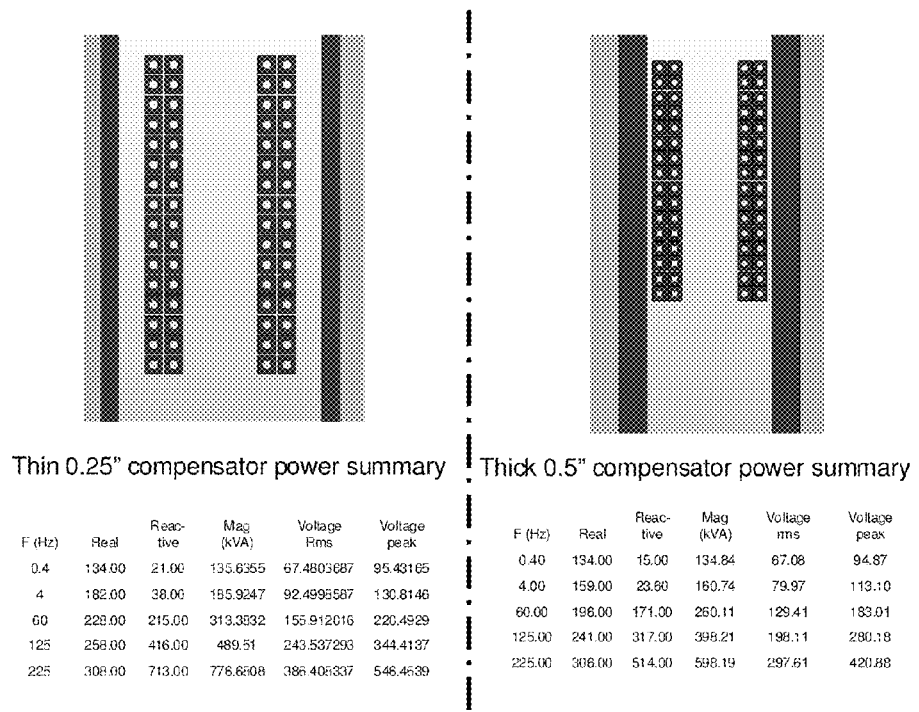
FIG. 9R illustrates power and voltage requirements for thin and thick compensator with identical armature coil excitation (225 Hz, maximum excitation)

The tabulated results annotated in FIG. 9R show that both voltage and power requirements are reduced with the thicker 12.7 mm (0.5 in.) compensator. The voltages are computed by dividing the volt-amp product by the current.

J. Control

Figure 9S:
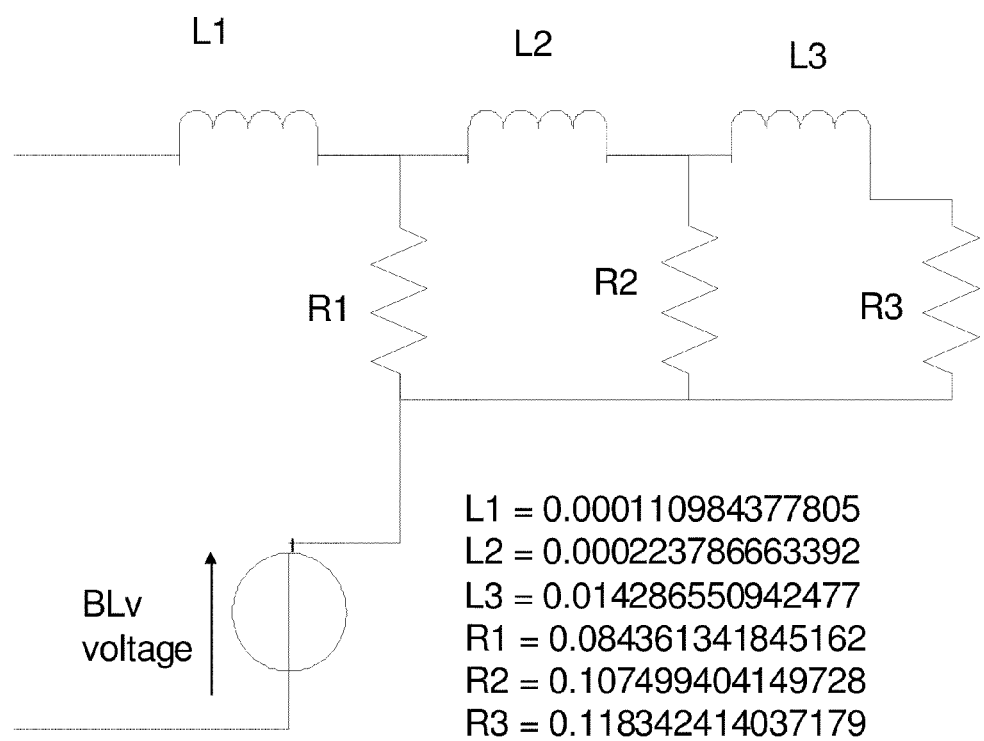
FIG. 9S illustrates an equivalent ladder network used to represent the armature circuit.

In addition to a stabilized lift generation, it is necessary to generate a number of force profiles including those that linearly increase with frequency. The controller requires a good circuit model in order to supply the right control voltage. The presence of the compensator complicates the use of an equivalent circuit. Both Silvester [2-13] and Giesselmann [2-14] approach this type of diffusion system with a ladder circuit such as that shown in FIG. 9S. The BLv voltage is a motion-induced voltage. This term is computed by computing the flux $\Phi$ linking the armature coil as a function of position with the dc field excitation on. The BLv voltage for any velocity is $$BLv = \frac{d\Phi}{dy}v. \tag{2-19}$$

Figure 9T:
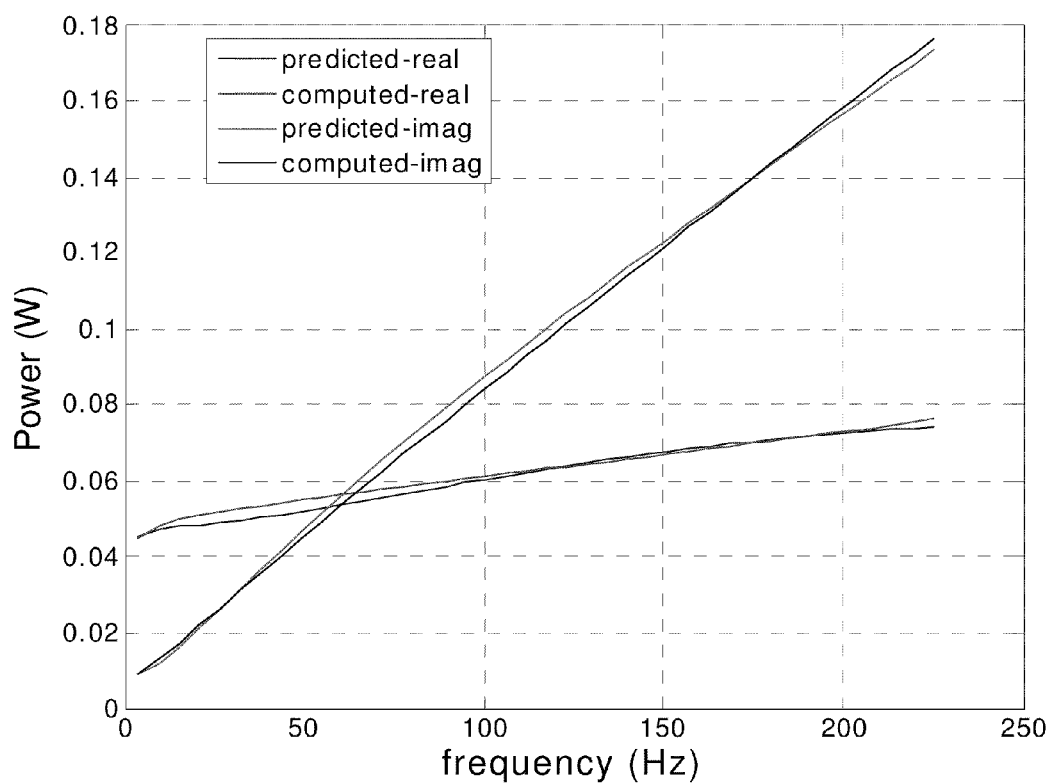
FIG. 9T illustrates performance of the ladder equivalent circuit to model the armature's power dissipation.

The derivative is determined by fitting the flux to a spline and taking the derivative of the spline [2-9]. The ladder parameter fit was determined using a Levenberg-Marquardt method with line-search to best fit the real and imaginary power dissipation [2-15]. FIG. 9T shows that this representation method is quite good for a large range of frequencies.

K. Closing the Design Loop

Figure 9U:
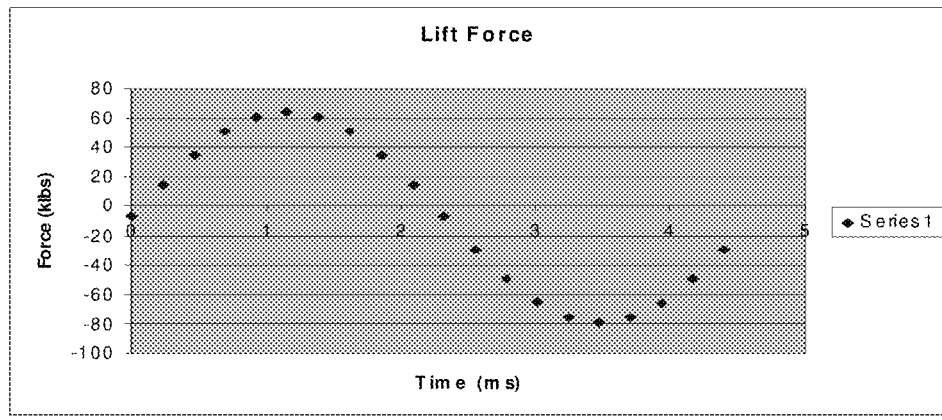
FIG. 9U illustrates transient analysis to compute force with the dc field and ac armature excitation.

Closing the design loop is equivalent to asking whether the device meets the force requirement with rated current. The highest frequency is the most taxing. What is the force when the field coil is excited with dc, the armature coil with ac, and the eight subconductors in FIG. 9N excited with dc? The analysis must be a transient time-stepping analysis. Eddy currents in both the steel and the compensator will only respond to the ac current. FIG. 9U shows that the lift force (negative) does indeed reach the target of 77 klb in the presence of all compensation and eddy currents.

L. Permanent Magnets—A Possible Way Ahead

Figure 9V:
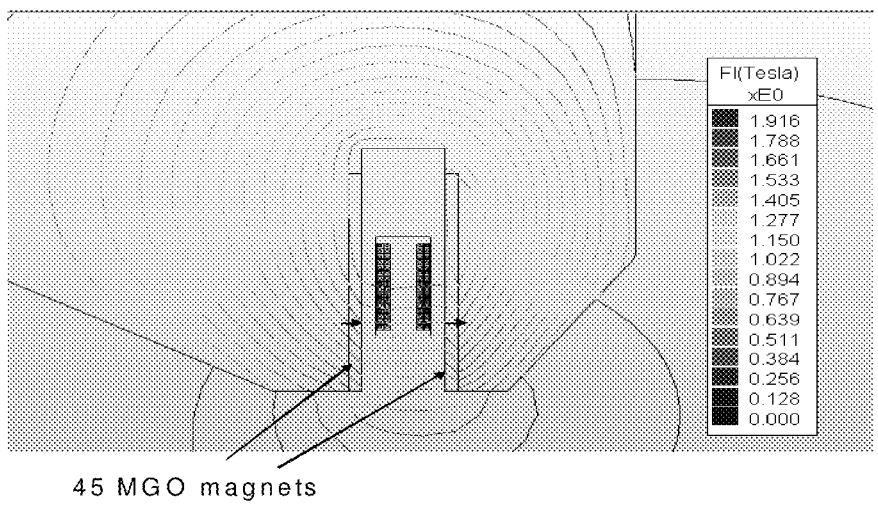
FIG. 9V illustrates placing two columns magnets on either side of the armature gap.
Figure 9W:
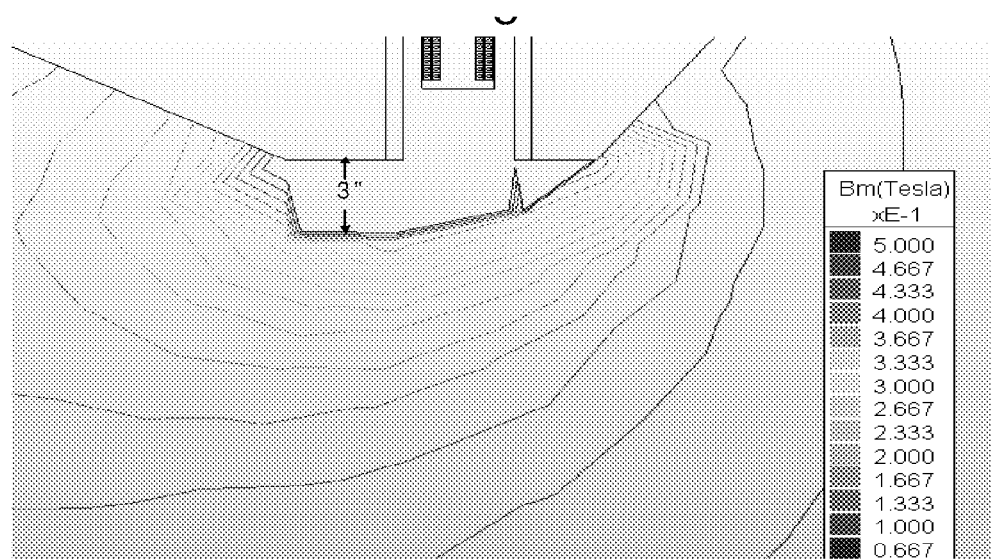
FIG. 9W illustrates a leakage field away from the armature gap with magnet excitation.

The power demand for the device may be a concern. Of the 275 KW dc loss, 260 kW comes from the field winding alone. Options for reducing the power dissipation include using smaller conductors for the armature winding to reduce skin and proximity effect and magnets to replace the field winding. Magnets can have the greatest effect on real power usage. FIG. 9V shows two columns of 12.7 mm (0.5 in.) 45 MGO NdFeB magnets placed on either side of the armature gap in the absence of any field coils. Forces are within 7% of the target result with this arrangement. Since the magnets cannot be turned off, a concern about interference with tools might result from their use. The leakage field from these magnets is shown in FIG. 9W. A leakage field of 0.5 T can be expected 7.6 cm (3 in.) away from the armature gap.

M. Conclusions

A magnetic optimization has been performed to design an electromagnetic shaker capable of generating 342 kN. The response method approach employed in this exemplary optimization required 4094 finite element analyses per optimization round. The design can accommodate a stroke length of 17.1 cm (6.75 in.) and the total armature and field base weight is just under 7.72 kg (17 klb). A transient analysis shows that the design meets the force specifications. Permanent magnets appear to be an option for reducing real power consumption.

N. References

Unless otherwise noted, each of the references listed below are fully incorporated by reference into this paper and made a part hereof:

[2-1] H. Dai, M. Sain, and B. Spencer, "Using tensors to track earthquakes on hydraulic shaker tables," *IEEE Trans. on Mechatronics*, vol. 4, no. 1, March 1999, pp. 60-70.

[2-2] L. Flora and H. Grundling, "Acceleration control of an inverter-fed electrodynamic shaker," IEEE Power Electronic Specialist Conference, Jun. 18-22, 2006, pp. 1-7.

[2-3] R. Fair and H. R. Bolton, "Analysis and design of electromagnetic moving coil vibration generators,"1993. Sixth International Conference on Electrical Machines and Drives, Sep. 8-10, 1993, pp. 529-534.

[2-4] M.-T. Peng and T. J. Flack, "Numerical analysis of the coupled circuit and cooling holes for an electromagnetic shaker," *IEEE Trans. on Magn.*, vol. 41, no. 1, January 2005, pp. 47-54.

[2-5] R. Fletcher and M. J. D. Powell, "A rapidly convergent descent method for minimization," *Computer Journal*, vol. 6, 1963, pp. 163-168.

[2-6] Goldfarb, D., "A family of variable metric updates derived by variational means," Mathematics of Computing, vol. 24, 1970, pp. 23-26.

[2-7] G. E. P. Box and N. R. Draper, Empirical model building and response surface, John Wiley and Sons, New York, 1987.

[2-8] P. Alotto, P. Girdinio, P. Molfino, and M Nervi, "Mesh adaption and optimization techniques in magnet design," *IEEE Trans. on Magn.*, vol. 32, no. 4, July 1996, pp. 2954-2957.

[2-9] Carl de Boor, A Practical Guide to Splines, ISBN 9780387953663, Applied Mathematical Sciences, New York, Springer, 1978.

[2-10] K. R. Davey, "Magnet design optimization using variable metrics," *IEEE Trans. on Magn.*, vol. 31, no. 6, 1995, pp. 3566-3568.

[2-11] K. R. Davey, "Use of tensor product splines in magnet optimization," *IEEE Trans. on Magn.*, vol. 35, no. 3, May 1999, pp. 1714-1717.

[2-12] K. R. Davey, "Examination of various techniques for the acceleration of multivariable optimization techniques," *IEEE Trans. on Magn.*, vol. 39, no. 3, May 2003, pp. 1293-1296.

[2-13] P. Silvester, "Modal network theory of skin effect n flat conductors," Proc. IEEE, vol. 54, no. 9, September 1966, pp. 1147-1151.

[2-14] M. Giesselmann, T. Heeren, A. Neuber, and M. Kristiansen, "Advanced modeling of an exploding flux compression generator using lumped element models of magnetic diffusion," IEEE Pulsed Power Plasma Science Conference, Jun. 17-21, 2001, vol. 1, pp. 162-165.

[2-15] D. Marquardt, "An algorithm for least-squares estimation of nonlinear parameters," *SIAM Journal Applied Math.*, vol. 11, 1963, pp. 431-441.

Insulation Design

Figure 10A:
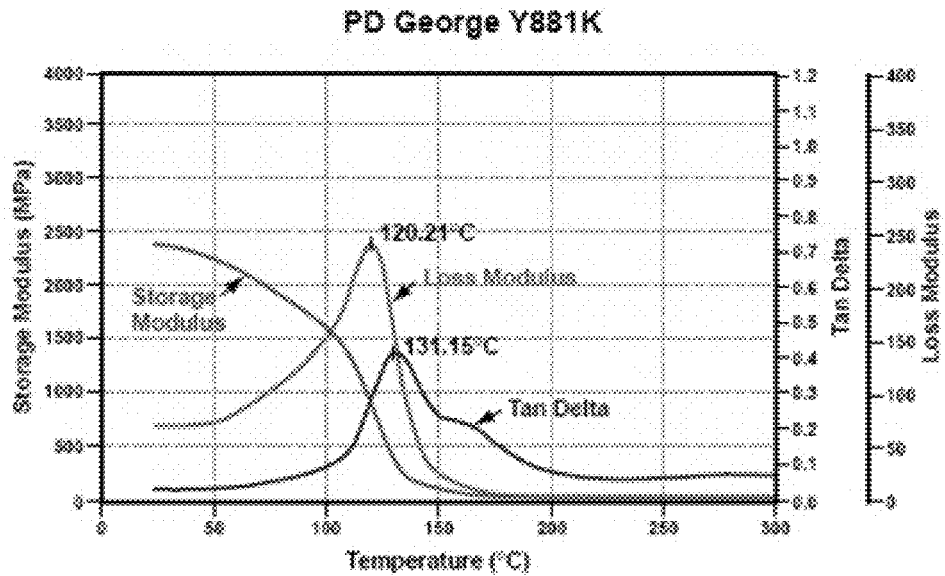
FIG. 10A illustrates heat deflection and glass transition temperatures of insulation systems.

The class rating for insulation systems indicates a temperature range where the resin in the insulation starts to sublime and over time can lose insulation strength. This rating is appropriate if the conductors are not carrying much mechanical load which is the case for winding in iron slots of generator stators. The coils for the electromagnetic vibrator (EMV) have mechanical load and the rating that must be observed is the Heat Deflection Temperature (HDT). FIG. 10A shows laboratory test data from which the HDT and Glass Transition Temperature ($T_g$) are calculated. The figure also presents a table of these values for some of the common resin systems. The HDT can be thought of as the maximum temperature at which the insulation retains good strength and $T_g$ is the temperature at which the insulation will show duress under load.

Figure 10B:
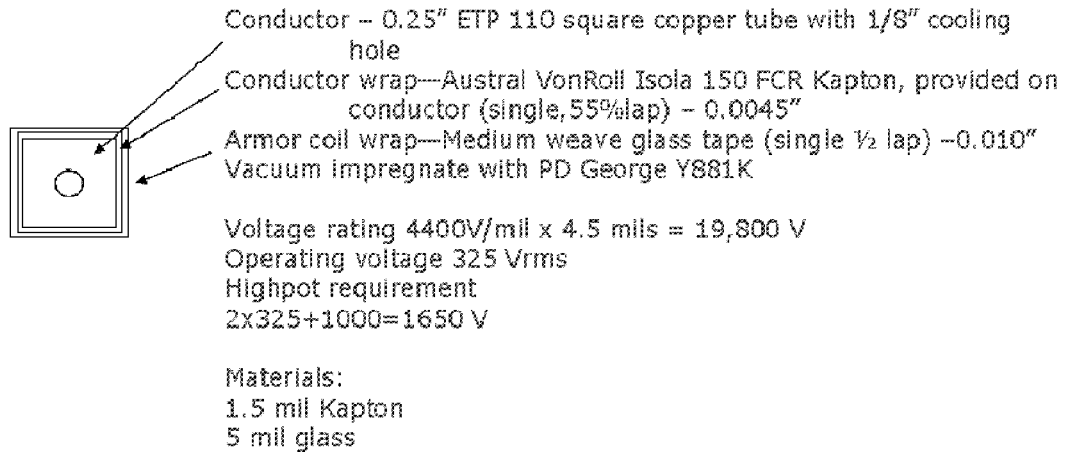
FIG. 10B illustrates an insulation system design.

The layup of insulation on the conductor is shown in FIG. 10B. The Kapton™ can be bonded to the copper tubing with Teflon™ through a heating process. This produces a very robust insulator. Two more layer of Kapton™ can be applied to the conductor and then an overwrap of glass can be applied as the armor. The glass readily wets with the VPI resin and creates a very strong mechanical encapsulation of the conductor. The figure also indicates the insulation strength for this system. It is an order of magnitude greater than the highpot inspection voltage. This specification should provide high temperature capability and long life.

EMV Mechanical Design

Figure 11A:
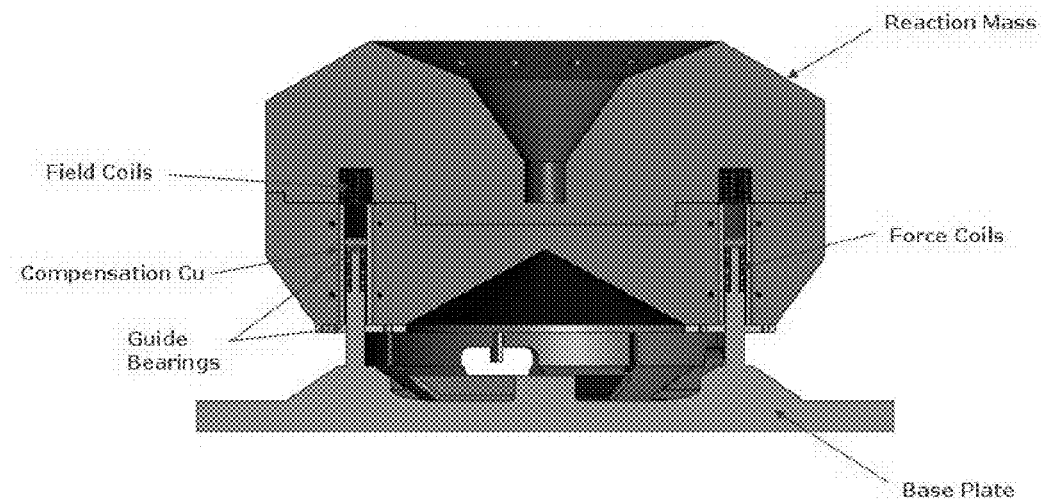
FIG. 11A illustrates an EMV baseline design.

The major mechanical parts for an embodiment of the EMV comprises the:
1) Reaction Mass
2) Stainless Steel Base Plate
3) Field Coils
4) Force Coils
5) Passive Compensation Copper Conductors
6) Guide Bearings for Base Plate
7) Robust Electrical and Cooling Terminations Many of these parts are seen in the EMV baseline design FIG. 11A.

A. Reaction Mass

Figure 11B:
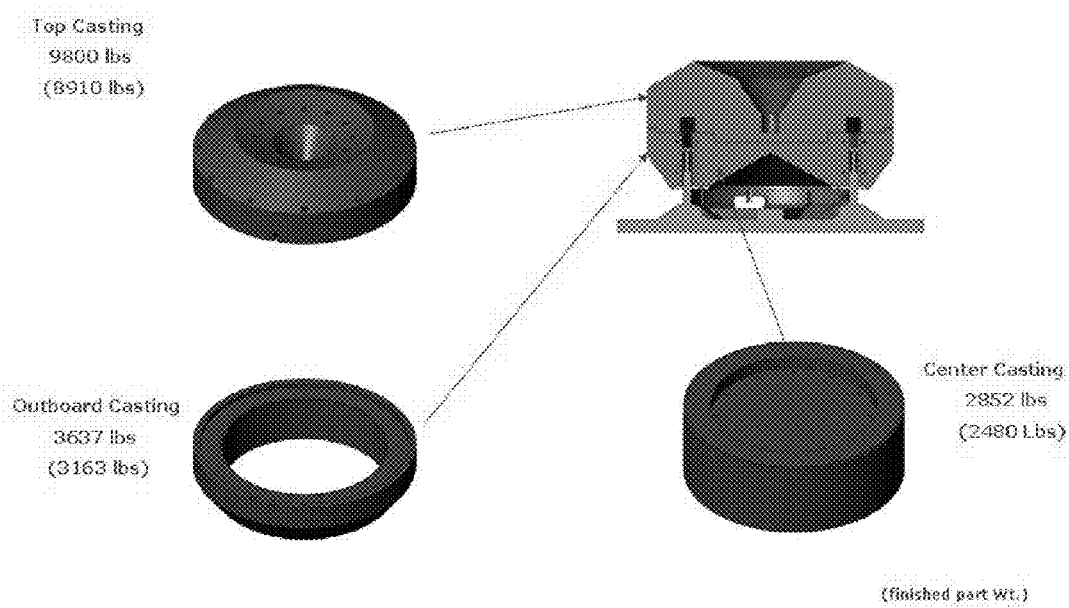
FIG. 11B illustrates a steel reaction mass.

In one embodiment, the reaction mass is a three part assembly made of a type of steel whose alloy properties are most favorable to conducting the magnetic fields generated by the EMV field coils. In one aspect, this low carbon steel is commonly known as AISI 1005, but is referred to as A216, if discussed in context to a casting. The reaction mass (in position over the base plate) is shown in FIG. 11B.

B. Stainless Steel Base Plate

Figure 11C:
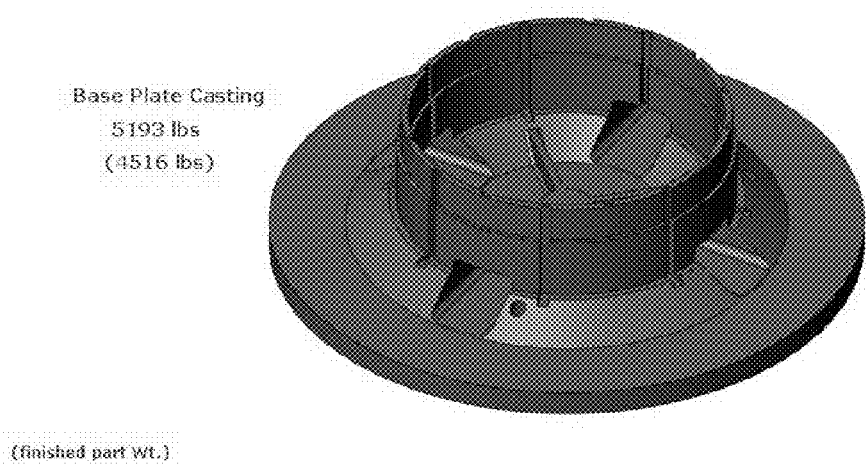
FIG. 11C illustrates an EMV base plate.

In one embodiment, the base plate is a large casting of non-magnetic CF8 (304) corrosion-resistant material as shown in FIG. 11C.

C. Field Coils

Figure 11D:
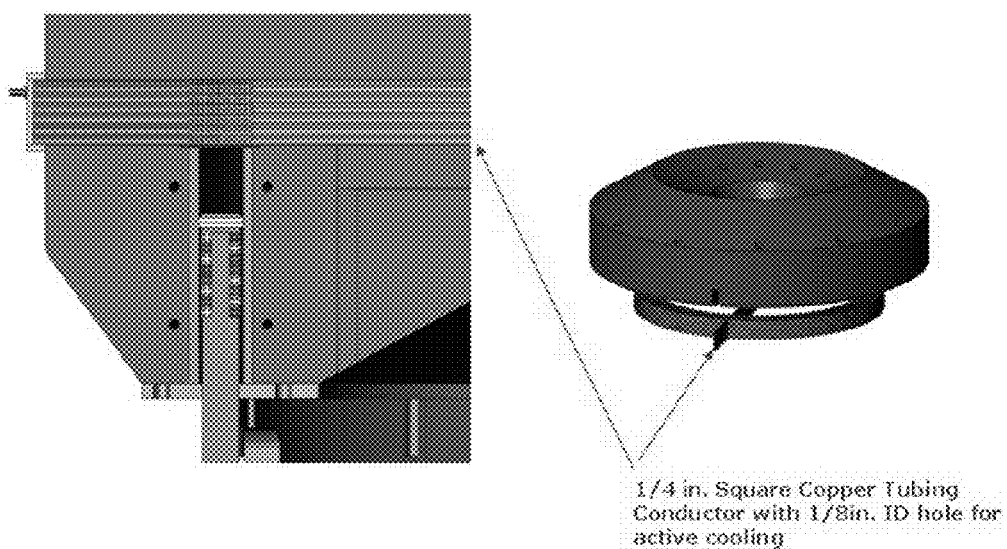
FIG. 11D illustrates field coils.

In one embodiment, the field coils in the baseline design are constructed using 0.25 in. square copper conductor tubing with a 0.125 in diameter center hole. A mixture of water and ethylene glycol can flow through the coils to remove the heat generated from the current flow through the coils when the EMV is running. The field coils can be contained in a machined pocket in the top piece of the reaction mass. The coils can have several layers of insulation. The outer layer can be 5 mil glass cloth that can be vacuum impregnated (VPI) with a high temperature rated (class H) resin. The field coils and their location in the reaction mass can be as shown in FIG. 11D.

D. Force Coils

Figure 11E:
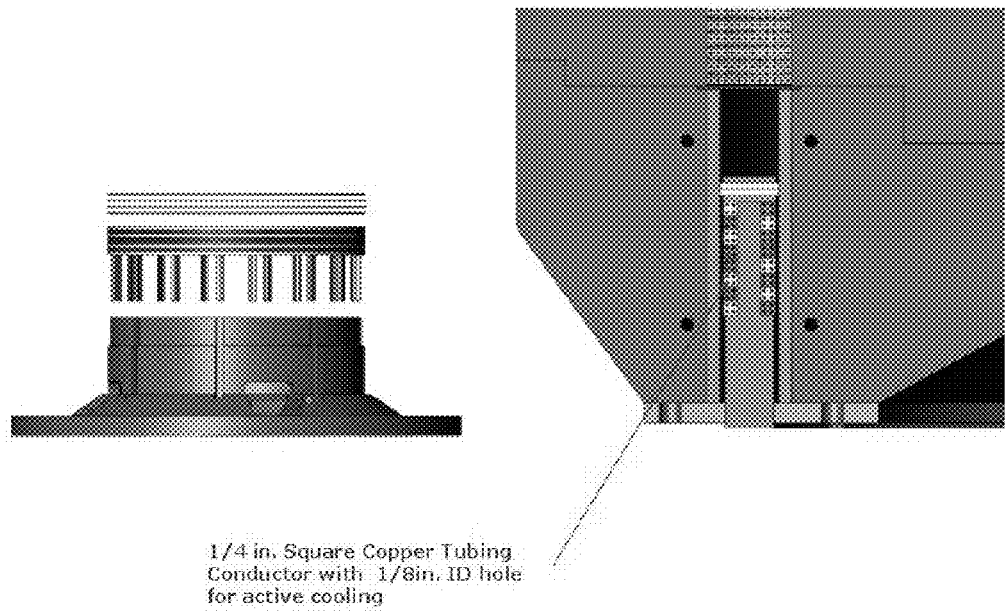
FIG. 11E illustrates EMV force coils.

In one embodiment, the force coils are also be wound out of 0.25 in. square copper conductor tubing with a 0.125 in. diameter center hole. These coils can also be actively cooled. They can be secured to the base plate as shown in FIG. 11E and can also be resin impregnated like the field coils.

E. Other EMV Components

Figure 11F:
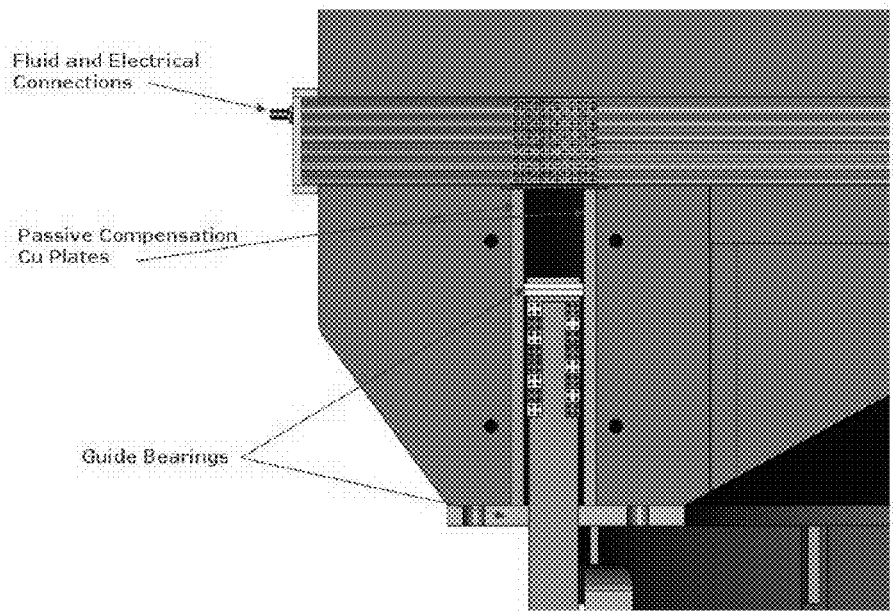
FIG. 11F illustrates other EMV Components.
Figure 11G:
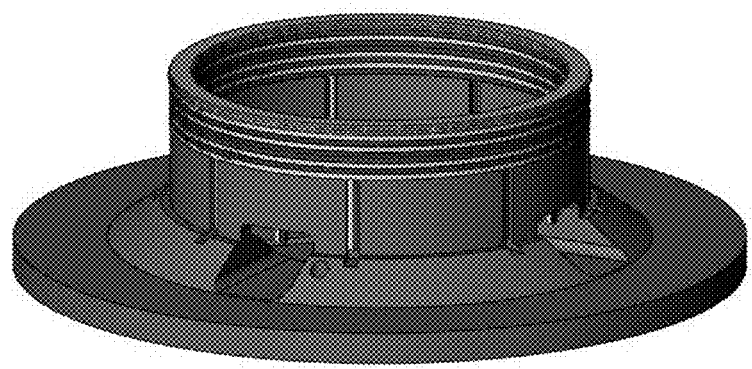
FIG. 11G illustrates EMV base plate with force coils attached.
Figure 11H:
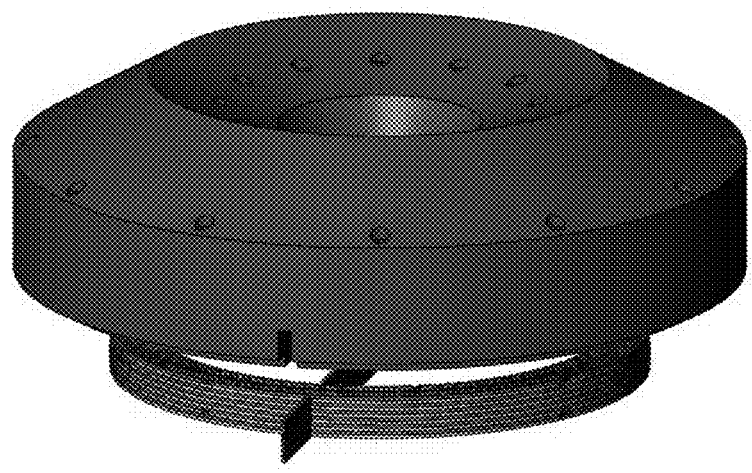
FIG. 11H illustrates field coils prior to placement in top reaction mass steel.
Figure 11I:
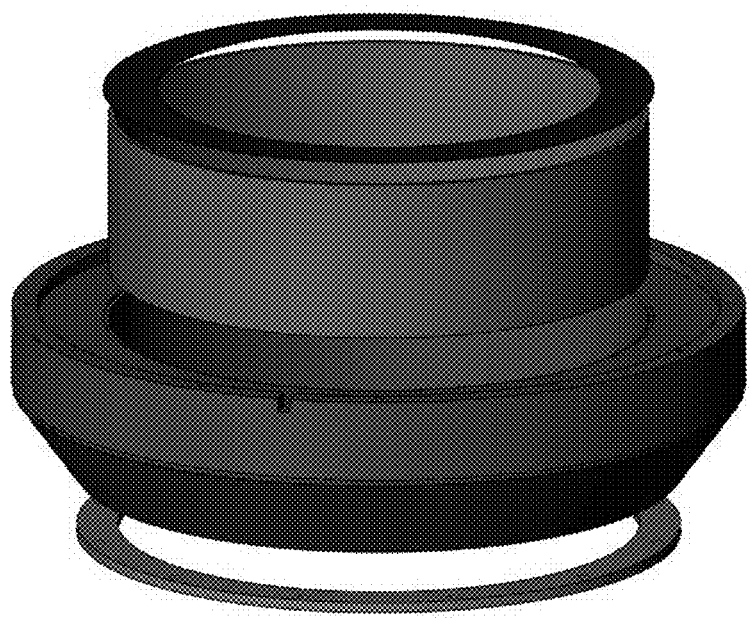
FIG. 11I illustrates the outer steel casting prior to copper ring placement.
Figure 11J:
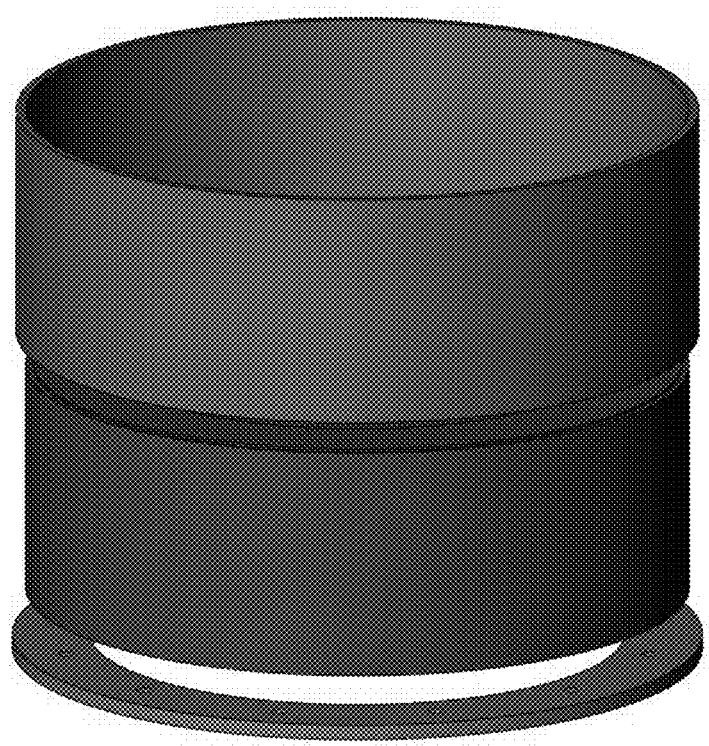
FIG. 11J illustrates the center steel casting prior to copper ring placement.
Figure 11K:
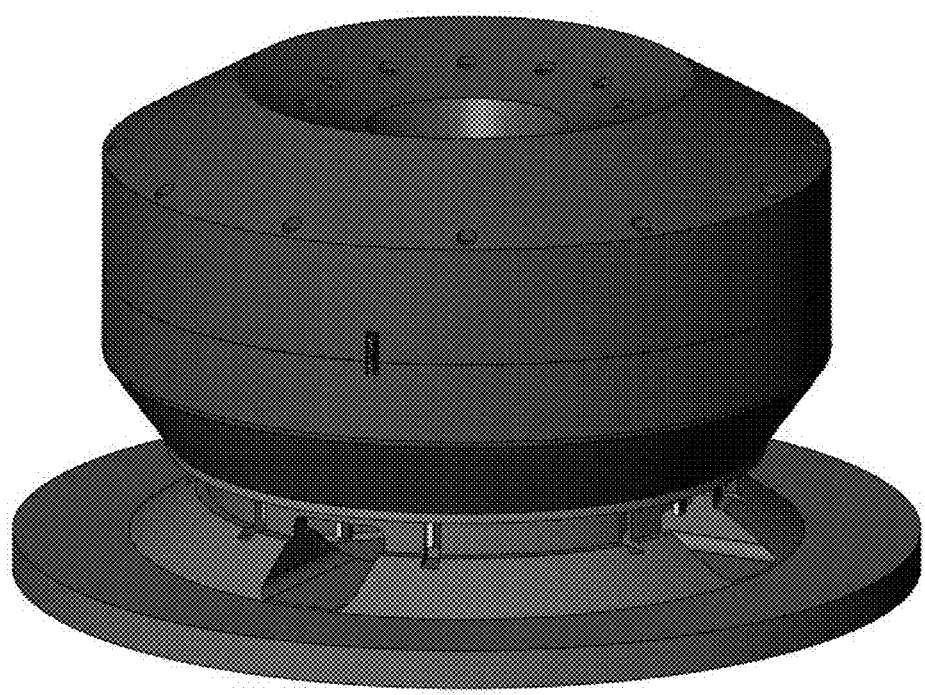
FIG. 11K illustrates EMV reaction mass with base plate inserted.
Figure 11L:
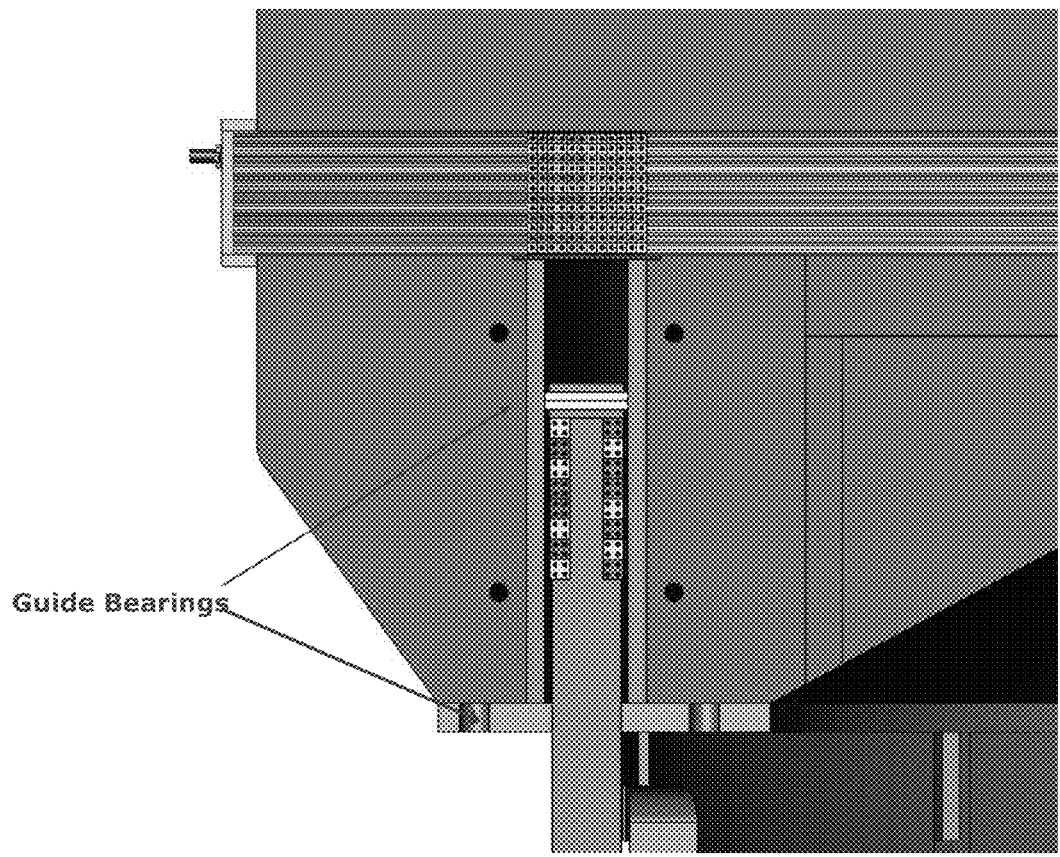
FIG. 11L illustrates EMV base plate guide bearings

Other important parts to the EMV include the passive compensation copper rings, the guide bearings and robust electrical and cooling terminations. These component parts are seen in FIG. 11F. Many of these can be custom designed and fabricated. One embodiment of the fabrication steps are shown in FIGS. 11G through 11-J, resulting in the final assembly shown in FIGS. 11K and 11L.

Vibrator Power Supplies

The power electronics section comprises several components of an embodiment of a system, starting at the inverter that powers the force coils. This is an important power component as it powers the force coils with the current that is fully controlled by the system controller. The inverter has a DC input from the link capacitor and an AC output to the force coils. The output frequency is required to sweep from 4 to 225 Hertz while maintaining a sinusoidal output with very low THD, Total Harmonic Distortion.

In addition to the inverter output function, the inverter package can also include a three phase rectifier bridge and the link capacitors. The rectifier bridge is a three phase, full-wave, design. The upper set of switching devices can be controlled devices while the lower three can be passive rectifiers. Making this a half-controlled bridge can allow for controlled soft-start charging of the link capacitor from the alternator. After the initial charging is completed, the unit can function as a traditional full-wave bridge.

In one embodiment, the DC link capacitor value was selected to be 0.1 Farads. The link capacitor can provide energy for the inverter in the quick burst that the inverter demands. The generator is the source of the energy, but it can operate at 70 Hz and may not be able to directly supply the inverter. The link capacitor needs to have enough energy available to assist during the low frequency portion of the sweep which is what dictated the 0.1 F value. The capacitor voltage is set by the generator output voltage, 480 V rms in this case, to be 680 V dc.

The next component in the line is the inverter itself. The inverter can be a single phase unit, configured in a classic 'H' bridge layout. This unit may be mounted on a truck and operate in all possible conditions, therefore the ambient temperature can vary from −35 to 60° C. The expected coolant inlet temperature is no higher than 65° C. The unit can be housed within a NEMA 4 style enclosure. The required output current is 2400 A rms at up to 350 V rms. The duty cycle is 100%. To achieve a low THD value and provide a swept frequency output of 4 to 225 Hz, it is estimated that a minimum switching frequency of 2.5 kHz is required.

In one embodiment, two separate inverter units can be connected in parallel to meet the current (e.g., 2400 A) specification. Each unit can be comprises of a three phase unit collapsed down to a single phase output. Such an inverter is available from, for example, Applied Power Systems, Inc. of Hicksville, N.Y.

In another embodiment, the inverter can be a highly parallel design switching at 2.5 kHz with a dead-time minimum value of 3.2 microseconds. This inverter is using four Eupec 1200 A IGBTs in parallel to achieve an output current rating of 2400 A rms in the low frequency range of 20 Hz and lower. In the upper range of 20 to 250 Hz the output rating is 3000 A rms. The expected distortion is 2.5% THD. Such an inverter is available from, for example, Saminco, Inc. of Fort Myers, Fla.

In one aspect, a DC power supply is for powering the field winding. In one embodiment, the requirements are for 931 A in the field coil. To meet this specification, an adjustable power supply with an output of 0 to 300 Volts and 0 to 1000 A can be used. Such a DC power supply is available from, for example, Dynapower Corporation of South Burlington, Vt.

In one aspect. power for the inverter and the dc power supply can be provided by an alternator connected to a prime mover such as a diesel engine. The alternator specifications are based on the loads it will drive. In one aspect, the alternator can be a three phase, 480 Vac, 570 kW unit having a 60° C. ambient temperature rating. Such an alternator is available from, for example, Marathon Electric of Wausau, Wis. In other embodiments the architecture of the DC power supply can be integrated with the PWM to provide both functions from one highly integrated cabinet.

Controls

Figure 12A:
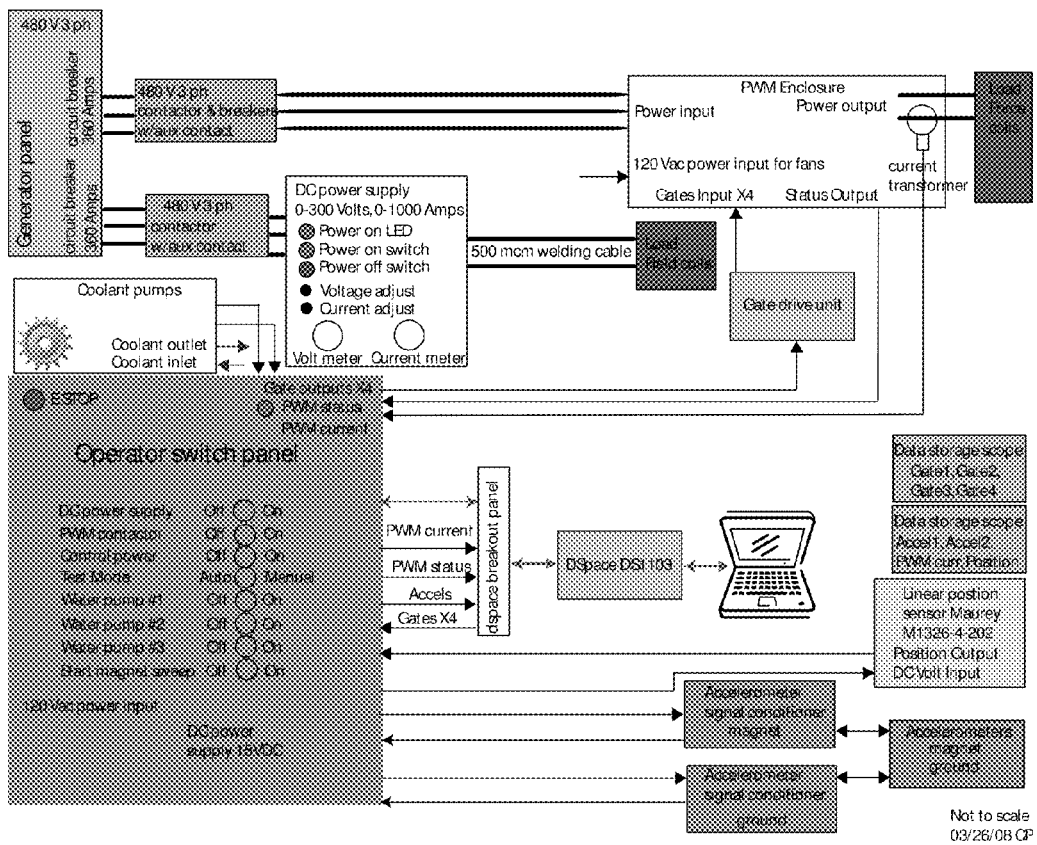
FIG. 12A illustrates a block diagram of the control system.

FIG. 12A is a block diagram of the components of an exemplary control system. From the top level down, the control system includes the system controller board, operator panel, down to an array of sensors. In one exemplary aspect, a dSPACE control board as available from dSPACE, Inc. of Wixom, Mich. can be used to allow for integration of the Matlab or Simulink test environment. In a prototype test environment, the flexibility of using a simulation package such as Simulink for the controls algorithm is ease of code changes. The dSPACE board is powered by PowerPC 750GX processor with a 1 GHz clock speed. The board has 20 analog to digital, A/D, channels with a +/−10 Volt range. These A/D channels are all 16 bit vertical resolution. There are 8 16 bit D/A channels, also with a +/−10 Volt range. There are 32 digital channels that can be configured as input or output channels. The dSPACE board includes a mounting enclosure, and a breakout panel that allows for easy connection to the input and outputs.

The block diagram (FIG. 12A) shows the operator panel in the lower left area. This can be a panel with the basic controls for operating the EMV. The panel can allow for manual operation and testing of the various system components. During normal planned operation, all of the switching can be done using the dSPACE board in an automated fashion. The operator panel can have indicators for the status of many of the major components. This can assist in completing the initial checkout and locating any problem areas.

The controller board can handle all the system operation functions. The controller can collect and store signal data for later analysis. These include, for example: PWM control and gating; DC power supply control; Alternator functions; Accelerometers; Position sensors; Current sensors; Voltage sensors; Temperature sensors; and Coolant pumps.

The control board can be able to play the rising frequency sweeps, or take in external data files for an input for random phase sweeps. Again, the most flexibility possible can be built into the system to allow for the widest possible range of tests.

Exemplary Truck Layout

Described herein are basic modifications to a hydraulic shaker truck (i.e., the Mertz truck) to allow the installation of an embodiment of an EMV as described herein.

Figure 13A:
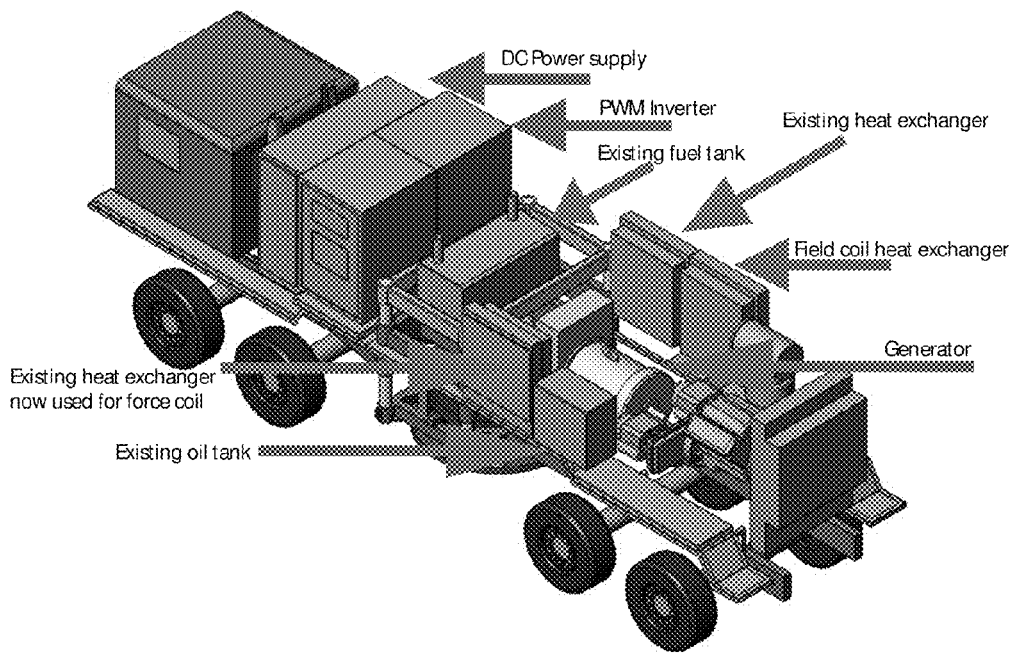
FIG. 13A illustrates a Mertz truck with the new components placed.

As shown in FIG. 13A, the generator can fit directly behind a diesel engine and the hydraulic drive transmission. The generator can be directly driven from the take-off pad that did drive the old vibrator hydraulic drive pump. The removal of the un-used vibrator hydraulic drive pump frees up the center most drive position. An adapter flange can connect to the SAE pad, and a spline shaft can couple to the drive pad. This adapter can drive a short driveshaft that can connect to the generator shaft. This setup can avoid requiring any sort of gearbox. The hydraulic drive does not include any sort of gear change. This exemplary arrangement requires the generator to operate at the Detroit diesel speed of 2100 RPM, instead of the generator design speed of 1800 RPM. The increased generator speed can result in an increase of the output frequency to about 70 Hertz, instead of 60 Hertz. The Marathon generator that has been selected has a maximum speed of 2250 RPM. To achieve an acceptable level of angle on the short driveshaft, the diesel engine should be relocated. The engine is mounted on a skid which is attached to the Mertz frame. The skid also includes the radiator, the hydraulic drive transmission, and many engine accessories. This can make relocating the engine rearward about 20" and upward 8" a simple task. A new U shaped skid can be made out of three pieces of channel steel, then slipped under the existing skid. The Mertz frame extends back the extra length, however the spare tire may be mounted elsewhere. Two new brackets that secure the skid to the frame can be fabricated. Some of the existing hydraulic hoses may not be long enough, which may require some adapters and new short lengths of hose to extend them to the rear.

Other modifications may include moving the diesel fuel tank from behind the cab to the center of the truck over the quad. The existing hydraulic oil tank can be rotated 90 degrees from next to the quad, to the right side of the truck.

Figure 13B:
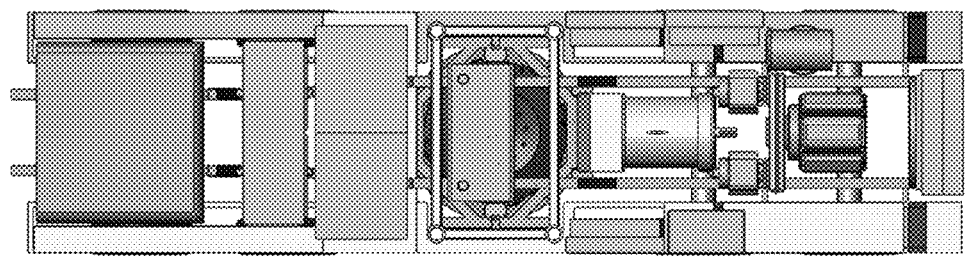
FIG. 13B illustrates a Mertz truck showing the top view.
Figure 13C:
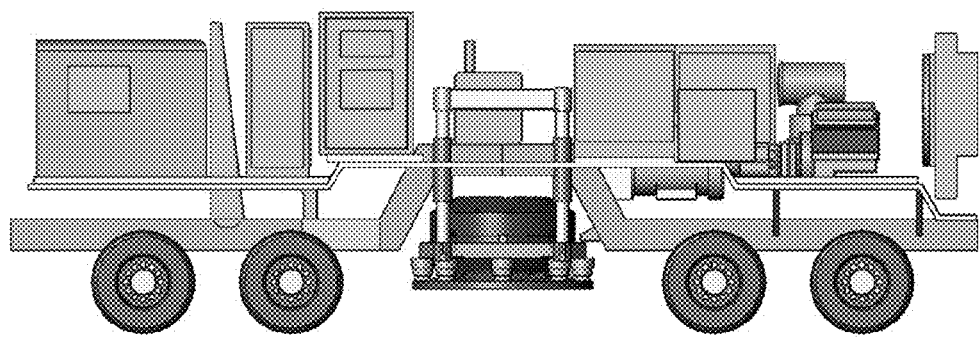
FIG. 13C illustrates a Mertz truck showing the side view.

Besides the generator, other major components that can be added to the truck. These are the inverter, the DC power supply, and a heat exchanger for the force coils. The space behind the cab can hold the inverter and the DC power supply. These are shown in the truck layout FIGS. 13A, 13B and 13C. The heat exchanger can be added on the passenger side of the truck, directly behind the existing heat exchanger. The heat exchanger fans can be driven in the same manner as the existing fans, with small hydraulic motors powered off the same source.

Baseplate Design and Analysis

A. Introduction

Structural analysis of the baseplate design was done in order to determine the maximum operating stress and whether or not the baseplate remains in contact with the ground under dynamic loading conditions. In addition to the dynamic analyses, a static analysis was done to determine stress due to off-axis loading of the baseplate that would be encountered, for example, if the baseplate was operated on a hill-side. The goal of the analysis was to determine the optimal baseplate configuration that would minimize weight while retaining stiffness and strength. The dynamic analyses were done using ABAQUS™, a commercially available finite element software package with full transient and nonlinear analysis capabilities. The static analysis was done using COSMOSWORKS™, a finite element analysis supplement to SOLIDWORKS™ solid modeling software.

B. Dynamic Response Models

Transient response of the baseplate to sinusoidal excitation of the reaction mass at three distinct frequencies was done using an explicit time integration scheme available within ABAQUS™. The explicit integrator was chosen over the implicit integrator because of superior performance in models that involve contact. Even though the explicit scheme requires very small time steps (on the order of $10^{-7}$ sec) due to its conditionally stable nature, run times for large models are generally shorter than for an implicit scheme since the stiffness matrix does not need to be decomposed and no intermediate iterations are needed for convergence in each time step. Furthermore, the small time step required ensures that the response is captured adequately. With implicit schemes, attempts to shorten run times by increasing the time step size could result in undesired loss of solution accuracy.

Figure 14A:
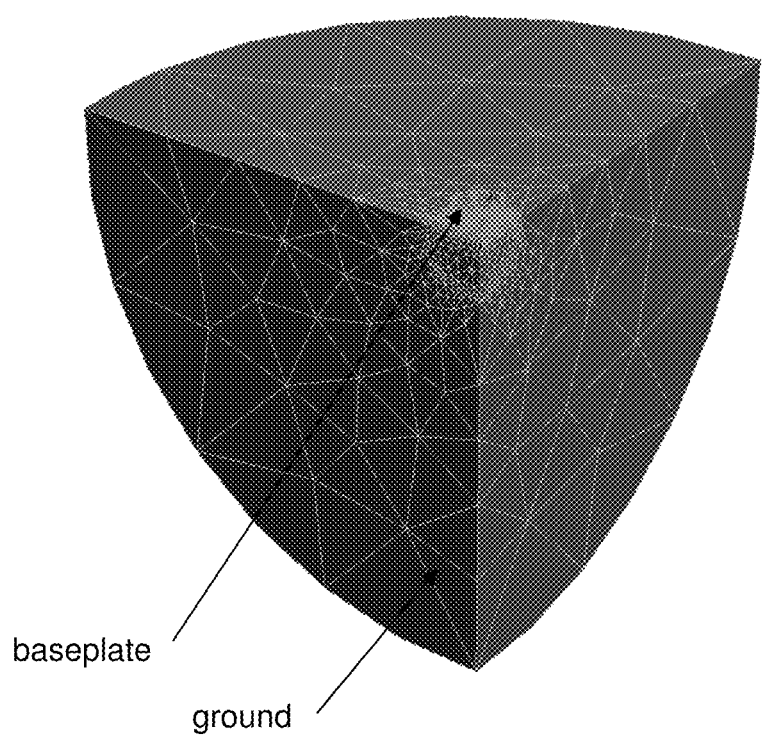
FIG. 14A illustrates a finite element model of ground and baseplate used in dynamic analyses.
Figure 14B:
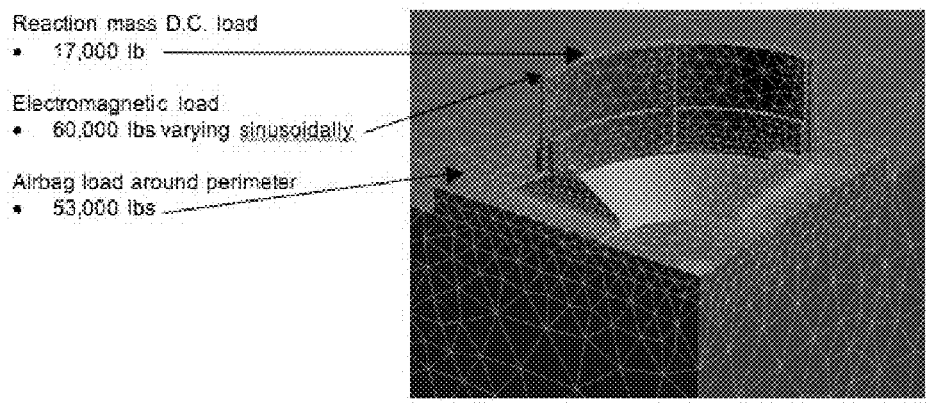
FIG. 14B is a detailed view of finite element model of ground and baseplate used in dynamic analyses, with load application areas shown.

FIGS. 14A and 14B show the finite element model used in the dynamic analyses. FIG. 14A shows the extent of the ground that was modeled along with the baseplate, and FIG. 14B shows the baseplate only. Symmetry of the baseplate and loading conditions allowed reduction of the problem to a quarter-symmetry model, thus allowing a higher mesh density for a given number of degrees of freedom. Due to the complex shape of the baseplate structure, tetrahedral elements were used to mesh the solids using the automatic mesh generator available in ABAQUS™. Second order interpolation functions were prescribed in order to maximize resolution of stress gradients within the structure. The mesh density chosen was a compromise between solution convergence and turn-around time, considering the limited time available for parameter studies in the initial design phase. Future work can address the issue of whether convergence was achieved at stress concentrations.

C. Dynamic Load Cases

Analyses were done to simulate operation of the vibrator at 10 Hz, 125 Hz and 200 Hz. These three frequencies were chosen to provide snapshots at the low, mid and high frequency ranges of operation. Since the analysis turn around time is significant in a transient analysis, it was not practical given the time constraints to model a swept sine input that would involve several seconds of load duration and several million time steps. For the 10 Hz case, the analysis was run out for 3 periods of load fluctuation. For the 125 Hz and 200 Hz cases, the analyses were run out for 5 periods.

In all three cases, a 53,000 lb distributed load was applied around the perimeter of the baseplate to simulate support of the vehicle (less the baseplate and reaction mass) on airbags. A 17,000 lb load was applied to the upper surface of the cylindrical portion of the baseplate to simulate the steady state (also referred to as the D.C.) load of the reaction mass acting through electromagnetic forces on the baseplate coils. Finally, a 60,000 lb alternating load was applied at the same surface to simulate the reaction mass being driven electromagnetically. The alternating load was varied sinusoidally at 10 Hz, 125 Hz and 200 Hz in three separate analyses.

D. Ground Model

The ground plays a part in the dynamic response of the baseplate, and it was included in the model. The ground was modeled as a hemisphere with a 240 in. radius. Of course, due to symmetry, one quarter of the hemisphere was actually modeled. An initial analysis was done with a soil modulus of 200,000 psi and a density of 0.052 in/lb$^3$. Per recommendation by Ion, the soil modulus and density were adjusted to produce a 30 Hz frequency by lowering the modulus to 20,000 psi, and increasing the density until a model of the ground without baseplate resulted in a fundamental natural frequency of 30 Hz. These values of soil modulus and density were used in subsequent analyses.

E. Boundary Conditions and Contact Surface Definition

Symmetry boundary conditions were applied at model faces corresponding to the cutting planes for the quarter-symmetry model. In addition, the outer spherical surface of the ground model was fixed in all three directions. A contact surface was defined between the ground and the baseplate that allowed separation of the baseplate away from the ground but no penetration.

F. Static Analysis Model

Figure 14C:
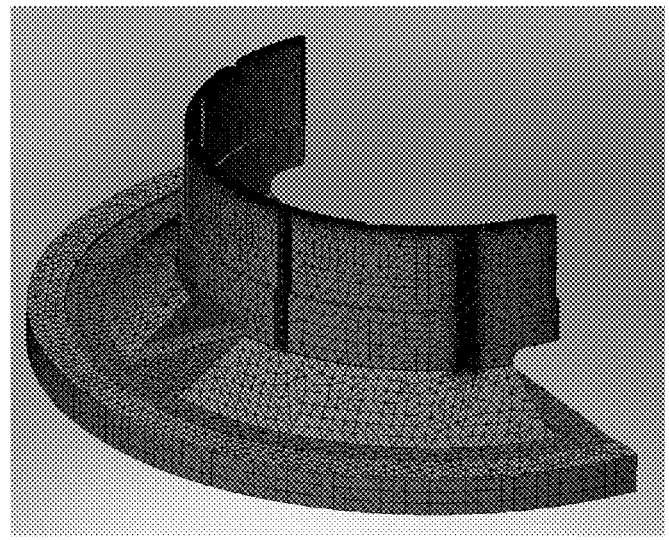
FIG. 14C illustrates a finite element mesh of baseplate used in static analysis.
Figure 14D:
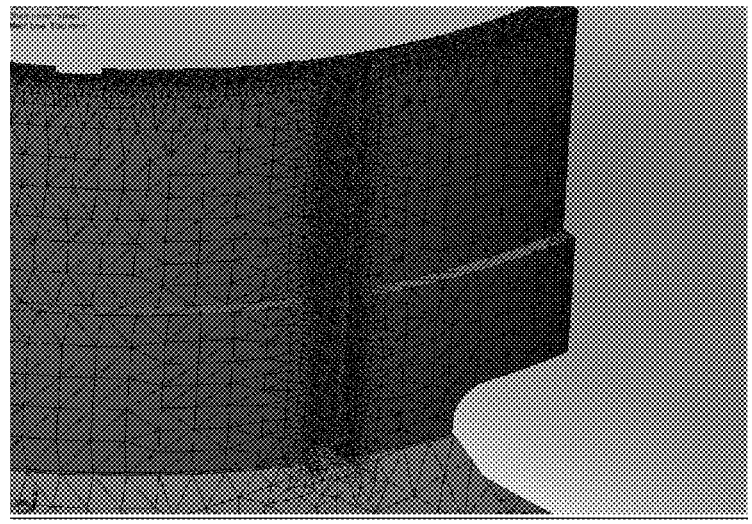
FIG. 14D illustrates a close up of finite element mesh of baseplate used in static analysis.

FIGS. 14C and 14D show the finite element model used for the static analysis. In this case, the lateral loading condition allows a half-symmetry model but not a quarter-symmetry model. Since the analysis run time is orders of magnitude smaller than that needed for the dynamic analyses, the mesh density was increased to provide a reasonably fine mesh at stress concentrations. Initial runs indicated the highest stress was in the region of a vertical slot in the upper cylindrical portion of the baseplate, and the mesh was refined in that region accordingly, as seen in FIG. 14D.

G. Static Load Cases

For the static analysis, the 60,000 lb alternating load was applied as a static load acting along the axis of the vibrator. The 53,000 lb vehicle weight load was applied around the perimeter of the baseplate, and the 17,000 lb reaction mass D.C. load was applied at the upper surface of the cylindrical portion of the baseplate. The 17,000 lb reaction mass load was decomposed into a vertical and a lateral load to model a 15 degree tilt of the baseplate on the ground. Thus the 17,000 lb reaction mass load was modeled as a 16,420 lb vertical load and a 4400 lb lateral load.

H. Boundary Conditions

The ground was not modeled in the static load case, thus the bottom of the baseplate was fixed in all three direction to prevent rigid body motion. Symmetry boundary conditions were applied at the half-symmetry cutting planes.

I. Results

Initial analysis indicated that the inner portion of the baseplate separates from the ground whenever the sinusoidal load periodically acts in an upward direction. The outer perimeter, however, remains in contact with the ground at all times due to application of the truck weight through the airbags located around the baseplate perimeter. In an attempt to eliminate the separation, the baseplate thickness was increased from 2 to 3 in. The thicker baseplate did reduce the amount of separation from the ground, but did not eliminate it entirely. The analyses presented here are for the thickened baseplate configuration.

Table 1, below, presents the maximum Von Mises stress and the maximum gap between the ground and baseplate encountered in the three cases. Stresses for all three cases are quite low compared to material strength. Deflection of the baseplate away from the ground is higher at low frequency, suggesting that the ground resonant frequency is coming into play.

Figure 14E:
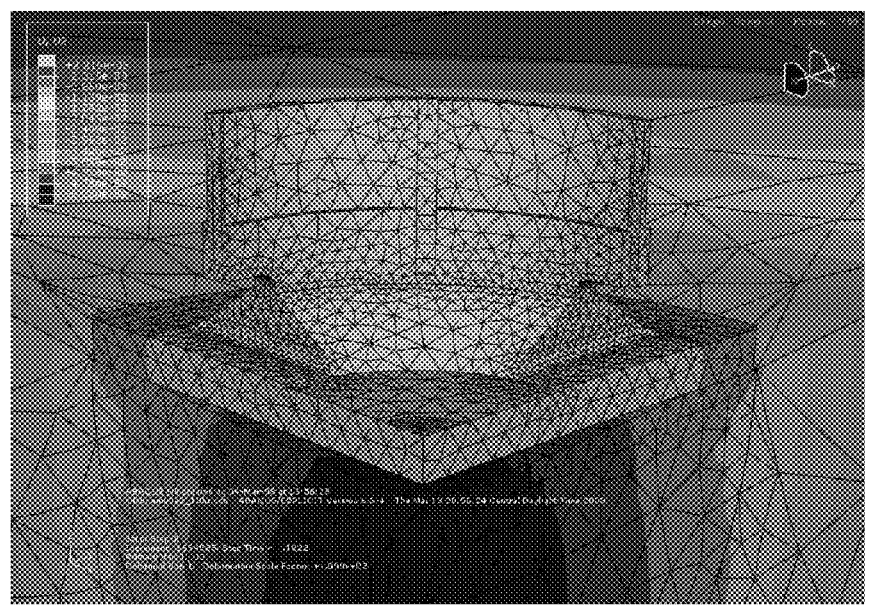
FIG. 14E illustrates a baseplate lifting up off the ground during upward application of the sinusoidal load.

FIG. 14E shows an exaggerated deflection plot of the baseplate lifting up from the ground during the course of the analysis. As seen in the plot, the outer perimeter of the baseplate stays in contact with the ground and only the central portion lifts up off the ground.

Figure 14F:
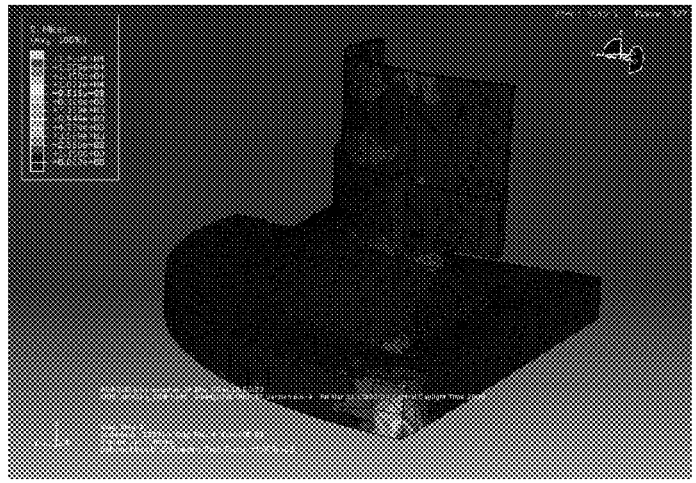
FIG. 14F illustrates the maximum Von Mises stress encountered in the dynamic analyses—the stress is 14.3 ksi.
Figure 14G:
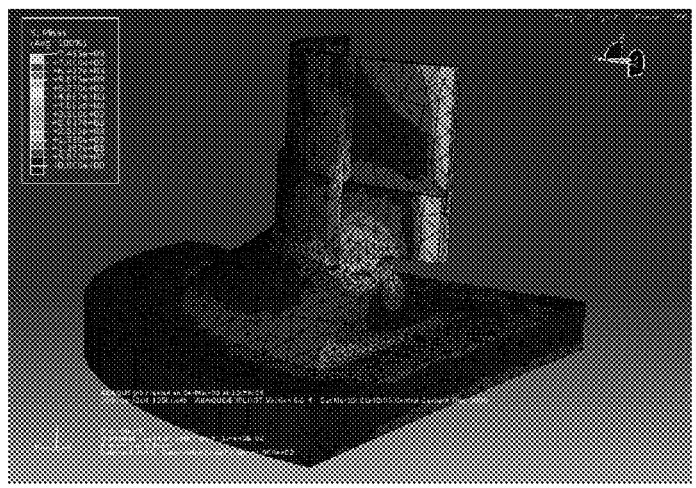
FIG. 14G illustrates the maximum Von Mises stress encountered in the upper cylindrical portion of the baseplate—the stress is 7.5 ksi.

FIGS. 14F and 14G show Von Mises stresses in the baseplate. FIG. 14F shows the overall maximum Von Mises stress encountered anywhere in the baseplate in the three loading cases, and FIG. 14G shows the maximum Von Mises stress encountered in the cylindrical portion of the baseplate. Both stresses are low compared to the material strength.

Figure 14H:
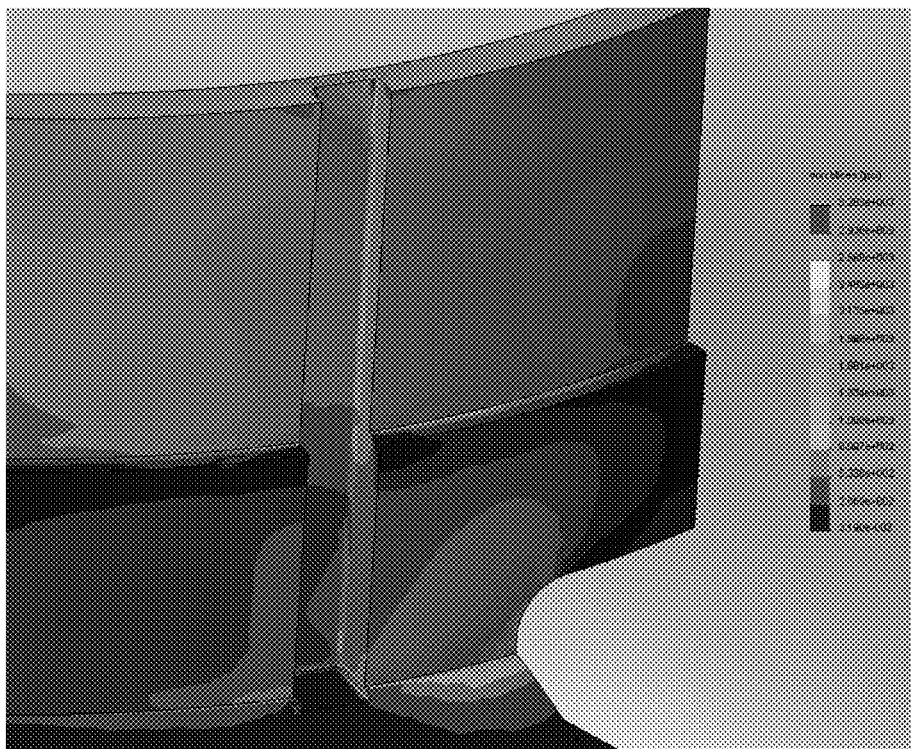
FIG. 14H illustrates maximum Von Mises stress from lateral load in static analysis.
Figure 14I:
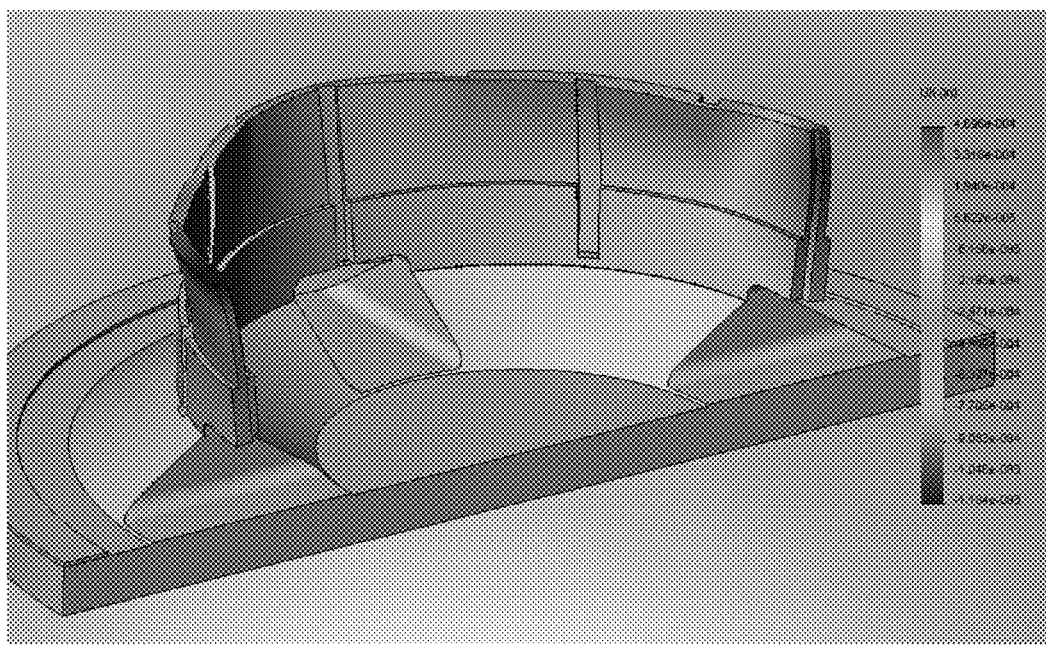
FIG. 14I illustrates lateral deflection from lateral load.

FIG. 14H shows the maximum Von Mises stress from the static analysis. The stress is 3.2 ksi, and is also quite low compared to the material strength. FIG. 14I shows the extent of lateral deflection induced by the lateral load. The deflection is less than 0.0012 in.

TABLE 1

Results from dynamic analyses

| Load case | Max. separation from ground | Max. Von Mises stress |
|---|---|---|
| 10 Hz | 0.0175 in. | 6.4 ksi |
| 125 Hz | 0.009 in. | 7.5 ksi |
| 200 Hz | 0.010 in. | 14.3 ksi |

J. Summary of Structural Analyses

Stress results from both the dynamic and static load cases are quite low, even when taking into account possibly higher stresses due to insufficient mesh density at stress concentrations.

All three dynamic loading cases resulted in separation of the baseplate away from the ground during the periodically upward portion of the load. The amount of deflection is small, but may increase for cases when the ground resonant frequency is excited (30 Hz). Further analysis with an excitation frequency of 30 Hz should be done to verify this. In no, loading case did the outer perimeter of the baseplate leave the ground, being held in place by the airbag load. This, too, should be verified for the 30 Hz case.

Figure 14J:
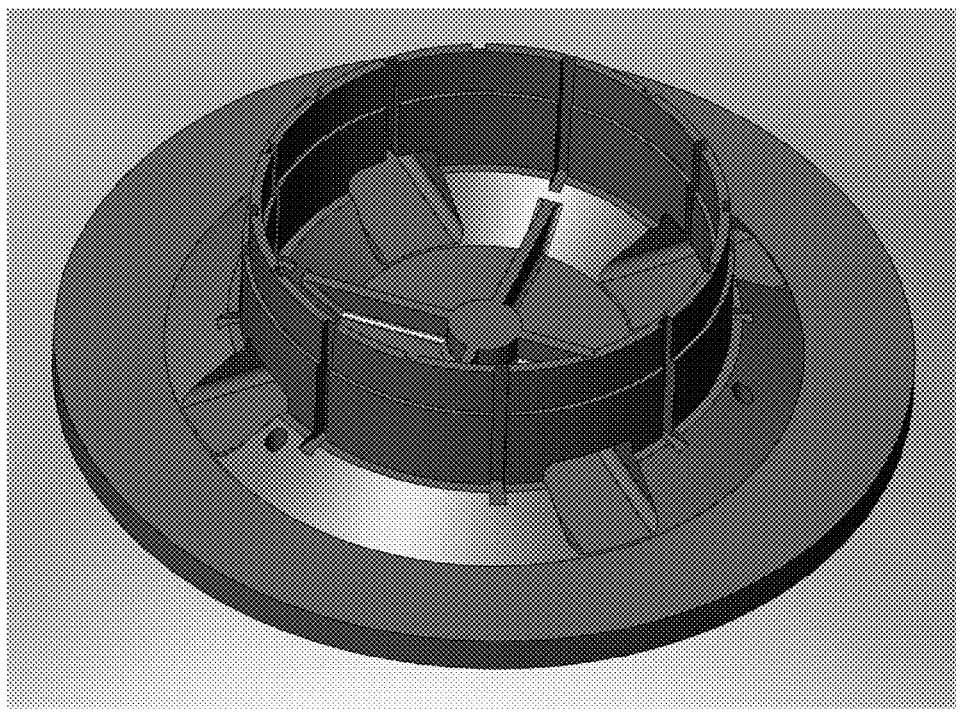
FIG. 14J illustrates a modified baseplate with stiffening ribs.

The separation from ground may be reduced or even eliminated by judicious design changes to stiffen the baseplate without penalizing weight, such as the ribbed configuration shown in FIG. 14J.

EM Vibrator Cooling and Finite-Element Thermal Analysis

Three EMV components, which are field coils, armature lift coils, and compensating plates, require active cooling to keep them from overheating under steady-state operating conditions. The heat losses generated in these three components under one embodiment of an EMV design are listed as follows:

Field coil loss (12 pancake coils, 12 turns in each pancake coil)
  DC loss (calculated at 93° C.)=259 kW
Armature lift coil loss
  DC loss in 8 lift-circuit conductors=16 kW
  AC loss in other 56 lift-circuit conductors=211 kW total loss=16 kW+211 kW=227 kW
Compensating plate loss
AC loss (for 2 compensating plates)=95 kW
Total heat loss=259 kW+227 kW+95 kW=581 kW (779 hp)

The field coil and armature lift coil insulations are class-H insulation material, which can be continuously operated at 180° C. However, the potting resin used to hold the coil conductors and insulations together has a lower thermal rating. The vibrator cooling design need to assure that the maximum insulation temperature under steady conductor coil heat loads does not exceed the thermal degradation temperature of the potting resin. The coil insulation and potting resin details are described as follows:

Field coil and armature lift coil insulations
conductor wrap: Austral VonRoll Isola 150 FCR Kapton™ (0.0045 in.)
armor coil wrap: medium weave glass tape (0.010 in.)
class-H insulation (180° C.)
Potting resin
PDG Y881K resin
heat deflection temperature=120° C. (yield strength)
glass transition temperature=131° C. (failure strength)

As constrained by the heat deflection temperature of the potting resin, the cooling design goal of this machine is to keep the maximum copper coil temperature under 120° C. under steady operations.

Figure 15A:
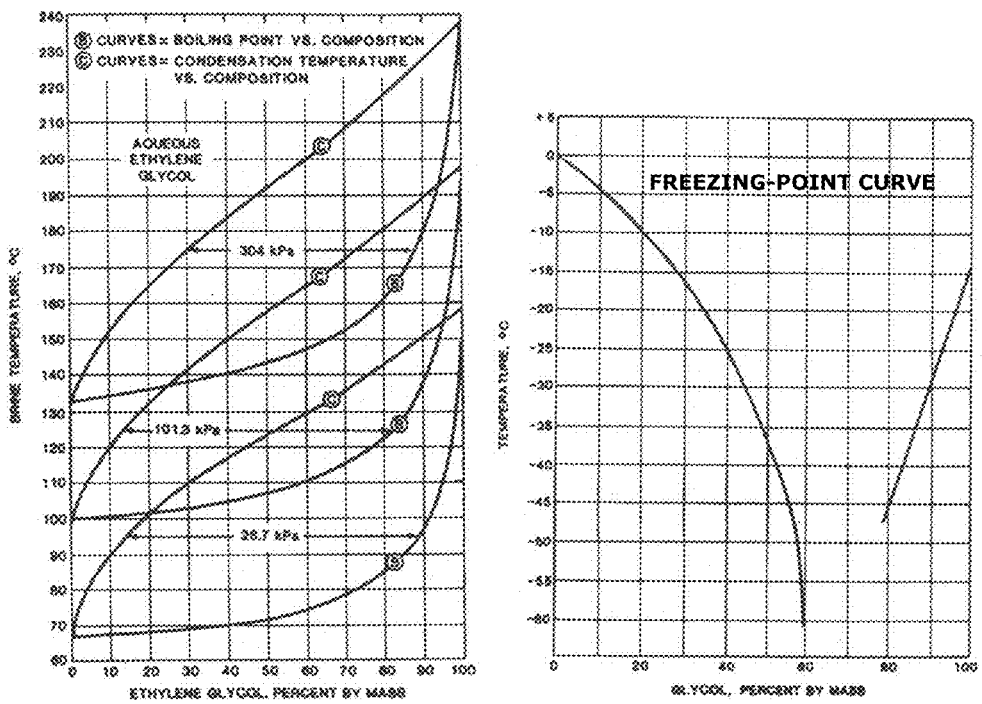
FIG. 15A illustrates boiling and freezing temperatures of ethylene glycol aqueous solutions (ASHRAE handbook)
Figure 15B:
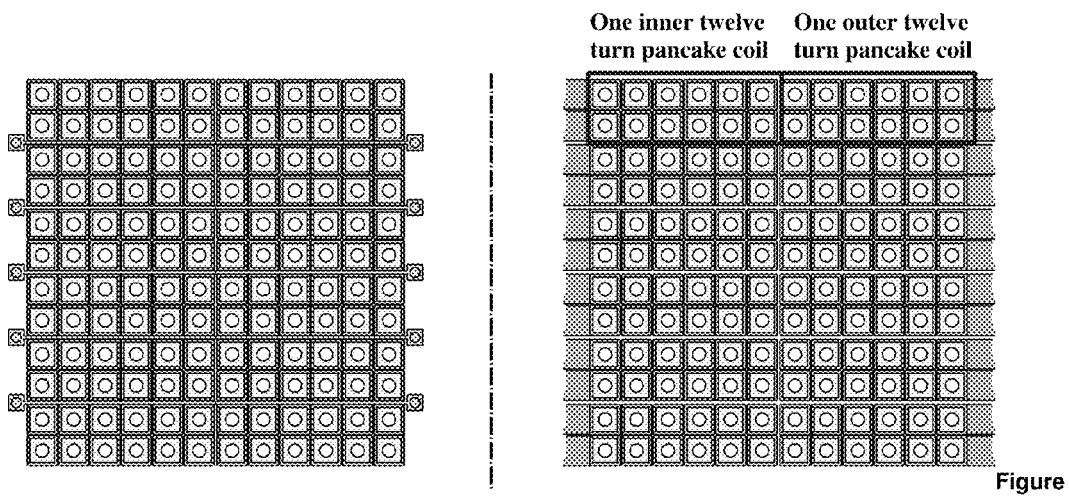
FIG. 15B illustrates a field coil cooling design.

Since the ambient temperature varies from −35° C. to 60° C., ethylene glycol water (40% ethylene glycol and 60% water by weight) has been chosen as the coolant to lower the freezing temperature and increase the boiling temperature of the coolant. FIG. 15A shows the boiling and freezing temperatures of the ethylene glycol aqueous solutions. The coolant inlet temperature to the machine is assumed to be 65° C. Other cooling schemes and heat loads are contemplated within the scope of embodiments of the invention The field coils are designed to be cooled by the coolant circulated within both copper conductor internal cooling passages and cooling passages attached to the ends of external cooling fins. Each field coil conductor is made of 0.25 in. square copper tubing with a 0.125-in hole in the middle to carry coolant. The thickness of the copper cooling fin is 0.1 in. The cooling tubes attached to the ends of each fin have the same size as that of the field coil conductors. A notional picture showing the field coil cooling design is shown in FIG. 15B.

Figure 15C:
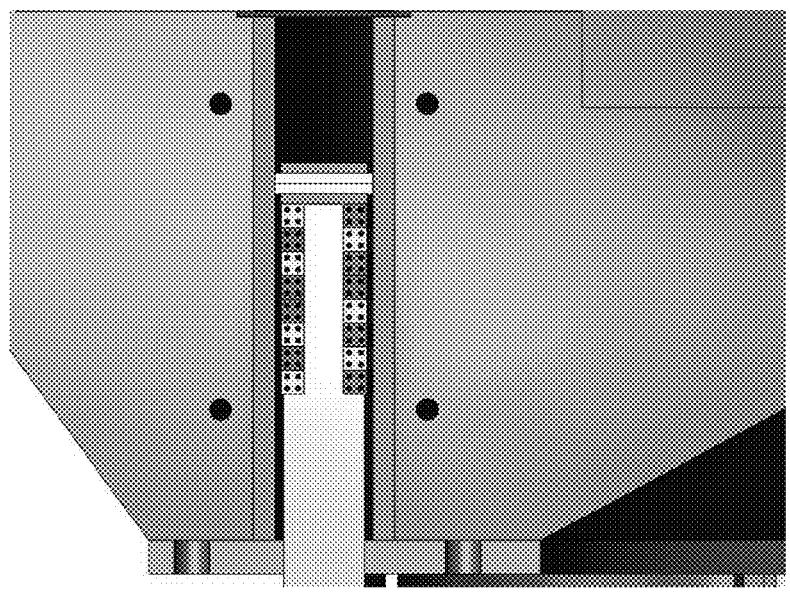
FIG. 15C illustrates an armature lift coil and compensating plate cooling design.

The armature force coils are cooled by the coolant circulated within the internal cooling passages in the copper conductors which are the same as those of the field coil copper tubing in terms of the dimensions. The compensating plate heat loss removal is accomplished by circulating the ethylene glycol coolant in four circumferential cooling passages (0.5 in. diameter each) which are located in the steel surrounding the compensating plates. The armature lift coil and compensating plate cooling design is shown in FIG. 15C.

To perform cooling analysis for predicting required coolant flow rate and coolant pumping power and to predict cooling boundary conditions required for the finite-element thermal modeling of the field coils, lift coils, and compensating plates, the coolant flow rates and cooling passage lengths need to be accurately calculated for all three cooling components. The input parameters used for the cooling analysis are listed in the following and some of the calculated cooling parameters are included in Table 2.

Coolant flow rates
in each pancake field coil cooling passage=1.35 gpm
in each field coil cooling fin cooling passage=0.7 gpm
in each armature lift coil cooling passage=1.2 gpm
in each compensating plate cooling passage=6 gpm
Numbers of coils or cooling passages
pancake field coils=12
field coil cooling fin cooling passages=10
armature lift coils=16
compensating plate cooling passages=4
Component coolant flow rates
field coil internal cooling passages=16.2 gpm
field coil fin cooling passages=7 gpm
armature lift coil cooling passages=19.2 gpm
compensating plate cooling passages=24 gpm
Total coolant flow rate=16.2 gpm+7 gpm+19.2 gpm+24 gpm=66.4 gpm
Total cooling passage length
each field coil internal cooling passage=37.008 m
each field coil cooling fin cooling passage=3.025 m
each armature lift coil cooling passage=12.649 m
each compensating plate cooling passage=3.025 m
Surface roughness=0.00006 in. (copper tubing), 0.0018 in. (steel cooling passage)
Coolant pump efficiency=80%

TABLE 2

| | Calculated cooling parameters | | | | | | | |
|---|---|---|---|---|---|---|---|---|
| Component Section | Field Coil Internal Passage Average | Field Coil Fin Passage Average | Armature Lift Coil Passage Average | Compensating Plate Passage Average | Field Coil Internal Passage Exit | Field Coil Fin Passage Exit | Armature Lift Coil Passage Exit | Compensating Plate Passage Exit |
| Coolant Temp (° C.) | 89.71 | 84.16 | 89.37 | 73.28 | 114.42 | 103.32 | 113.73 | 81.56 |
| Coolant Velocity (m/s) | 10.95 | 5.65 | 9.73 | 3.00 | 11.17 | 5.74 | 9.92 | 3.02 |
| Coolant Convection Coeff (W/m²/K) | 38026 | 21568 | 34517 | 9160 | 45464 | 24896 | 41192 | 9731 |
| Coolant Passage Length (m) | 37.01 | 3.03 | 12.65 | 3.03 | 37.01 | 3.03 | 12.65 | 3.03 |

TABLE 2-continued

Calculated cooling parameters

| Component Section | Field Coil Internal Passage Average | Field Coil Fin Passage Average | Armature Lift Coil Passage Average | Compensating Plate Passage Average | Field Coil Internal Passage Exit | Field Coil Fin Passage Exit | Armature Lift Coil Passage Exit | Compensating Plate Passage Exit |
|---|---|---|---|---|---|---|---|---|
| Coolant Pressure Drop (psi) | 2348.44 | 59.22 | 647.83 | 4.93 | 2239.29 | 56.70 | 618.44 | 4.91 |
| Coolant Pumping Power Required (hp) | 27.75 | 0.30 | 9.07 | 0.09 | 26.46 | 0.29 | 8.66 | 0.09 |

In Table 2, the energy balance calculations for field coil heat losses removed by coolant in internal cooling passages and coolant in external fin cooling passages were performed by assuming a 75%-25% heat removal split (75% heat loss removed by internal cooling and 25% heat loss removed by external cooling). This 75%-25% split was obtained from thermal-circuit analysis. Material thermal properties used in the finite-element thermal analysis are included in Table 3.

TABLE 3

Material thermal properties

| Material | Density (kg/m$^3$) | Specific Heat (J/kg/K) | Thermal Conductivity (W/m/K) |
|---|---|---|---|
| Copper | 8954 | 383 | 386 |
| Insulation (after VPI) | 1895 | 1129 | 0.19 |
| Potting Resin | 1300 | 1883 | 0.2 |
| AISI 1005 Steel | 7872 | 481 | 54 |

Figure 15D:
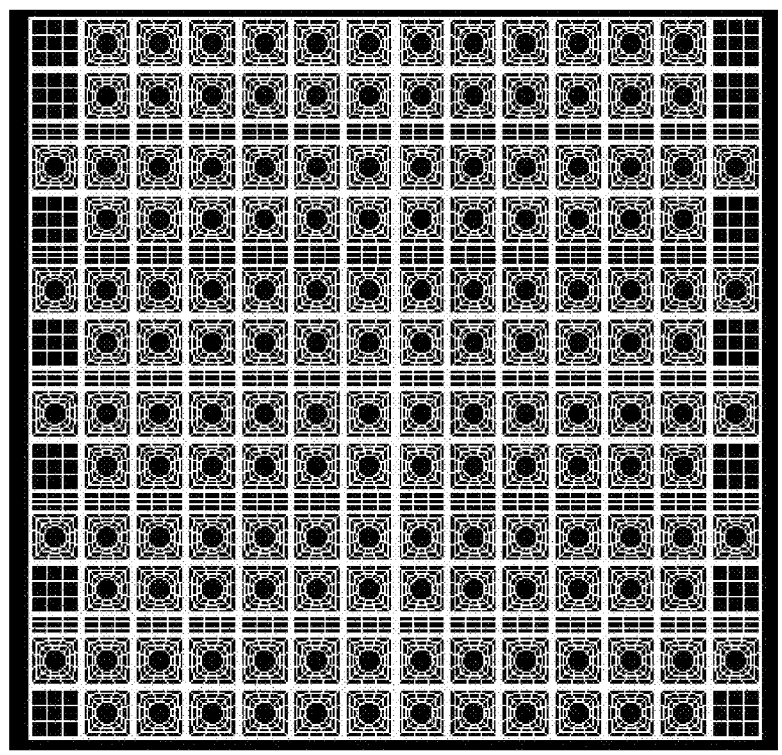
FIG. 15D illustrates a finite-element thermal model mesh for field coils.
Figure 15E:
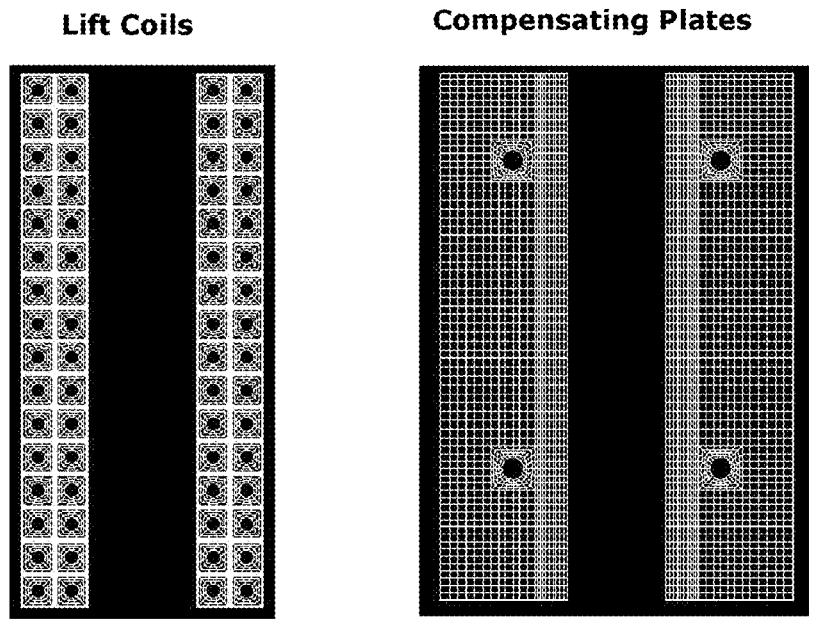
FIG. 15E illustrates a finite-element thermal model meshing for lift coils and compensating plates.
Figure 15F:
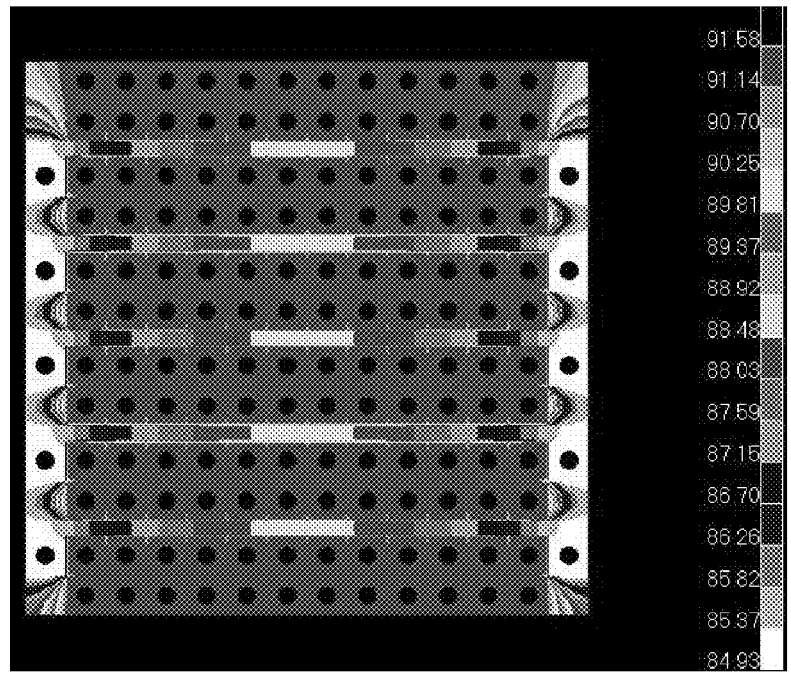
FIG. 15F illustrates a field coil steady-state temperature distribution (using average coolant temperature)
Figure 15G:
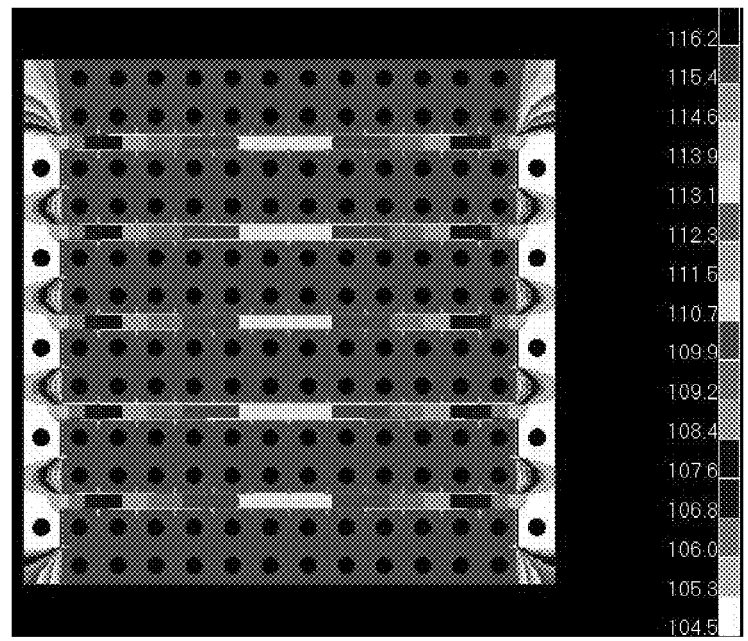
FIG. 15G illustrates a field coil steady-state temperature distribution (using exit coolant temperature)
Figure 15H:
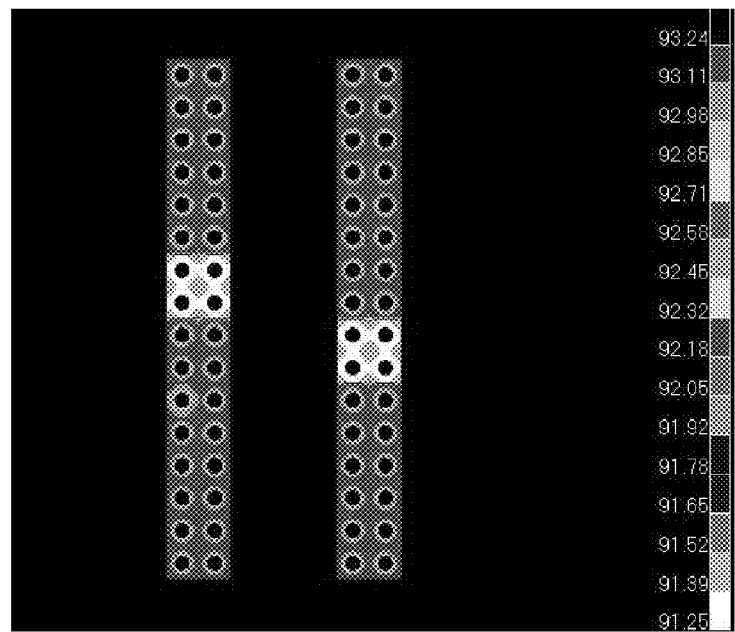
FIG. 15H illustrates a lift coil steady-state temperature distribution (using average coolant temperature)
Figure 15I:
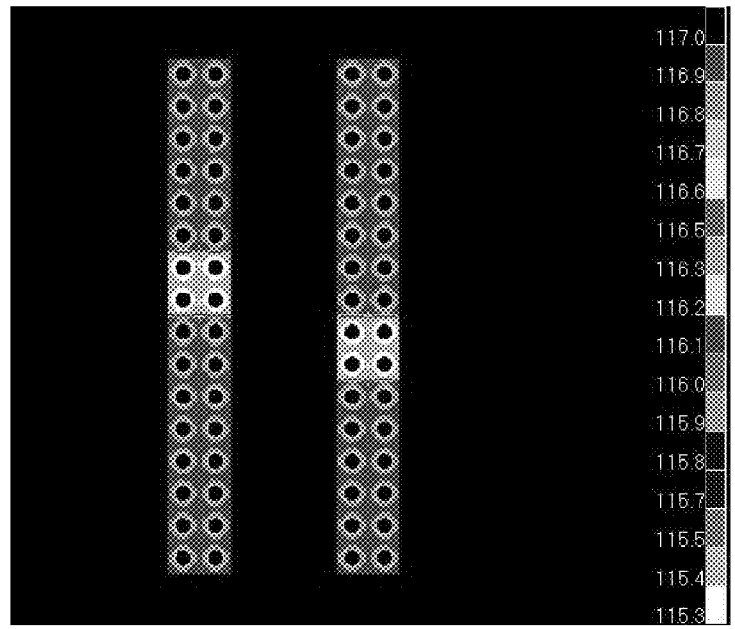
FIG. 15I illustrates a lift coil steady-state temperature distribution (using exit coolant temperature)
Figure 15J:
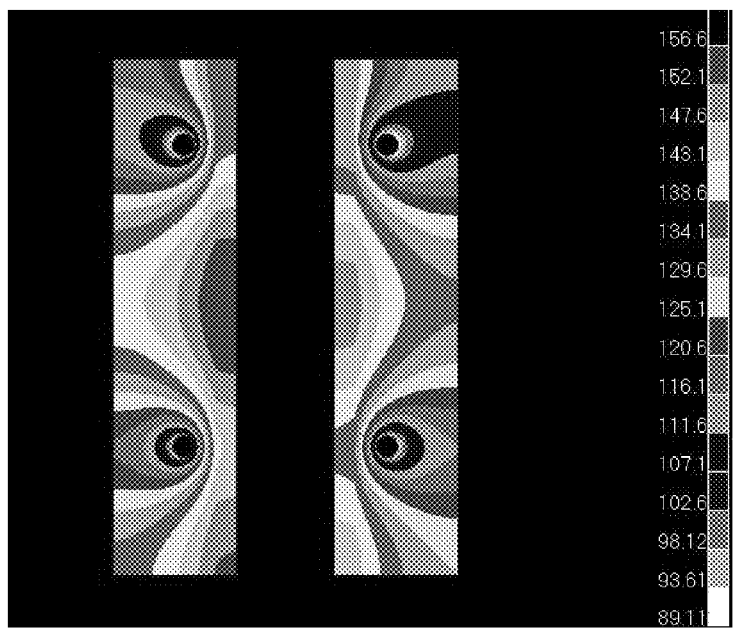
FIG. 15J illustrates a compensating plate steady-state temperature distribution (using average coolant temperature)
Figure 15K:
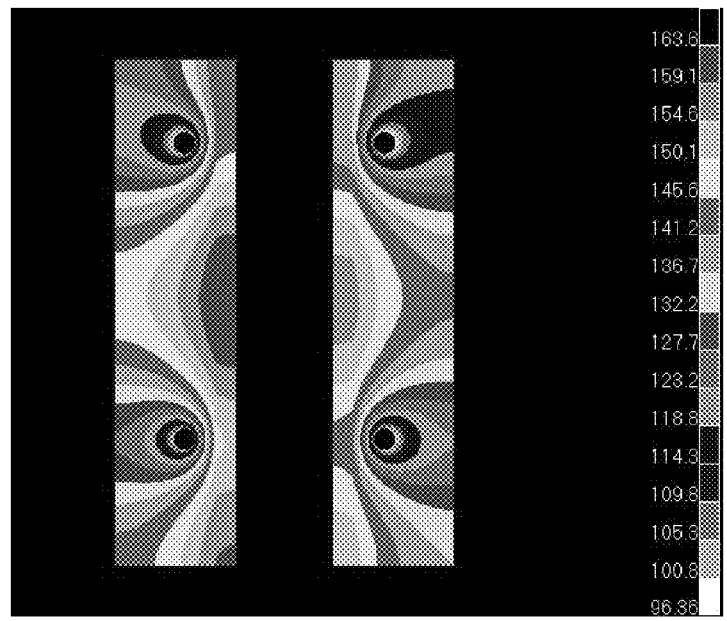
FIG. 15K illustrates a compensating plate steady-state temperature distribution (using exit coolant temperature)

Finite-element meshes for two-dimensional axis-symmetric thermal models of field coils, lift coils, and compensating plates are shown in FIGS. 15D and 15E. Two thermal analyses have been performed for each cooling component; one analysis used the cooling boundary conditions calculated at the average coolant temperature and the other analysis used the cooling boundary conditions calculated at the exit coolant temperature, which is the worst case. These cooling boundary conditions, coolant temperatures and coolant convection coefficients, are shown in Table 2. The predicted steady-state temperature distributions in the field coils, lift coils, and compensating plates are shown in FIGS. 15F through 15K.

Testing

The test plan for the vibrator system can begin with component development tests early in the fabrication process. Eight force coils can be bonded to a stainless steel tube with the resin system proposed for the prototype unit. The mock-up can be faithful to the final design of the prototype force coils. After the mock-up is cured it will be instrumented in a press and the bond strength to the stainless tube evaluated. A pass criterion will be a bond strength at least a factor of two over that required in operation. The next component tests can be a steady state thermal test of a water cooled, insulated force coil and a water cooled, insulated field pancake coil. The appropriate electrical load that represents full force operation of the shaker can be applied to the coils. The coils can be heated until the temperature rise is less than 2 C per hour. This will be considered steady state and the operating temperature recorded. The pass criterion for this test is that the steady state temperature does not exceed the heat deflection temperature of the resin system.

Figure 16A:
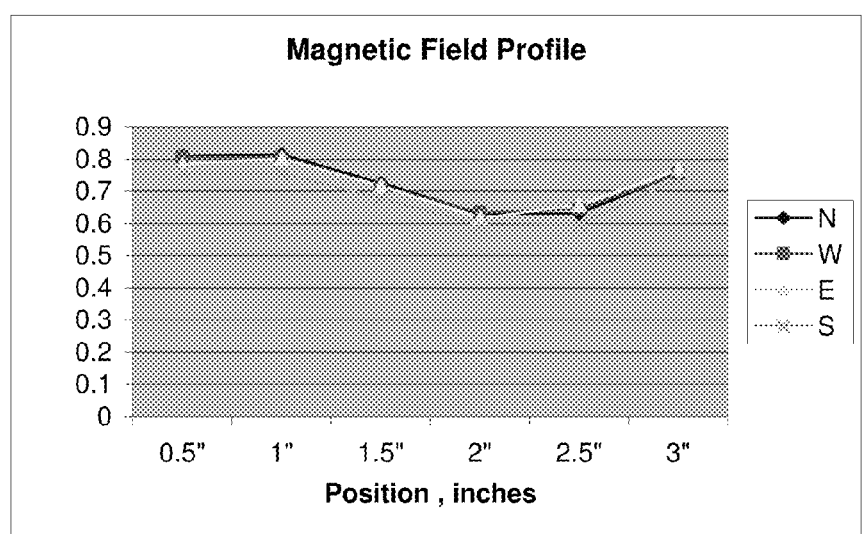
FIG. 16A illustrates a magnetic field map in air gap.

After the reaction mass is complete the cooling coils can be plumbed to a hot water source (149F) and a lab DC power supply can be used to pass operating current to the field coil. A Hall probe can be used in the air gap to the measure the field strength at several angular positions each time mapping the field as a function of axial position. An example of the data that can be collected is shown in FIG. 16A. A passing inspection can be if the data is within 5% of the values predicted by the FEA magnetic analysis. During these tests the field coil temperature can be monitored to determine the steady state operating temperature of the as-built field coil. The steady state temperature should remain below the heat deflection temperature of the resin system.

When the base plate returns from Vacuum Pressure Impregnation (VPI) of the field coil it can be tested for correct frequency response. The baseplate can be hung from a cable and an instrumented with an accelerometer. An instrumented hammer and data acquisition system can be used to find the eigenmodes of the baseplate. These can be compared to FEA structural models of the baseplate and should match to within 10%.

After rap testing the baseplate can be assembled with the reaction mass and the impedance of the force coils can be measured at discrete frequencies as a function of axial position in the reaction mass. An example of the data that can be collected is shown in Table 4. This data can be compared to the values predicted by the FEA magnetics code and should match to within 10%.

TABLE 4

Force coil impedance as a function of frequency and position

| x | Test Freq 20 Hz | Test Freq 50 Hz | Test Freq 120 Hz |
|---|---|---|---|
| −0.75 | 178 | 163 | 141 |
| −0.25 | 73.5 | 73.7 | 67 |
| 0 | 54 | 53 | 53.1 |
| 0.25 | 55.8 | 55.1 | 53.3 |
| 0.5 | 71.2 | 69.2 | 67.2 |

With the vibrator assembled a series of DC tests can be performed. The water cooling and a DC power supply can be connected to the field coil. Additionally a second laboratory DC power supply can be connected to the water cooled force coils. The correct current can be established in the field coil and then the DC power supply connected to the force coil can be incremented until levitation is realized. The test levels can be compared to those predicted by the simulation. After the levitation test the baseplate can be locked to the reaction mass with a load cell. The force coil can be excited by itself and the reluctance force measured. This level can be compared the FEA magnetics analysis and recorded. The field coil can then be excited and current applied to the force coil in several positions established by shimming the load cell. The generated force can be recorded as a function of position.

Figure 16B:
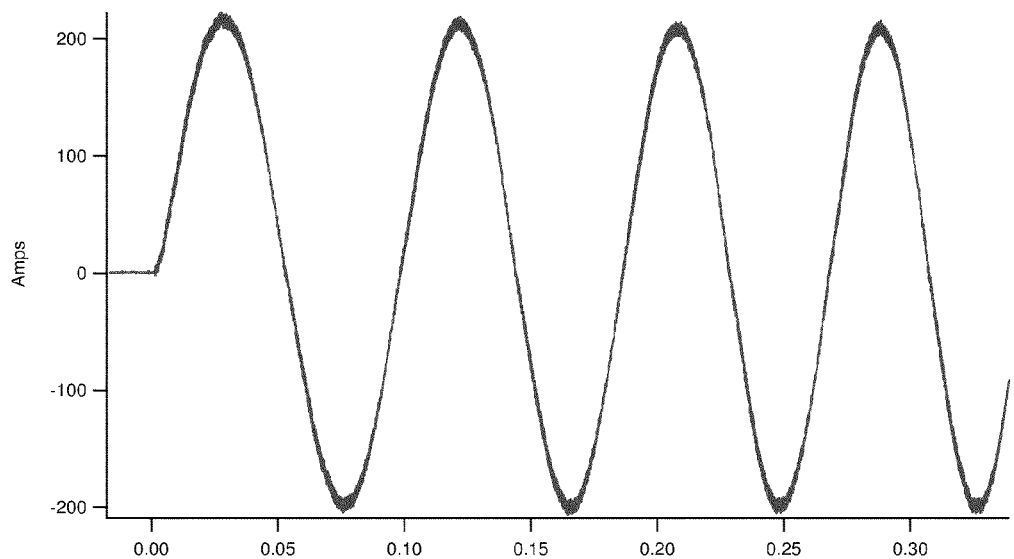
FIG. 16B illustrates a current check out of a PWM at 10 Hz.
Figure 16C:
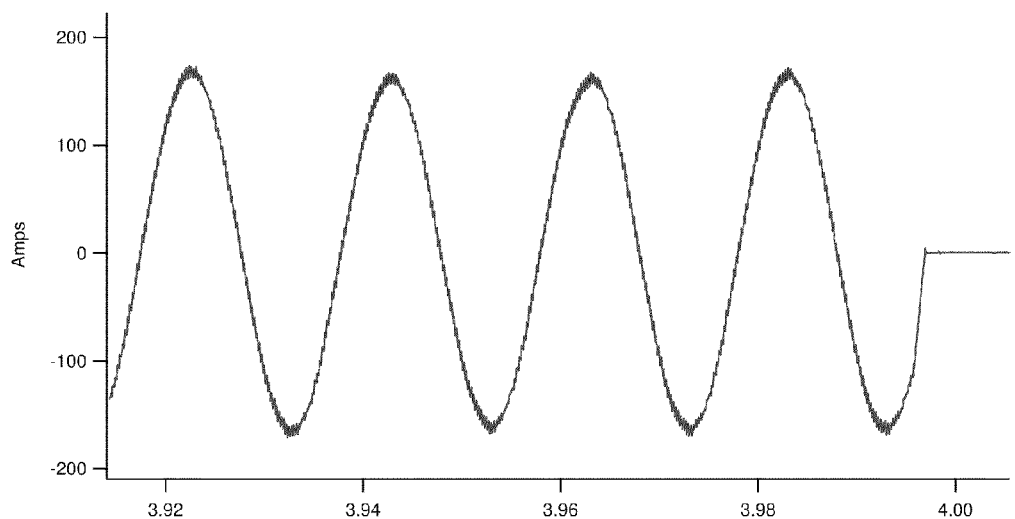
FIG. 16C illustrates a check out of a PWM converter at 50 Hz.

At this point in the schedule the Pulsed Width Modulated (PWM) Converter can be delivered and checkout tests into a dummy load can be conducted. Examples of PWM test waveforms are shown in FIGS. 16B and 16C.

Once the PWM is deemed operational it can be connected to the shaker and low level vibration tests conducted. This allows debugging of the instrumentation and the data acquisition system. In addition the control gains may be adjusted for optimal operation. Once the vibrator has been demonstrated at low force integration with the truck can commence.

Power Mitigation Technologies

As it has been seen in previous sections if the vibrator was required to produce full force at 225 Hz in steady state operation it would require 770 Hp of prime mover and the equivalent capability in heat rejection. In the prototype unit we intend to modify the Mertz engine to produce 600 Hp. The prototype can taper the force at high frequency to observe the 600 Hp rating of the diesel engine. For a production unit, it is desired to bring the required power down into the 600 Hp range while maintaining full force capability at 225 Hz.

There are several technologies that can reduce the power requirements for the Electromagnetic Vibrator (EMV) such as, for example, the use of permanent magnets in an embodiment of the EMV.

Figure 17A:
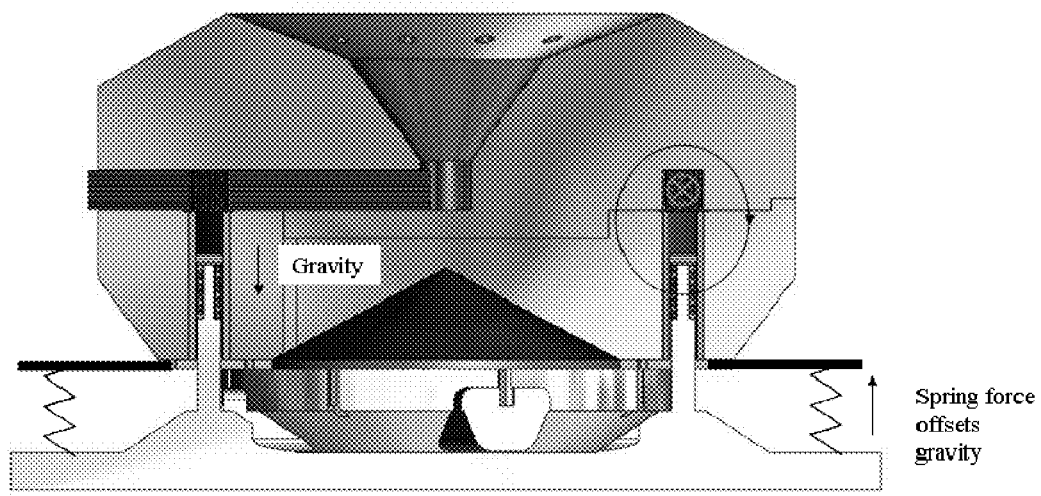
FIG. 17A illustrates springs added between baseplate and reaction mass.
Figure 17B:
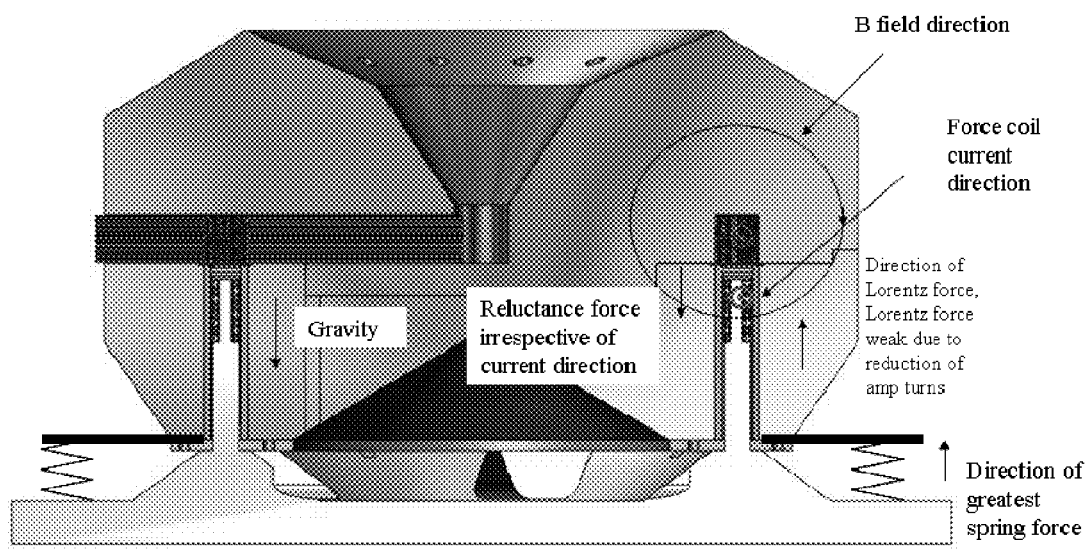
FIG. 17B illustrates a vibrator in full down position.
Figure 17C:
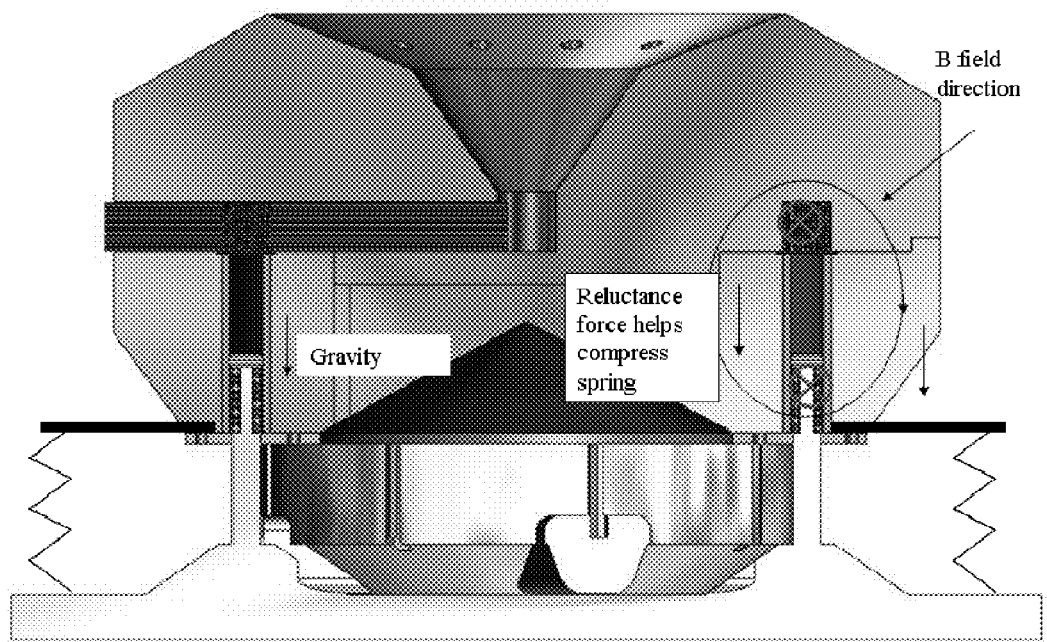
FIG. 17C illustrates a vibrator in full up position.

Another technology that can be used is spring assist. Springs can be positioned between the baseplate and the reaction mass to aid the Lorentz force (FIG. 17A). The first advantage seen is that springs can provide levitation force. Further advantage of springs can be seen by examining the shaker at its extremes of motion. In FIG. 17B it is seen that the springs are fully compressed in the full down position. This is when the vibrator needs the most help with up force. Gravity, the reluctance force and weakening of the Lorentz force all happen at this extreme of the displacement range. The springs are returning energy to the system right when it needs it the most. The other extreme in the range of motion is when the vibrator is in the full up position (FIG. 17C). At this point of the stroke the spring has to be stretched and is receiving energy. It is at this point of the cycle that the baseplate current and the field current are in a direction to aid one another and establish more magnetic field strength in the air gap. The Lorentz force is at a maximum right when the spring is stretched. These observations point to a conclusion that the insertion of springs may allow reduction of both the field and armature currents to a level that would provide substantial reductions in power.

Figure 17D:
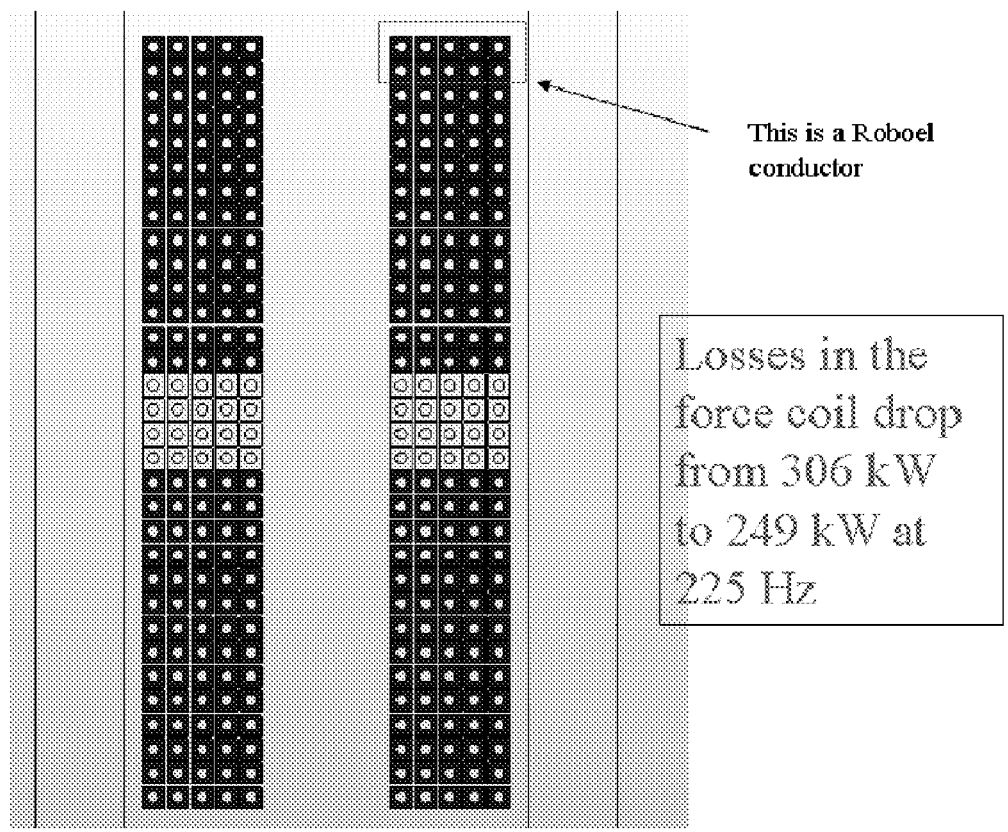
FIG. 17D illustrates conductors redesigned with 0.125 in. tubing.
Figure 17E:
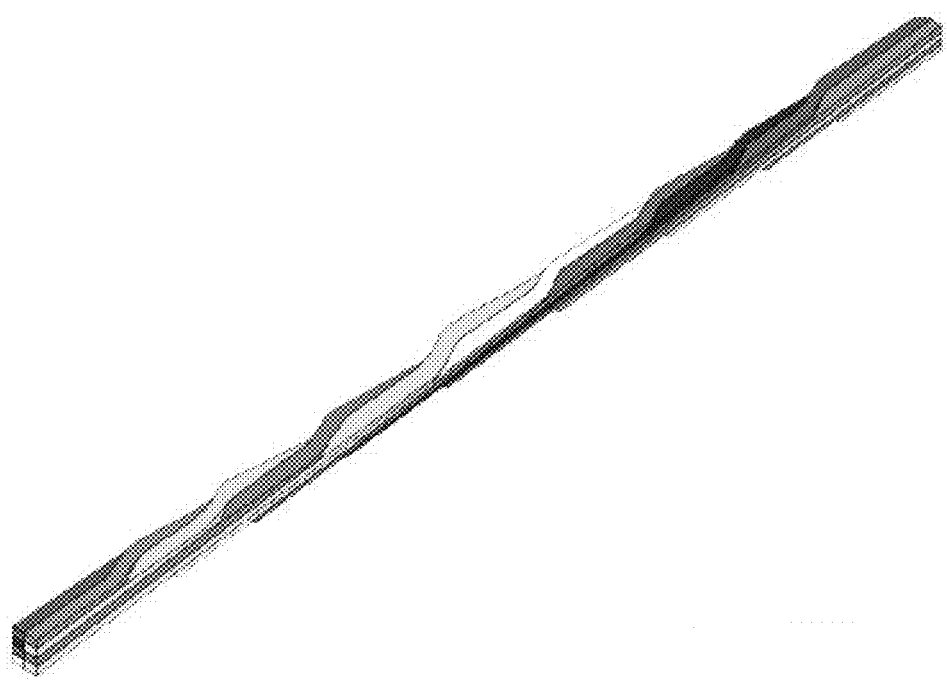
FIG. 17E illustrates a conductor in Roebel™ configuration.

Another area for power savings involves conductor design. The eddy current and proximity losses may be lowered by reducing the exposed area in the direction that the time varying magnetic field intercepts the conductor. FIG. 17D shows a design where the conductor size has been reduced from 0.25 in. to 0.125 in. In addition the conductor has been transposed using a Roebel™ configuration to reduce circulating currents (FIG. 19-5). It can be seen that this conductor change has dropped the force coil losses from 306 kW to 249 kW.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims or inventive concepts.

What is claimed is:

1. An electromagnetic vibrator for seismic applications, the electromagnetic vibrator comprising:
    a reaction mass having a field winding embedded therein;
    a base plate having an upright upper end portion and an elongate lower portion, the upright upper end portion having a bottom end, an inner annular surface and an outer annular surface; and
    an armature winding coupled to at least a portion of the inner annular surface and at least a portion of the outer annular surface of the upper end portion of the base plate,
    wherein an electric current in at least one of the field winding and the armature winding causes at least one of the base plate and the reaction mass to move relative to each other.

2. The electromagnetic vibrator of claim 1, wherein the reaction mass is approximately 16,500 lbs, the base plate is approximately 4,707 lbs, and the electromagnetic vibrator has a stroke of approximately 6" to 6-¾".

3. The electromagnetic vibrator of claim 1, wherein an armature winding current in the armature winding creates an armature winding magnetic field that interacts with a field winding magnetic field created by a field winding current in the field winding to cause axial movement of at least one of the reaction mass and the base plate.

4. The electromagnetic vibrator of claim 3, wherein the armature winding current is a sinusoidally-varying current that is controlled by a control system.

5. The electromagnetic vibrator of claim 4, wherein the control system controls one or more of direction, amplitude, or frequency of the armature winding current.

6. The electromagnetic vibrator of claim 3, wherein the field winding current is direct current (DC).

7. The electromagnetic vibrator of claim 1, wherein the field winding is replaced with or assisted by one or more permanent magnets.

8. The electromagnetic vibrator of claim 1, wherein said base plate allows application of the force near a ground transmission point and provides high stiffness.

9. The electromagnetic vibrator of claim 1, wherein the reaction mass and the base plate form at least a portion of a transducer that is adapted to apply a force of approximately 60,000 pounds-force or greater into a seismic structure to provide vibroseis sweeps for seismic exploration over a range from approximately 4 Hz to approximately 125 Hz.

10. The electromagnetic vibrator of claim 1, wherein the reaction mass and the base plate form at least a portion of a transducer that is adapted to apply a force to a seismic structure to provide vibroseis sweeps for seismic exploration over a range from approximately 4 Hz to approximately 225 Hz.

11. The electromagnetic vibrator of claim 1, wherein the reaction mass and the base plate form at least a portion of a transducer that is adapted to apply a force to a seismic structure to provide vibroseis sweeps for seismic exploration, wherein said vibroseis sweeps can be linear, non linear, or special random vibroseis sweeps.

12. The electromagnetic vibrator of claim 11, wherein said vibroseis sweeps are not capable of being performed with hydraulic vibrator systems.

13. The electromagnetic vibrator of claim 1, further comprising a permanent magnet, wherein an armature winding current in the armature winding creates an armature winding magnetic field that interacts with a permanent magnetic field created by the permanent magnet to cause movement of at least one of the reaction mass and the base plate.

14. The electromagnetic vibrator of claim 13, wherein movement of at least one of the reaction mass and the base plate is spring-assisted.

15. The electromagnetic vibrator of claim 1, wherein the reaction mass and the base plate form at least a portion of a transducer comprising one or more springs, and wherein movement of the transducer is spring-assisted.

* * * * *